(12) United States Patent
Zhang et al.

(10) Patent No.: US 12,166,826 B2
(45) Date of Patent: Dec. 10, 2024

(54) USER PLANE CONNECTION ESTABLISHMENT METHOD AND APPARATUS, AND SYSTEM

(71) Applicant: HUAWEI TECHNOLOGIES CO., LTD., Guangdong (CN)

(72) Inventors: Di Zhang, Shenzhen (CN); Youyang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 573 days.

(21) Appl. No.: 17/536,668

(22) Filed: Nov. 29, 2021

(65) Prior Publication Data

US 2022/0086236 A1 Mar. 17, 2022

Related U.S. Application Data

(63) Continuation of application No. PCT/CN2020/079049, filed on Mar. 12, 2020.

(30) Foreign Application Priority Data

May 29, 2019 (CN) .......................... 201910459588.X

(51) Int. Cl.
*H04L 67/141* (2022.01)
*H04L 9/40* (2022.01)
*H04L 67/146* (2022.01)

(52) U.S. Cl.
CPC .......... *H04L 67/141* (2013.01); *H04L 67/146* (2013.01); *H04L 63/08* (2013.01)

(58) Field of Classification Search
CPC ..... H04L 67/141; H04L 67/146; H04L 63/08; H04W 88/14; H04W 88/16; H04W 76/12
See application file for complete search history.

(56) References Cited

U.S. PATENT DOCUMENTS 6,801,542 B1 * 10/2004 Subbiah .............. H04L 12/6418
370/467
2019/0052580 A1 2/2019 Peng et al.
(Continued)

FOREIGN PATENT DOCUMENTS

CN 101202718 A 6/2008
CN 108476405 A 8/2018
(Continued)

OTHER PUBLICATIONS

H. Peng, T. Yamamoto and Y. Suegara, "Extended user/control plane architectures for tightly coupled LTE/WiGig interworking in millimeter-wave heterogeneous networks," 2015 IEEE Wireless Communications and Networking Conference (WCNC), New Orleans, LA, USA, 2015, pp. 1548-1553. (Year: 2015).*

(Continued)

*Primary Examiner* — Ayaz R Sheikh
*Assistant Examiner* — Tarell A Hampton
(74) *Attorney, Agent, or Firm* — Fish & Richardson P.C.

(57) ABSTRACT

Embodiments of this application relate to the field of communications technologies, and provide example user plane connection establishment methods apparatuses, and systems to establish a user plane connection between an access network gateway and an interworking function network element-user plane. One example method includes determining, by an interworking function network element-control plane, granularity information of a user plane connection between an interworking function network element-user plane and an access network gateway. The interworking function network element-control plane can then send the granularity information of the user plane connection to the interworking function network element-user plane and the access network gateway, where the granularity information of the user plane connection is used to establish the user (Continued)

plane connection between the interworking function network element-user plane and the access network gateway.

20 Claims, 31 Drawing Sheets

(56) References Cited

U.S. PATENT DOCUMENTS

| | | | | |
|---|---|---|---|---|
| 2020/0022076 | A1* | 1/2020 | Yao | H04W 8/22 |
| 2021/0076257 | A1* | 3/2021 | Pocha | H04W 76/15 |
| 2022/0393972 | A1* | 12/2022 | Salkintzis | H04L 47/805 |

FOREIGN PATENT DOCUMENTS

| | | |
|---|---|---|
| CN | 109155949 A | 1/2019 |
| EP | 2800417 A1 | 11/2014 |
| EP | 3637846 A1 | 4/2020 |
| WO | 2018008944 A1 | 1/2018 |

OTHER PUBLICATIONS

Office Action issued in Chinese Application No. 201910459588.X on Apr. 25, 2021, 8 pages (with English translation).
PCT International Search Report and Written Opinion issued in International Application No. PCT/CN2020/079049 on Jun. 10, 2020, 13 pages (with English translation).
Telstra, "5WWC: QoS framework proposal," SA WG2 Meeting #129, S2-1810967, Dongguan, P. R. China, Oct. 15-19, 2018, 9 pages.
Telstra, "5WWC: Solution #X for supporting FN-RG and the service migration," SA WG2 Meeting #128bis, S2-188613 (revision of S2-188114), Sophia Antipolis, France, Aug. 20-24, 2018, 7 pages.
Telstra, "5WWC: Solution #X for supporting FN-RG and the service migration," SA WG2 Meeting #128bis, S2-188114, Sophia Antipolis, France, Aug. 20-24, 2018, 6 pages.
1 Extended European Search Report issued in European Application No. 20814487.3 on Sep. 15, 2022, 11 pages.

* cited by examiner

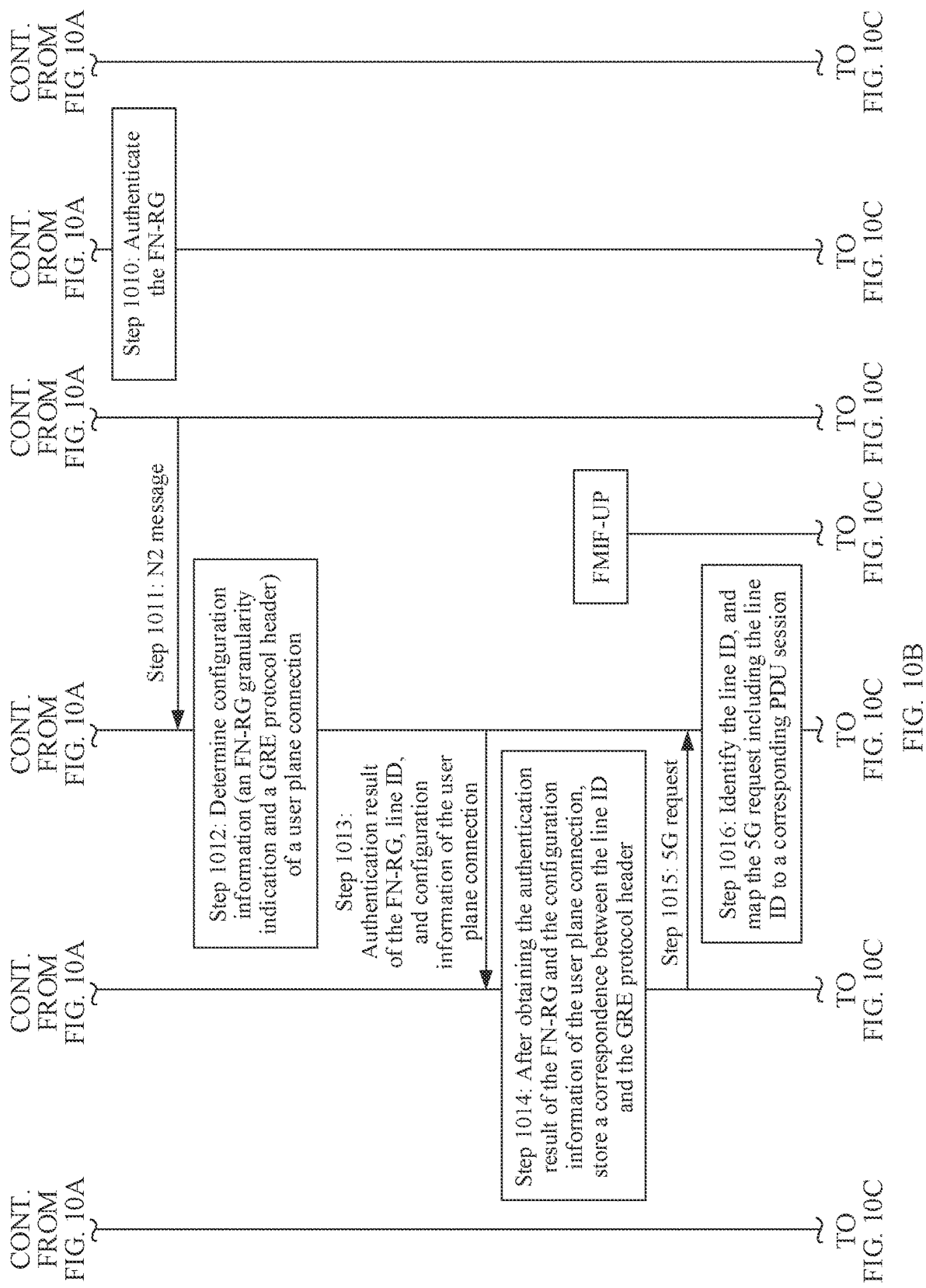

USER PLANE CONNECTION ESTABLISHMENT METHOD AND APPARATUS, AND SYSTEM

CROSS-REFERENCE RELATED APPLICATION

This application is a continuation of International Application No. PCT/CN2020/079049 filed on Mar. 12, 2020, which claims priority to Chinese Patent Application No. 201910459588.X, filed on May 29, 2019. The disclosure of the aforementioned applications are hereby incorporated by reference in their entireties.

TECHNICAL FIELD

Embodiments of this application relate to the field of communications technologies, and in particular, to a user plane connection establishment method and apparatus, and a system.

BACKGROUND

To address a challenge of a wireless broadband technology, and maintain a leading advantage of a 3rd generation partnership project (3GPP) network, the 3GPP standard group formulated a next generation mobile communications network architecture (Next Generation System), which may also be referred to as a 5th generation (5G) network architecture. The 5G network architecture supports a terminal in accessing a 5G core network (CN) by using a wireless technology (for example, a 5G radio access network (RAN)) defined by the 3GPP standard group.

In addition to being accessed by using the RAN, the 5GC may be accessed by using a fixed network/wireline network (for example, the 5GC is accessed by a residential gateway (RG) by using a wireline network). For example, the residential gateway (for example, a 5G-RG/a fixed network residential gateway (FN-RG)) accesses the 5GC by using a wireline access network, a broadband network gateway (BNG), and a fixed mobile network interworking function (FMIF), to implement convergence of the fixed network and a mobile network (which is briefly referred to as "fixed mobile convergence").

Therefore, how to establish a user plane connection between the BNG and the FMIF is an urgent technical problem to be resolved.

SUMMARY

Embodiments of this application provide a user plane connection establishment method and apparatus, and a system, to establish a user plane connection between an access network gateway and an interworking function network element-user plane.

To achieve the foregoing objective, the following technical solutions are used in the embodiments of this application.

According to a first aspect, an embodiment of this application provides a user plane connection establishment method, including: An interworking function network element-control plane determines granularity information of a user plane connection between an interworking function network element-user plane and an access network gateway. Then, the interworking function network element-control plane sends the granularity information of the user plane connection to the interworking function network element-user plane and the access network gateway, where the granularity information of the user plane connection is used to establish the user plane connection between the interworking function network element-user plane and the access network gateway.

This embodiment of this application provides the user plane connection establishment method. In the method, the interworking function network element-control plane determines the granularity information used to establish the user plane connection between the interworking function network element-user plane and the access network gateway. Then, the interworking function network element-control plane sends the granularity information of the user plane connection to the two endpoints of the user plane connection (that is, the interworking function network element-user plane and the access network gateway), so that the access network gateway and the interworking function network element-user plane each establish the user plane connection at a corresponding granularity based on the granularity information of the user plane connection. In this way, a data packet can be subsequently transmitted between the access network gateway and the interworking function network element-user plane through the established user plane connection.

In a possible implementation, that an interworking function network element-control plane determines granularity information of a user plane connection between an interworking function network element-user plane and an access network gateway includes: The interworking function network element-control plane determines the granularity information of the user plane connection based on any one or more of terminal identifier information or policy information. The policy information may be used to determine deployment between the interworking function network element-user plane and the interworking function network element-control plane and load information of the interworking function network element-user plane. Therefore, based on the policy information and the terminal identifier information, a granularity of the established user plane connection can satisfy a network running status.

In a possible implementation, the granularity information of the user plane connection includes information about the user plane connection at an access network gateway granularity, so that the access network gateway and the interworking function network element-user plane determine that the granularity of the user plane connection that needs to be established is the access network gateway granularity, and all data packets of the access network gateway can be transmitted through the user plane connection. At the access network gateway granularity, an access network gateway is associated with a user plane connection between the access network gateway and an interworking function network element-user plane. In addition, at the access network gateway granularity, many-to-one deployment between access network gateways and an interworking function network element can be used.

In a possible implementation, the granularity information of the user plane connection includes information about the user plane connection at a terminal granularity, so that the access network gateway and the interworking function network element-user plane determine that the granularity of the user plane connection that needs to be established is the terminal granularity, and all data packets of a terminal associated with the user plane connection can be transmitted through the user plane connection. At the terminal granularity, each terminal is associated with the user plane connection between the access network gateway and the interworking, function network element-user plane. In addition, at the terminal granularity, many-to-many deployment between access network gateways and interworking function network elements can be used.

In a possible implementation, the granularity information of the user plane connection includes information about the user plane connection at a session granularity. Establishing the user plane connection at the session granularity can facilitate association of each session of the terminal with a user plane connection, so that a data packet carried by using each session can be transmitted through the user plane connection associated with the session. In addition, at the session granularity, many-to-many deployment between access network gateways and interworking function network elements can be used.

In a possible implementation, the method provided in this embodiment of this application further includes: The interworking function network element-control plane sends data encapsulation information of the user plane connection to the interworking function network element-user plane and the access network gateway. In this way, the interworking function network element-user plane and the access network gateway can process, by using the data encapsulation information, a data packet to be transmitted through the user plane connection.

In a possible implementation, the method provided in this embodiment of this application further includes: The interworking function network element-control plane receives a first request message from the access network gateway, where the first request message includes the terminal identifier information and any one or more of the following information: a request for establishing the user plane connection or an authentication request message, and the authentication request message is used to request to authenticate a terminal. In this way, the interworking function network element-control plane can determine, in a process in which the access network gateway authenticates the terminal, that the user plane connection needs to be established.

In a possible implementation, the method provided in this embodiment of this application further includes: The interworking function network element-control plane receives, from the access network gateway, the terminal identifier information and the request for establishing the user plane connection. In this process, the access network gateway can send the terminal identifier information and the request for establishing the user plane connection to the interworking function network element-control plane only when the access network gateway determines that the terminal is successfully authenticated.

In a possible implementation, the interworking function network element-control plane sends the terminal identifier information corresponding to the granularity information and session information corresponding to the terminal to the access network gateway and the interworking function network element-user plane. In this way, the access network gateway and the interworking function network element-user plane can establish a correspondence between the terminal identifier information and the granularity information of the user plane connection. After the correspondence is determined, the access network gateway and the interworking function network element-user plane may determine to transmit a data packet of the terminal by using the specified granularity information of the user plane connection.

In a possible implementation, the method provided in this embodiment of this application further includes: The interworking, function network element-control plane sends the terminal identifier information and the session information of the terminal to the access network gateway and the interworking function network element-user plane. In this way, the access network gateway can determine a correspondence between the terminal identifier information and the session information of the terminal. A data packet carries session information in a transmission process. Therefore, the access network gateway or the interworking function network element-user plane can determine the terminal identifier information corresponding to the received data packet. In addition, because the access network gateway or the interworking function network element-user plane has the terminal identifier information and the granularity information of the user plane connection, the access network gateway or the interworking function network element-user plane can further determine that the data packet is transmitted by using the granularity information of the user plane connection associated with the terminal identifier information.

In a possible implementation, the method provided in this embodiment of this application further includes: The interworking function network element-control plane sends the terminal identifier information corresponding to the data encapsulation information to the access network gateway and the interworking function network element-user plane. In this way, the access network gateway and the interworking function network element-user plane can determine a correspondence between the terminal identifier information and the data encapsulation information. Regardless of at the terminal granularity or the access network gateway granularity, the data packet of the terminal may be processed by using the data encapsulation information.

In a possible implementation, the method provided in this embodiment of this application further includes: The interworking function network element-control plane determines user plane tunnel information, where the user plane tunnel information includes information about a user plane network element and information about the interworking function network element-user plane. The interworking function network element-control plane sends the information about the interworking function network element-user plane to the user plane network element. In this way, the user plane network element can determine, during downlink transmission, the information about the interworking function network element-user plane to which a data packet is transmitted. The interworking function network element-control plane sends the information about the user plane network element and the session information corresponding to the terminal to the interworking function network element-user plane. In this way, the interworking function network element-user plane can determine, during uplink transmission, the information about the user plane network element to which a data packet is transmitted.

In a possible implementation, the method provided in this embodiment of this application further includes: The interworking function network element-control plane receives an authentication result of the terminal from a mobility management network element, where the authentication result of the terminal is used to indicate that the terminal fails to be authenticated or the terminal is successfully authenticated.

In a possible implementation, that an interworking function network element-control plane determines granularity information of a user plane connection between an interworking function network element-user plane and an access network gateway includes: The interworking function network element-control plane determines the granularity information of the user plane connection between the interworking function network element-user plane and the access network gateway when the terminal is successfully authenticated.

In a possible implementation, the method provided in this embodiment of this application further includes: The interworking function network element-control plane further sends the authentication result of the terminal to the access network gateway. Specifically, when the terminal is successfully authenticated, the authentication result of the terminal may be sent to the access network gateway together with the granularity information of the user plane connection. In this way, the access network gateway can obtain the granularity information of the user plane connection in a process of determining the authentication result of the terminal. Therefore, signaling overheads are reduced. Alternatively, the interworking function network element-control plane may first send the authentication result of the terminal, and then send the granularity information of the user plane connection. Alternatively, the interworking function network element-control plane negotiates with the access network gateway in advance: If the access network gateway receives the granularity information of the user plane connection, the access network gateway can determine that the terminal is successfully authenticated. In this case, the interworking function network element-control plane may not send a message used to indicate that the terminal is successfully authenticated to the access network gateway.

According to a second aspect, an embodiment of this application provides a user plane connection establishment method, including: An access network gateway receives granularity information of a user plane connection from an interworking function network element-control plane, where the granularity information of the user plane connection is used to establish the user plane connection between an interworking function network element-user plane and the access network gateway. The access network gateway establishes the user plane connection between the interworking function network element-user plane and the access network gateway based on the granularity information of the user plane connection.

For specific content of the granularity information of the user plane connection in the second aspect, refer to the descriptions in the first aspect. Details are not described herein again.

In a possible implementation, the method provided in this embodiment of this application further includes: The access network gateway receives data encapsulation information of the user plane connection from the interworking function network element-control plane.

In a possible implementation, the method provided in this embodiment of this application further includes: The access network gateway receives, from the interworking function network element-control plane, terminal identifier information corresponding to the data encapsulation information.

In a possible implementation, the method provided in this embodiment of this application further includes: The access network gateway determines a correspondence between the data encapsulation information and the terminal identifier information.

In a possible implementation, the method provided in this embodiment of this application further includes: The access network gateway sends a first request message to the interworking function network element-control plane, where the first request message includes the terminal identifier information and any one or more of the following information: a request for establishing the user plane connection or an authentication request message, and the authentication request message is used to request to authenticate a terminal.

In a possible implementation, the method provided in this embodiment of this application further includes: The access network gateway sends the terminal identifier information and the request for establishing the user plane connection to the interworking function network element-control plane: This step can be performed only when the access network gateway determines that the terminal is successfully authenticated.

In a possible implementation, the method provided in this embodiment of this application further includes: The access network gateway receives an authentication result of the terminal from the interworking function network element-control plane, where the authentication result of the terminal is used to indicate that the terminal is successfully authenticated or fails to be authenticated.

In a possible implementation, the authentication result of the terminal may be a message used to indicate that the terminal is successfully authenticated, or the authentication result of the terminal may be a message used to indicate that the terminal fails to be authenticated.

In a possible implementation, the method provided in this embodiment of this application further includes: The access network gateway receives, from the interworking function network element-control plane, the terminal identifier information corresponding to the granularity information.

In a possible implementation, the access network gateway determines a correspondence between the terminal identifier information and the granularity information of the user plane connection.

In a possible implementation, the method provided in this embodiment of this application further includes: The access network gateway receives the terminal identifier information and session information of the terminal from the interworking function network element-control plane.

In a possible implementation, the access network gateway determines a correspondence between the terminal identifier information and the session information of the terminal.

In a possible implementation, the method provided in this embodiment of this application further includes: The access network gateway sends the session information of the terminal to the terminal, where the session information includes address information, and the address information is used to encapsulate a data packet sent by the terminal.

In a possible implementation, the method provided in this embodiment of this application further includes: The access network gateway receives the data packet from the terminal, where the data packet includes session address information. The access network gateway decapsulates the data packet to obtain the session address information. The access network gateway processes the data packet based on the session address information by using the data encapsulation information. The access network gateway sends a processed data packet to the interworking function network element-user plane through the user plane connection.

In a possible implementation, the method provided in this embodiment of this application further includes: The access network gateway receives a data packet from the interworking function network element-user plane. The access network gateway decapsulates the data packet to obtain session address information. The access network gateway sends the data packet to the terminal based on the session address information and a correspondence between the session address information and a connection between the access network gateway and the terminal.

In the embodiments of this application, the terminal identifier information may be a line identifier of the terminal.

In the embodiments of this application, the session information includes the session address information and/or session identifier information.

In the embodiments of this application, user plane tunnel information includes information about a tunnel between the user plane function network element and the interworking function network element-user plane. For example, the user plane tunnel information includes a tunnel address of the user plane function network element and/or a tunnel address of the interworking function network element-user plane.

According to a third aspect, an embodiment of this application provides a user plane connection establishment method, including: An interworking function network element-user plane receives, from an interworking function network element-control plane, granularity information of a user plane connection, where the granularity information of the user plane connection is used to establish the user plane connection between the interworking function network element-user plane and an access network gateway. The interworking function network element-user plane establishes the user plane connection between the interworking function network element-user plane and the access network gateway based on the granularity information of the user plane connection.

For specific content of the granularity information of the user plane connection in the third aspect, refer to the descriptions in the first aspect. Details are not described herein again.

In a possible implementation, the method provided in this embodiment of this application further includes: The interworking function network element-user plane receives, from the interworking function network element-control plane, terminal identifier information corresponding to the granularity information.

In a possible implementation, the method provided in this embodiment of this application further includes: The interworking function network element-user plane determines a correspondence between the granularity information and the terminal identifier information.

In a possible implementation, the method provided in this embodiment of this application further includes: The interworking function network element-user plane receives data encapsulation information of the user plane connection from the interworking function network element-control plane.

In a possible implementation, the method provided in this embodiment of this application further includes: The interworking function network element-user plane receives, from the interworking function network element-control plane, the terminal identifier information corresponding to the data encapsulation information.

In a possible implementation, the method provided in this embodiment of this application further includes: The interworking function network element-user plane determines a correspondence between the data encapsulation information and the terminal identifier information.

In a possible implementation, the method provided in this embodiment of this application further includes: The interworking function network element-user plane sends information about the interworking function network element-user plane to the interworking function network element-control plane.

In a possible implementation, the method provided in this embodiment of this application further includes: The interworking function network element-user plane determines a correspondence between an address of a session of a terminal and information about a user plane network element.

In a possible implementation, the method provided in this embodiment of this application further includes: The interworking function network element-user plane receives the information about the user plane network element from the interworking function network element-control plane.

In a possible implementation, the method provided in this embodiment of this application further includes: The interworking function network element-user plane determines a correspondence between session address information and the information about the user plane network element.

In a possible implementation, the method provided in this embodiment of this application further includes: The interworking function network element-user plane receives a data packet from the access network gateway. The interworking function network element-user plane decapsulates the data packet to obtain session address information. The interworking function network element-user plane sends a decapsulated data packet to the user plane network element based on the correspondence between the session address information and the information about the user plane network element.

In a possible implementation, the method provided in this embodiment of this application further includes: The interworking function network element-user plane receives a data packet from the user plane network element, where the data packet includes session address information. The interworking function network element-user plane encapsulates the data packet by using the data encapsulation information. The interworking function network element-user plane sends the data packet encapsulated by using the data encapsulation information to the access network gateway through the user plane connection.

According to a fourth aspect, an embodiment of this application provides a control plane connection establishment method, including: An interworking function network element-control plane determines that a first control plane connection needs to be established between the interworking function network element-control plane and an access network gateway. The interworking function network element-control plane sends a second request message including terminal identifier information to a mobility management network element. The interworking, function network element-control plane receives a first security key from the mobility management network element. The interworking function network element-control plane sends the first security key to the access network gateway, where the first security key is used to establish the first control plane connection between the interworking function network element-control plane and the access network gateway.

In a possible implementation, the second request message may be a registration request message.

This embodiment of this application provides a control plane connection establishment method, After determining that the first control plane connection needs to be established between the interworking function network element-control plane and the access network gateway, the interworking function network element-control plane sends the second request message to the mobility management network element, and receives the first security key from the mobility management network element. Then, the interworking function network element-control plane sends the first security key to the access network gateway. In this way, the interworking function network element-control plane and the access network gateway can establish the first control plane connection based on the first security key, and security of a control plane message exchanged between the interworking function network element-control plane and the access network gateway can be improved.

In a possible implementation, the method provided in this embodiment of this application further includes: The interworking function network element-control plane receives a second security key from the mobility management network element, where the second security key is used to establish a second control plane connection between the interworking function network element-control plane and the mobility management network element. The interworking function network element-control plane establishes the second control plane connection based on the second security key. In this way, the interworking function network element-control plane and the mobility management network element can establish the second control plane connection based on the second security key, and security of a control plane message exchanged between the interworking function network element-control plane and the mobility management network element can be improved.

In a possible implementation, that an interworking function network element-control plane determines that a first control plane connection needs to be established between the interworking function network element-control plane and an access network gateway includes: The interworking function network element-control plane receives the registration request message from the access network gateway, where the registration request message includes the terminal identifier information and any one or more of the following information: a request for establishing a control plane connection or an authentication request message, and the authentication request message is used to request to authenticate a terminal. The interworking function network element-control plane determines, based on the registration request message, that the first control plane connection is to be established. In this way, the interworking, function network element-control plane can determine, based on a request of the access network gateway, that the first control plane connection needs to be established.

In a possible implementation, the method provided in this embodiment of this application further includes: The interworking, function network element-control plane sends, to the access network gateway, address information of a control plane message transmitted through the first control plane connection.

In a possible implementation, the address information of the control plane message may be address information of the first control plane connection. The address information of the first control plane connection includes address information of the access network gateway side and address information of the interworking function network element-control plane side. In this way, a control plane message sent by the access network gateway to the interworking function network element-control plane can be processed based on the address information of the interworking, function network element-control plane side. In addition, the interworking function network element-control plane can determine that a control plane message sent to the access network gateway is processed based on the address information of the access network gateway side.

For example, the address information of the access network gateway side may be an address allocated by the interworking function network element-control plane to the terminal.

In a possible implementation, the method provided in this embodiment of this application further includes: The interworking function network element-control plane determines that a user plane connection corresponding to a PDU session needs to be established between an interworking function network element-user plane and the access network gateway. A user plane connection corresponds to a PDU session. In this way, a user plane connection at a session granularity can be established, different sessions of the same terminal are associated with user plane connections, and a data packet carried by using each session can be transmitted through a user plane connection associated with the session.

In a possible implementation, That the interworking function network element-control plane determines that a user plane connection needs to be established between an interworking function network element-user plane and the access network gateway includes: When the interworking function network element-control plane determines that the PDU session is to be established, the interworking function network element-control plane determines that the user plane connection needs to be established between the interworking function network element-user plane and the access network gateway.

In a possible implementation, the method provided in this embodiment of this application further includes: The interworking function network element-control plane sends address information of the user plane connection to the access network gateway and the interworking function network element-user plane.

In a possible implementation, the address information of the user plane connection includes address information of the interworking function network element-user plane side and address information of the access network gateway side.

In a possible implementation, the method provided in this embodiment of this application further includes: The interworking function network element-control plane obtains a PDU session address.

In a possible implementation, the method provided in this embodiment of this application further includes: The interworking function network element-control plane sends the PDU session address to the access network gateway and the interworking function network element-user plane.

In a possible implementation, the address information of the access network gateway side in the address information of the user plane connection is associated with a local address of the terminal, and the address information of the interworking function network element-user plane side is associated with the PDU session address.

In a possible implementation, the address information of the interworking function network element-user plane side is the PDU session address.

In a possible implementation, the address information of the access network gateway side in the address information of the user plane connection may be the same as or different from the address information of the access network gateway side in the address information of the first control plane connection. This is not limited in this embodiment of this application.

According to a fifth aspect, an embodiment of this application provides a control plane connection establishment method, including: An access network gateway receives a first security key from an interworking function network element-control plane, where the first security key is used to establish a first control plane connection between the interworking function network element-control plane and the access network gateway. The access network gateway establishes the first control plane connection between the interworking function network element-control plane and the access network gateway based on the first security key.

In a possible implementation, the method provided in this embodiment of this application further includes: The access network gateway sends a registration request message to the interworking function network element-control plane, where the registration request message includes terminal identifier information and any one or more of the following information: a request for establishing a control plane connection or an authentication request message, and the authentication request message is used to request to authenticate a terminal.

In a possible implementation, the method provided in this embodiment of this application further includes: The access network gateway receives, from the interworking function network element-control plane, address information of a control plane message transmitted through the first control plane connection.

In a possible implementation, the address information of the control plane message in this embodiment of this application may be address information of the first control plane connection. The address information of the first control plane connection includes address information of the access network gateway side and address information of the interworking function network element-control plane side.

In a possible implementation, the method provided in this embodiment of this application further includes: The access network gateway receives address information of a user plane connection from the interworking function network element-control plane, where the address information of the user plane connection is used to establish the user plane connection associated with a PDU session between an interworking function network element-user plane and the access network gateway.

It should be understood that after obtaining the address information of the user plane connection, the access network gateway and the interworking function network element-user plane can establish the user plane connection based on the address information of the user plane connection.

In a possible implementation, the method provided in this embodiment of this application further includes: The access network gateway allocates a local address to the terminal. The access network gateway sends the local address to the terminal.

In a possible implementation, the method provided in this embodiment of this application further includes: The access network gateway determines a correspondence between the local address and the address information of the user plane connection. Specifically, the access network gateway determines a correspondence between the local address and address information of the interworking function network element-user plane side.

In a possible implementation, the address information of the user plane connection includes the address information of the interworking function network element-user plane side and address information of the access network gateway side.

In a possible implementation, the method provided in this embodiment of this application further includes: The access network gateway receives a data packet from the terminal, where the data packet includes the local address of the terminal. The access network gateway decapsulates the data packet to obtain the local address. The access network gateway processes a decapsulated data packet based on the local address by using the address information of the interworking function network element-user plane side, and replaces the local address in the decapsulated data packet with a second address, to obtain a processed data packet, where the second address is a device address of the access network gateway. The access network gateway sends the processed data packet to the interworking function network element-user plane. The device address of the access network gateway is an address of the access network gateway used for communication between the access network gateway and the interworking function network element-user plane.

In a possible implementation, the method provided in this embodiment of this application further includes: The access network gateway receives a data packet from the interworking function network element-user plane. The access network gateway decapsulates the data packet to obtain the address information of the access network gateway side. The access network gateway replaces the address information of the access network gateway side in a decapsulated data packet with the local address, to obtain a processed data packet. The access network gateway sends the processed data packet to the terminal.

In a possible implementation, that the access network gateway sends the processed data packet to the terminal includes: The access network gateway sends the data packet to the terminal based on a correspondence between the address information of the access network gateway side and a connection between the access network gateway and the terminal.

According to a sixth aspect, an embodiment of this application provides a control plane connection establishment method, including: A mobility management network element receives a second request message from an interworking function network element-control plane, where the second request message includes terminal identifier information. The mobility management network element sends a first security key to the interworking function network element-control plane, where the first security key is used to establish a first control plane connection between the interworking function network element-control plane and an access network gateway.

In a possible implementation, the method provided in this embodiment of this application further includes: The mobility management network element obtains a second security key, where the second security key is used to establish a second control plane connection between the interworking function network element-control plane and the mobility management network element. The mobility management network element sends the second security key to the interworking function network element-control plane.

In a possible implementation, the method provided in this embodiment of this application further includes: The mobility management network element establishes the second control plane connection between the interworking function network element-control plane and the mobility management network element based on the second security key.

According to a seventh aspect, an embodiment of this application provides a control plane connection establishment method, including: An interworking function network element-user plane receives address information of a user plane connection from an interworking function network element-control plane. The interworking function network element-user plane transmits a data packet based on the address information of the user plane connection.

In a possible implementation, the address information of the user plane connection includes address information of the interworking function network element-user plane side and address information of an access network gateway side.

In a possible implementation, the method provided in this embodiment of this application further includes: The interworking function network element-user plane receives information about a user plane network element from the interworking function network element-control plane.

In a possible implementation, the method provided in this embodiment of this application further includes: The interworking function network element-user plane obtains, from the interworking function network element-control plane, a PDU session address corresponding to the information about the user plane network element.

In a possible implementation, the method provided in this embodiment of this application further includes: The interworking function network element-user plane determines a correspondence between the PDU session address and the information about the user plane network element.

In a possible implementation, the method provided in this embodiment of this application further includes: The interworking function network element-user plane determines a correspondence between the PDU session address and the address information of the user plane connection.

In a possible implementation, that the interworking function network element-user plane transmits a data packet based on the address information of the user plane connection includes: The interworking function network element-user plane receives a data packet from the user plane network element. The interworking function network element-user plane decapsulates the data packet to obtain a PDU session address. The interworking function network element-user plane processes a decapsulated data packet based on the PDU session address by using the address information of the access network gateway side, to obtain a processed data packet. The interworking function network element-user plane sends the processed data packet to the access network gateway through the user plane connection.

In a possible implementation, that the interworking function network element-user plane transmits a data packet based on the address information of the user plane connection includes: The interworking, function network element-user plane receives a data packet from the access network gateway. The interworking function network element-user plane decapsulates the data packet to obtain the address information of the interworking function network element-user plane side and a device address of the access network gateway. The interworking, function network element-user plane processes the data packet based on the address information of the interworking function network element-user plane side and the correspondence between the PDU session address and the information about the user plane network element, and then sends a processed data packet to the user plane network element.

It should be understood that, after Obtaining the device address of the access network gateway by decapsulating the data packet, the interworking function network element-user plane can determine the access network gateway that the data packet comes froth.

According to an eighth aspect, this application provides a control plane connection establishment apparatus. The control plane connection establishment apparatus may implement the method in any one of the first aspect or the possible implementations of the first aspect, and therefore can also implement beneficial effects achieved in any one of the first aspect or the possible implementations of the first aspect. The establishment apparatus may be an interworking function network element-control plane, or may be an apparatus that can support an interworking function network element-control plane in implementing the method in any one of the first aspect or the possible implementations of the first aspect, for example, a chip applied to the interworking, function network element-control plane. The establishment apparatus may implement the method by using software, hardware, or hardware executing corresponding software.

In an example, an embodiment of this application provides a user plane connection establishment apparatus, including: a processing unit, configured to determine granularity information of a user plane connection between an interworking function network element-user plane and an access network gateway; and a communications unit, configured to send the granularity information of the user plane connection to the interworking function network element-user plane and the access network gateway, where the granularity information of the user plane connection is used to establish the user plane connection between the interworking function network element-user plane and the access network gateway.

In a possible implementation, the processing unit is specifically configured to determine the granularity information of the user plane connection based on at least one of terminal identifier information or policy information.

For specific content of the granularity information of the user plane connection, refer to the related descriptions in the first aspect. Details are not described herein again.

In a possible implementation, the communications unit is further configured to send data encapsulation information of the user plane connection to the interworking function network element-user plane and the access network gateway.

In a possible implementation, the communications unit is further configured to receive a first request message from the access network gateway, where the first request message includes the terminal identifier information and any one or more of the following information: a request for establishing the user plane connection or an authentication request message, and the authentication request message is used to request to authenticate a terminal.

In a possible implementation, the communications unit is further configured to receive the terminal identifier information and the request for establishing the user plane connection from the access network gateway.

In a possible implementation, the communications unit is further configured to send the terminal identifier information corresponding to the granularity information and session information corresponding to the terminal to the access network gateway and the interworking function network element-user plane.

In a possible implementation, the communications unit is further configured to send terminal identifier information and session information of the terminal to the access network gateway and the interworking function network element-user plane.

In a possible implementation, the communications unit is further configured to send the terminal identifier information corresponding to the data encapsulation information to the access network gateway and the interworking function network element-user plane.

In a possible implementation, the processing unit is further configured to determine user plane tunnel information, where the user plane tunnel information includes information about a user plane network element and information about the interworking, function network element-user plane. The communications unit is further configured to send the information about the interworking function network element-user plane to the user plane network element. The communications unit is further configured to send the information about the user plane network element and the session information corresponding to the terminal to the interworking function network element-user plane.

In a possible implementation, the communications unit is further configured to receive an authentication result of the terminal from a mobility management network element, where the authentication result of the terminal is used to indicate that the terminal fails to be authenticated or the terminal is successfully authenticated.

In a possible implementation, the processing unit is specifically configured to determine the granularity information of the user plane connection between the interworking function network element-user plane and the access network gateway when the terminal is successfully authenticated.

In a possible implementation, the communications unit is further configured to send the authentication result of the terminal to the access network gateway.

In another example, an embodiment of this application provides a user plane connection establishment apparatus. The user plane connection establishment apparatus may be an interworking function network element-control plane, or may be a chip in the interworking function network element-control plane. The user plane connection establishment apparatus may include a communications unit and a processing unit. The user plane connection establishment apparatus may further include a storage unit. When the user plane connection establishment apparatus is the interworking function network element-control plane, the processing unit may be a processor, the communications unit may be a communications interface or an interface circuit, and the storage unit may be a memory. The processing unit executes instructions stored in the storage unit, to enable the user plane connection establishment apparatus to implement the method described in any one of the first aspect or the possible implementations of the first aspect. When the user plane connection establishment apparatus is the chip in the interworking function network element-control plane, the processing unit may be a processor, and the communications unit may be collectively referred to as a communications interface. The processing unit executes computer program code stored in the storage unit, to enable the interworking function network element-control plane to implement the method described in any one of the first aspect or the possible implementations of the first aspect.

Optionally, the processor, the communications interface, and the memory are coupled to each other.

According to a ninth aspect, this application provides a user plane connection establishment apparatus. The user plane connection establishment apparatus may implement the method in any one of the second aspect or the possible implementations of the second aspect, and therefore can also implement beneficial effects achieved in any one of the second aspect or the possible implementations of the second aspect. The establishment apparatus may be an access network gateway, or may be an apparatus that can support an access network gateway in implementing the method in any one of the second aspect or the possible implementations of the second aspect, for example, a chip applied to the access network gateway. The establishment apparatus may implement the method by using software, hardware, or hardware executing corresponding software.

In an example, an embodiment of this application provides a user plane connection establishment apparatus, including: a communications unit, configured to receive granularity information of a user plane connection from an interworking function network element-control plane, where the granularity information of the user plane connection is used to establish the user plane connection between an interworking function network element-user plane and an access network gateway; and a processing unit, configured to establish the user plane connection between the interworking function network element-user plane and the access network gateway based on the granularity information of the user plane connection.

For details about the granularity information of the user plane connection in the ninth aspect, refer to the related descriptions in the first aspect. Details are not described herein again.

In a possible implementation, the communications unit is further configured to receive data encapsulation information of the user plane connection from the interworking function network element-control plane.

In a possible implementation, the communications unit is further configured to receive, from the interworking function network element-control plane, terminal identifier information corresponding to the data encapsulation information.

In a possible implementation, the processing unit is further configured to determine a correspondence between the data encapsulation information and the terminal identifier information.

In a possible implementation, the communications unit is further configured to send a first request message to the interworking function network element-control plane, where the first request message includes the terminal identifier information and any one or more of the following information: a request for establishing the user plane connection or an authentication request message, and the authentication request message is used to request to authenticate a terminal.

In a possible implementation, the communications unit is further configured to send the terminal identifier information and the request for establishing the user plane connection to the interworking function network element-control plane. This step can be performed only when the access network gateway determines that the terminal is successfully authenticated.

In a possible implementation, the communications unit is further configured to receive an authentication result of the terminal from the interworking function network element-control plane, where the authentication result of the terminal is used to indicate that the terminal is successfully authenticated or fails to be authenticated.

In a possible implementation, the authentication result of the terminal may be a message used to indicate that the terminal is successfully authenticated, or the authentication result of the terminal may be a message used to indicate that the terminal fails to be authenticated.

In a possible implementation, the communications unit is further configured to receive the terminal identifier information from the interworking function network element-control plane.

In a possible implementation, the processing unit is further configured to determine a correspondence between the terminal identifier information and the granularity information of the user plane connection.

In a possible implementation, the communications unit is further configured to receive the terminal identifier information and an address of a session of the terminal from the interworking function network element-control plane.

In a possible implementation, the processing unit is further configured to determine a correspondence between the terminal identifier information and session information of the terminal.

In a possible implementation, the communications unit is further configured to send the session information of the terminal to the terminal, where the session information includes address information, and the address information is used to encapsulate a data packet sent by the terminal.

In a possible implementation, the communications unit is further configured to receive the data packet from the terminal, where the data packet includes session address information. The processing unit is further configured to decapsulate the data packet to obtain the session address information. The processing unit is further configured to process the data packet based on the session address information by using the data encapsulation information. The communications unit is further configured to send a processed data packet to the interworking function network element-user plane through the user plane connection.

In a possible implementation, the processing unit is further specifically configured to: determine, based on the session address information, the terminal identifier information corresponding to the data packet, and determine, based on the terminal identifier information, the data encapsulation information corresponding to the terminal identifier information.

In a possible implementation, the communications unit is further configured to receive a data packet from the interworking function network element-user plane. The processing unit is further configured to decapsulate the data packet to obtain session address information. The communications unit is further configured to send the data packet to the terminal based on the session address information and a correspondence between the session address information and a connection between the access network gateway and the terminal.

In another example, an embodiment of this application provides a user plane connection establishment apparatus. The user plane connection establishment apparatus may be an access network gateway, or may be a chip in the access network gateway. The user plane connection establishment apparatus may include a communications unit and a processing unit. The user plane connection establishment apparatus may further include a storage unit. When the user plane connection establishment apparatus is the access network gateway, the processing unit may be a processor, the communications unit may be a communications interface or an interface circuit, and the storage unit may be a memory. The processing unit executes instructions stored in the storage unit, to enable the user plane connection establishment apparatus to implement the method described in any one of the second aspect or the possible implementations of the second aspect. When the user plane connection establishment apparatus is the chip in the access network gateway, the processing unit may be a processor, and the communications unit may be collectively referred to as a communications interface. The processing unit executes computer program code stored in the storage unit, to enable the access network gateway to implement the method described in any one of the second aspect or the possible implementations of the second aspect.

Optionally, the processor, the communications interface, and the memory are coupled to each other.

According to a tenth aspect, this application provides a user plane connection establishment apparatus. The user plane connection establishment apparatus may implement the method in any one of the third aspect or the possible implementations of the third aspect, and therefore can also implement beneficial effects achieved in any one of the third aspect or the possible implementations of the third aspect. The establishment apparatus may be an interworking, function network element-user plane, or may be an apparatus that supports an interworking function network element-user plane in implementing the method in any one of the third aspect or the possible implementations of the third aspect, for example, a chip applied to the interworking function network element-user plane. The establishment apparatus may implement the method by using software, hardware, or hardware executing corresponding software.

In an example, an embodiment of this application provides a user plane connection establishment apparatus, including: a communications unit, configured to receive granularity information of a user plane connection from an interworking function network element-control plane, where the granularity information of the user plane connection is used to establish the user plane connection between an interworking function network element-user plane and an access network gateway; and a processing unit, configured to establish the user plane connection between the interworking function network element-user plane and the access network gateway based on the granularity information of the user plane connection.

For specific content of the granularity information of the user plane connection in the tenth aspect, refer to the descriptions in the first aspect. Details are not described herein again.

In a possible implementation, the communications unit is further configured to receive, from the interworking function network element-control plane, terminal identifier information corresponding to the granularity information.

In a possible implementation, the processing unit is further configured to determine a correspondence between the granularity information and the terminal identifier information.

In a possible implementation, the communications unit is further configured to receive data encapsulation information of the user plane connection from the interworking function network element-control plane.

In a possible implementation, the communications unit is further configured to receive, from the interworking function network element-control plane, the terminal identifier information corresponding to the data encapsulation information.

In a possible implementation, the processing unit is further configured to determine a correspondence between the data encapsulation information and the terminal identifier information.

In a possible implementation, the communications unit is further configured to send information about the interworking function network element-user plane to the interworking function network element-control plane.

In a possible implementation, the processing unit is further configured to determine a correspondence between an address of a session of a terminal and information about a user plane network element.

In a possible implementation, the communications unit is further configured to receive the information about the user plane network element from the interworking function network element-control plane.

In a possible implementation, the processing unit is further configured to determine a correspondence between session address information and the information about the user plane network element.

In a possible implementation, the communications unit is further configured to receive a data packet from the access network gateway. The processing unit is further configured to decapsulate the data packet to obtain the session address information in the data packet. The communications unit is further configured to send a decapsulated data packet to the user plane network element based on the correspondence between the session address information and the information about the user plane network element.

In a possible implementation, the communications unit is further configured to receive a data packet from the user plane network element, where the data packet includes session address information. The processing unit is further configured to encapsulate the data packet by using the data encapsulation information. The communications unit is further configured to send a data packet encapsulated by using the data encapsulation information to the access network gateway through the user plane connection.

In another example, an embodiment of this application provides a user plane connection establishment apparatus. The user plane connection establishment apparatus may be an interworking function network element-user plane, or may be a chip in the interworking function network element-user plane. The user plane connection establishment apparatus may include a communications unit and a processing unit. The user plane connection establishment apparatus may further include a storage unit. When the user plane connection establishment apparatus is the interworking function network element-user plane, the processing unit may be a processor, the communications unit may be a communications interface or an interface circuit, and the storage unit may be a memory. The processing unit executes instructions stored in the storage unit, to enable the user plane connection establishment apparatus to implement the method described in any one of the third aspect or the possible implementations of the third aspect. When the user plane connection establishment apparatus is the chip in the interworking function network element-user plane, the processing unit may be a processor, and the communications unit may be collectively referred to as a communications interface. The processing unit executes computer program code stored in the storage unit, to enable the interworking function network element-user plane to implement the method described in any one of the third aspect or the possible implementations of the third aspect.

Optionally, the processor, the communications interface, and the memory are coupled to each other.

According to an eleventh aspect, this application provides a control plane connection establishment apparatus. The control plane connection establishment apparatus may implement the method in any one of the fourth aspect or the possible implementations of the fourth aspect, and therefore can also implement beneficial effects achieved in any one of the fourth aspect or the possible implementations of the fourth aspect. The establishment apparatus may be an interworking function network element-control plane, or may be an apparatus that supports an interworking function network element-control plane in implementing the method in any one of the fourth aspect or the possible implementations of the fourth aspect, for example, a chip applied to the interworking function network element-control plane. The establishment apparatus may implement the method by using software, hardware, or hardware executing corresponding software.

In an example, the control plane connection establishment apparatus includes: a processing unit, configured to determine that a first control plane connection needs to be established between the interworking function network element-control plane and an access network gateway; and a communications unit, configured to send a second request message including terminal identifier information to a mobility management network element. The communications unit is further configured to receive a first security key from the mobility management network element. The communications unit is further configured to send the first security key to the access network gateway, where the first security key is used to establish the first control plane connection between the interworking function network element-control plane and the access network gateway.

In a possible implementation, the second request message may be a registration request message.

In a possible implementation, the communications unit is further configured to receive a second security key from the mobility management network element, where the second security key is used to establish a second control plane connection between the interworking function network element-control plane and the mobility management network element. The interworking, function network element-control plane establishes the second control plane connection based on the second security key.

In a possible implementation, the communications unit is further configured to receive a registration request message from the access network gateway, where the registration request message includes the terminal identifier information and any one or more of the following information: a request for establishing a control plane connection or an authentication request message, and the authentication request message is used to request to authenticate a terminal. The processing unit is specifically configured to determine, based on the registration request message, that the first control plane connection needs to be established.

In a possible implementation, the communications unit is further configured to send, to the access network gateway, address information of a control plane message transmitted through the first control plane connection.

In a possible implementation, the address information of the control plane message may be address information of the first control plane connection. The address information of the first control plane connection includes address information of the access network gateway side and address information of the interworking function network element-control plane side.

In a possible implementation, the processing unit is further configured to determine that a user plane connection corresponding to a PDU session needs to be established between an interworking function network element-user plane and the access network gateway.

In a possible implementation, the processing unit is further specifically configured to: when determining that the PDU session is to be established, determine that the user plane connection needs to be established between the interworking function network element-user plane and the access network gateway.

In a possible implementation, the communications unit is further configured to send address information of the user plane connection to the access network gateway and the interworking function network element-user plane.

For content of the address information of the user plane connection, refer to the related descriptions in the foregoing embodiments. Details are not described herein again.

In a possible implementation, the processing unit is further configured to obtain a PDU session address.

In another example, an embodiment of this application provides a control plane connection establishment apparatus. The control plane connection establishment apparatus may be an interworking function network element-control plane, or may be a chip in the interworking function network element-control plane. The control plane connection establishment apparatus may include a communications unit and a processing unit. The control plane connection establishment apparatus may further include a storage unit. When the control plane connection establishment apparatus is the interworking function network element-control plane, the processing unit may be a processor, the communications unit may be a communications interface or an interface circuit, and the storage unit may be a memory. The processing unit executes instructions stored in the storage unit, to enable the control plane connection establishment apparatus to implement the method described in any one of the fourth aspect or the possible implementations of the fourth aspect. When the control plane connection establishment apparatus is the chip in the interworking function network element-control plane, the processing unit may be a processor, and the communications unit may be collectively referred to as a communications interface. The processing unit executes computer program code stored in the storage unit, to enable the interworking function network element-control plane to implement the method described in any one of the fourth aspect or the possible implementations of the fourth aspect.

Optionally, the processor, the communications interface, and the memory are coupled to each other.

According to a twelfth aspect, this application provides a control plane connection establishment apparatus. The control plane connection establishment apparatus may implement the method in any one of the fifth aspect or the possible implementations of the fifth aspect, and therefore can also implement beneficial effects achieved in any one of the fifth aspect or the possible implementations of the fifth aspect. The establishment apparatus may be an access network gateway, or may be an apparatus that can support an access network gateway in implementing the method in any one of the fifth aspect or the possible implementations of the fifth aspect, for example, a chip applied to the access network gateway. The establishment apparatus may implement the method by using software, hardware, or hardware executing corresponding software.

In an example, the control plane connection establishment apparatus includes: a communications unit, configured to receive a first security key from an interworking function network element-control plane, where the first security key is used to establish a first control plane connection between the interworking function network element-control plane and an access network gateway; and a processing unit, configured to establish the first control plane connection between the interworking function network element-control plane and the access network gateway based on the first security key.

In a possible implementation, the communications unit is further configured to send a registration request message to the interworking function network element-control plane, where the registration request message includes terminal identifier information and any one or more of the following information: a request for establishing a control plane connection or an authentication request message, and the authentication request message is used to request to authenticate a terminal.

In a possible implementation, the communications unit is further configured to receive, from the interworking function network element-control plane, address information of a control plane message transmitted through the first control plane connection.

In a possible implementation, the address information of the control plane message in this embodiment of this application may be address information of the first control plane connection. The address information of the first control plane connection includes address information of the access network gateway side and address information of the interworking function network element-control plane side.

In a possible implementation, the communications unit is further configured to receive address information of a user plane connection from the interworking function network element-control plane, where the address information of the user plane connection is used to establish the user plane connection that corresponds to a session of the terminal and that is between an interworking function network element-user plane and the access network gateway.

In a possible implementation, the processing unit is further configured to allocate a local address to the terminal. The communications unit is further configured to send the local address to the terminal.

In a possible implementation, the processing unit is further configured to determine a correspondence between the local address and the address information of the user plane connection.

In a possible implementation, the communications unit is further configured to receive a data packet from the terminal, where the data packet includes the local address of the terminal. The processing unit is further configured to decapsulate the data packet to obtain the local address. The processing unit is further configured to process a decapsulated data packet based on the local address by using address information of the interworking function network element-user plane side, and replaces the local address in the decapsulated data packet with a second address, to obtain a processed data packet, where the second address is a device address of the access network gateway. The communications unit is further configured to send the processed data packet to the interworking function network element-user plane through the user plane connection.

In a possible implementation, the communications unit is further configured to receive a data packet from the interworking function network element-user plane. The processing unit is further configured to decapsulate the data packet to obtain address information of the access network gateway side. The processing unit is further configured to replace the address information of the access network gateway side in a decapsulated data packet with the local address, to obtain a processed data packet. The communications unit is further configured to send the processed data packet to the terminal.

In a possible implementation, the communications unit is further specifically configured to send the data packet to the terminal based on a correspondence between the address information of the access network gateway side and a connection between the access network gateway and the terminal.

In another example, an embodiment of this application provides a control plane connection establishment apparatus. The control plane connection establishment apparatus may be an access network gateway, or may be a chip in the access network gateway. The control plane connection establishment apparatus may include a communications unit and a processing unit. The control plane connection establishment apparatus may further include a storage unit. When the control plane connection establishment apparatus is the access network gateway, the processing unit may be a processor, the storage unit may be a memory, and the communications unit may be a communications interface or an interface circuit. The processing unit executes instructions stored in the storage unit, to enable the control plane connection establishment apparatus to implement the method described in any one of the fifth aspect or the possible implementations of the fifth aspect. When the control plane connection establishment apparatus is the chip in the access network gateway, the processing unit may be a processor, and the communications unit may be collectively referred to as a communications interface. The processing unit executes computer program code stored in the storage unit, to enable the access network gateway to implement the method described in any one of the fifth aspect or the possible implementations of the fifth aspect.

Optionally, the processor, the communications interface, and the memory are coupled to each other.

According to a thirteenth aspect, this application provides a control plane connection establishment apparatus. The control plane connection establishment apparatus may implement the method in any one of the sixth aspect or the possible implementations of the sixth aspect, and therefore can also implement beneficial effects achieved in any one of the sixth aspect or the possible implementations of the sixth aspect. The establishment apparatus may be a mobility management network element, or may be an apparatus that can support a mobility management network element in implementing the method in any one of the sixth aspect or the possible implementations of the sixth aspect, for example, a chip applied to the mobility management network element. The establishment apparatus may implement the method by using software, hardware, or hardware executing corresponding software.

In an example, an embodiment of this application provides a control plane connection establishment apparatus, including: a communications unit, configured to receive a second request message from an interworking function network element-control plane, where the second request message includes terminal identifier information. The communications unit is configured to send a first security key to the interworking function network element-control plane, where the first security key is used to establish a first control plane connection between the interworking function network element-control plane and an access network gateway.

In a possible implementation, the communications unit is configured to obtain a second security key, where the second security key is used to establish a second control plane connection between the interworking function network element-control plane and a mobility management network element. The communications unit is configured to send the second security key to the interworking function network element-control plane.

In a possible implementation, the establishment apparatus further includes: a processing unit, configured to establish the second control plane connection between the interworking function network element-control plane and the mobility management network element based on the second security key.

In another example, an embodiment of this application provides a control plane connection establishment apparatus. The control plane connection establishment apparatus may be a mobility management network element, or may be a chip in the mobility management network element. The control plane connection establishment apparatus may include a communications unit and a processing unit. The control plane connection establishment apparatus may further include a storage unit. When the control plane connection establishment apparatus is the mobility management network element, the processing unit may be a processor, the storage unit may be a memory, and the communications unit may be a communications interface or an interface circuit. The processing unit executes instructions stored in the storage unit, to enable the control plane connection establishment apparatus to implement the method described in any one of the sixth aspect or the possible implementations of the sixth aspect. When the control plane connection establishment apparatus is the chip in the mobility management network element, the processing unit may be a processor, and the communications unit may be collectively referred to as a communications interface. The processing unit executes computer program code stored in the storage unit, to enable the mobility management network element to implement the method described in any one of the sixth aspect or the possible implementations of the sixth aspect.

Optionally, the processor, the communications interface, and the memory are coupled to each other.

According to a fourteenth aspect, this application provides a control plane connection establishment apparatus. The control plane connection establishment apparatus may implement the method in any one of the seventh aspect or the possible implementations of the seventh aspect, and therefore can also implement beneficial effects achieved in any one of the seventh aspect or the possible implementations of the seventh aspect. The establishment apparatus may be an interworking function network element-user plane, or may be an apparatus that can support an interworking function network element-user plane in implementing the method in any one of the seventh aspect or the possible implementations of the seventh aspect, for example, a chip applied to the interworking function network element-user plane. The establishment apparatus may implement the method by using software, hardware, or hardware executing corresponding software.

In an example, an embodiment of this application provides a control plane connection establishment apparatus, including: a communications unit, configured to receive address information of a user plane connection from an interworking function network element-control plane. The communications unit is configured to transmit a data packet based on the address information of the user plane connection.

In a possible implementation, the address information of the user plane connection includes address information of the interworking function network element-user plane side and address information of an access network gateway side.

In a possible implementation, the communications unit is further configured to receive information about a user plane network element from the interworking function network element-control plane.

In a possible implementation, the communications unit is further configured to obtain a PDU session address from the interworking function network element-control plane.

In a possible implementation, the processing unit is further configured to: determine a correspondence between the PDU session address and the information about the user plane network element, and determine a correspondence between the PDU session address and information about the interworking function network element-user plane.

In a possible implementation, the communications unit is specifically configured to receive a data packet from the user plane network element. The processing unit is specifically configured to decapsulate the data packet to obtain a PDU session address carried in the data packet. The processing unit is specifically configured to process a decapsulated data packet based on the PDU session address by using the address information of the access network gateway side, to obtain a processed data packet. The communications unit is further specifically configured to send the processed data packet to the access network gateway through the user plane connection.

In a possible implementation, the communications unit is specifically configured to receive a data packet from the access network gateway. The processing unit is further configured to decapsulate the data packet to obtain the address information of the interworking function network element-user plane side and a device address of the access network gateway that are carried in the data packet. The processing unit is further configured to process the data packet based on the address information of the interworking function network element-user plane side and the correspondence between the PDU session address and the information about the user plane network element. The communications unit is further configured to send a processed data packet to the user plane network element.

In another example, an embodiment of this application provides a control plane connection establishment apparatus. The control plane connection establishment apparatus may be an interworking function network element-user plane, or may be a chip in the interworking function network element-user plane. The control plane connection establishment apparatus may include a communications unit and a processing unit. The control plane connection establishment apparatus may further include a storage unit. When the control plane connection establishment apparatus is the interworking function network element-user plane, the processing unit may be a processor, the storage unit may be a memory, and the communications unit may be a communications interface or an interface circuit. The processing unit executes instructions stored in the storage unit, to enable the control plane connection establishment apparatus to implement the method described in any one of the seventh aspect or the possible implementations of the seventh aspect. When the control plane connection establishment apparatus is the chip in the interworking function network element-user plane, the processing unit may be a processor, and the communications unit may be collectively referred to as a communications interface. The processing unit executes computer program code stored in the storage unit, to enable the interworking function network element-user plane to implement the method described in any one of the seventh aspect or the possible implementations of the seventh aspect.

Optionally, the processor, the communications interface, and the memory are coupled to each other.

According to a fifteenth aspect, an embodiment of this application provides a computer-readable storage medium. The computer-readable storage medium stores a computer program or instructions. When the computer program or the instructions are run on a computer, the computer is enabled to perform the user plane connection establishment method described in any one of the first aspect or the possible implementations of the first aspect.

According to a sixteenth aspect, an embodiment of this application provides a computer-readable storage medium. The computer-readable storage medium stores a computer program or instructions. When the computer program or the instructions are run on a computer, the computer is enabled to perform the user plane connection establishment method described in any one of the second aspect or the possible implementations of the second aspect.

According to a seventeenth aspect, an embodiment of this application provides a computer-readable storage medium. The computer-readable storage medium stores a computer program or instructions. When the computer program or the instructions are run on a computer, the computer is enabled to perform the user plane connection establishment method described in any one of the third aspect or the possible implementations of the third aspect.

According to an eighteenth aspect, an embodiment of this application provides a computer-readable storage medium. The computer-readable storage medium stores a computer program or instructions. When the computer program or the instructions are run on a computer, the computer is enabled to perform the control plane connection establishment method described in any one of the fourth aspect or the possible implementations of the fourth aspect.

According to a nineteenth aspect, an embodiment of this application provides a computer-readable storage medium. The computer-readable storage medium stores a computer program or instructions. When the computer program or the instructions are run on a computer, the computer is enabled to perform the control plane connection establishment method described in any one of the fifth aspect or the possible implementations of the fifth aspect.

According to a twentieth aspect, an embodiment of this application provides a computer-readable storage medium. The computer-readable storage medium stores a computer program or instructions. When the computer program or the instructions are run on a computer, the computer is enabled to perform the control plane connection establishment method described in any one of the sixth aspect or the possible implementations of the sixth aspect.

According to a twenty-first aspect, an embodiment of this application provides a computer-readable storage medium. The computer-readable storage medium stores a computer program or instructions. When the computer program or the instructions are run on a computer, the computer is enabled to perform the control plane connection establishment method described in any one of the seventh aspect or the possible implementations of the seventh aspect.

According to a twenty-second aspect, an embodiment of this application provides a computer program product including instructions. When the instructions are run on a computer, the computer is enabled to perform the user plane connection establishment method described in any one of the first aspect or the possible implementations of the first aspect.

According to a twenty-third aspect, this application provides a computer program product including instructions. When the instructions are run on a computer, the computer is enabled to perform the user plane connection establishment method described in any one of the second aspect or the possible implementations of the second aspect.

According to a twenty-fourth aspect, an embodiment of this application provides a computer program product including instructions. When the instructions are run on a computer, the computer is enabled to perform the user plane connection establishment method described in any one of the third aspect or the possible implementations of the third aspect.

According to a twenty-fifth aspect, an embodiment of this application provides a computer program product including instructions. When the instructions are run on a computer, the computer is enabled to perform the control plane connection establishment method described in any one of the fourth aspect or the possible implementations of the fourth aspect.

According to a twenty-sixth aspect, an embodiment of this application provides a computer program product including instructions. When the instructions are run on a computer, the computer is enabled to perform the control plane connection establishment method described in any one of the fifth aspect or the possible implementations of the fifth aspect.

According to a twenty-seventh aspect, an embodiment of this application provides a computer program product including instructions. When the instructions are run on a computer, the computer is enabled to perform the control plane connection establishment method described in any one of the sixth aspect or the possible implementations of the sixth aspect.

According to a twenty-eighth aspect, an embodiment of this application provides a computer program product including instructions. When the instructions are run on a computer, the computer is enabled to perform the control plane connection establishment method described in any one of the seventh aspect or the possible implementations of the seventh aspect.

According to a twenty-ninth aspect, an embodiment of this application provides a communications system. The communications system includes the user plane connection establishment apparatus described in any one of the eighth aspect or the possible implementations of the eighth aspect, and the user plane connection establishment apparatus described in any one of the ninth aspect or the possible implementations of the ninth aspect.

In an optional implementation, the system may further include the user plane connection establishment apparatus described in any one of the tenth aspect or the possible implementations of the tenth aspect.

According to a thirtieth aspect, an embodiment of this application provides a communications system. The communications system includes the control plane connection establishment apparatus described in any one of the eleventh aspect or the possible implementations of the eleventh aspect, and the control plane connection establishment apparatus described in any one of the twelfth aspect or the possible implementations of the twelfth aspect.

In an optional implementation, the system may further include the control plane connection establishment apparatus described in any one of the thirteenth aspect or the possible implementations of the thirteenth aspect, and the control plane connection establishment apparatus described in any one of the fourteenth aspect or the possible implementations of the fourteenth aspect.

According to a this thirty-first aspect, an embodiment of this application provides a communications apparatus. The communications apparatus includes a processor and a storage medium. The storage medium stores instructions. The instructions are run by the processor, to implement the user plane connection establishment method described in any one of the first aspect or the possible implementations of the first aspect.

According to a thirty-second aspect, an embodiment of this application provides a communications apparatus. The communications apparatus includes a processor and a storage medium. The storage medium stores instructions. The instructions are run by the processor, to implement the user plane connection establishment method described in any one of the second aspect or the possible implementations of the second aspect.

According to a thirty-third aspect, an embodiment of this application provides a communications apparatus. The communications apparatus includes a processor and a storage medium. The storage medium stores instructions. The instructions are run by the processor, to implement the user plane connection establishment method described in any one of the third aspect or the possible implementations of the third aspect.

According to a thirty-fourth aspect, an embodiment of this application provides a communications apparatus. The communications apparatus includes a processor and a storage medium. The storage medium stores instructions. The instructions are run by the processor, to implement the control plane connection establishment method described in any one of the fourth aspect or the possible implementations of the fourth aspect.

According to a thirty-fifth aspect, an embodiment of this application provides a communications apparatus. The communications apparatus includes a processor and a storage medium. The storage medium stores instructions. The instructions are run by the processor, to implement the control plane connection establishment method described in any one of the fifth aspect or the possible implementations of the fifth aspect.

According to a thirty-sixth aspect, an embodiment of this application provides a communications apparatus. The communications apparatus includes a processor and a storage medium. The storage medium stores instructions. The instructions are run by the processor, to implement the control plane connection establishment method described in any one of the sixth aspect or the possible implementations of the sixth aspect.

According to a thirty-seventh aspect, an embodiment of this application provides a communications apparatus. The communications apparatus includes a processor and a storage medium. The storage medium stores instructions. The instructions are run by the processor, to implement the control plane connection establishment method described in any one of the seventh aspect or the possible implementations of the seventh aspect.

According to a thirty-eighth aspect, an embodiment of this application provides a communications apparatus. The communications apparatus includes one or more modules, configured to implement the method in the first aspect, the second aspect, the third aspect, the fourth aspect, the fifth aspect, the sixth aspect, or the seventh aspect. The one or more modules may correspond to the steps in the method in the first aspect, the second aspect, the third aspect, the fourth aspect, the fifth aspect, the sixth aspect, or the seventh aspect.

According to a thirty-ninth aspect, an embodiment of this application provides a chip. The chip includes a processor and a communications interface. The communications interface is coupled to the processor. The processor is configured to run a computer program or instructions, to implement the user plane connection establishment method described in any one of the first aspect or the possible implementations of the first aspect. The communications interface is configured to communicate with another module located outside the chip.

According to a fortieth aspect, an embodiment of this application provides a chip. The chip includes a processor and a communications interface. The communications interface is coupled to the processor. The processor is configured to run a computer program or instructions, to implement the user plane connection establishment method described in any one of the second aspect or the possible implementations of the second aspect. The communications interface is configured to communicate with another module located outside the chip.

According to a forty-first aspect, an embodiment of this application provides a chip. The chip includes a processor and a communications interface. The communications interface is coupled to the processor. The processor is configured to run a computer program or instructions, to implement the user plane connection establishment method described in any one of the third aspect or the possible implementations of the third aspect. The communications interface is configured to communicate with another module located outside the chip.

According to a forty-second aspect, an embodiment of this application provides a chip. The chip includes a processor and a communications interface. The communications interface is coupled to the processor. The processor is configured to run a computer program or instructions, to implement the control plane connection establishment method described m any one of the fourth aspect or the possible implementations of the fourth aspect. The communications interface is configured to communicate with another module located outside the chip.

According to a forty-third aspect, an embodiment of this application provides a chip. The chip includes a processor and a communications interface. The communications interface is coupled to the processor. The processor is configured to run a computer program or instructions, to implement the control plane connection establishment method described in any one of the fifth aspect or the possible implementations of the fifth aspect. The communications interface is configured to communicate with another module located outside the chip.

According to a forty-fourth aspect, an embodiment of this application provides a chip. The chip includes a processor and a communications interface. The communications interface is coupled to the processor. The processor is configured to run a computer program or instructions, to implement the control plane connection establishment method described in any one of the sixth aspect or the possible implementations of the sixth aspect. The communications interface is configured to communicate with another module located outside the chip.

According to a forty-fifth aspect, an embodiment of this application provides a chip. The chip includes a processor and a communications interface. The communications interface is coupled to the processor. The processor is configured to run a computer program or instructions, to implement the control plane connection establishment method described in any one of the seventh aspect or the possible implementations of the seventh aspect. The communications interface is configured to communicate with another module located outside the chip.

Specifically, the chip provided in the embodiments of this application further includes a memory, configured to store the computer program or the instructions.

According to a forty-sixth aspect, an embodiment of this application provides a communications apparatus. The communications apparatus includes a processor. The processor is coupled to a memory. The memory stores instructions. The processor is configured to run the instructions, to implement the user plane connection establishment method described in any one of the first aspect or the possible implementations of the first aspect.

According to a forty-seventh aspect, an embodiment of this application provides a communications apparatus. The communications apparatus includes a processor. The processor is coupled to a memory. The memory stores instructions. The processor is configured to run the instructions, to implement the user plane connection establishment method described in any one of the second aspect or the possible implementations of the second aspect.

According to a forty-eighth aspect, an embodiment of this application provides a communications apparatus. The communications apparatus includes a processor. The processor is coupled to a memory. The memory stores instructions. The processor is configured to run the instructions, to implement the user plane connection establishment method described in any one of the third aspect or the possible implementations of the third aspect.

According to a forty-ninth aspect, an embodiment of this application provides a communications apparatus. The communications apparatus includes a processor. The processor is coupled to a memory. The memory stores instructions. The processor is configured to run the instructions, to implement the control plane connection establishment method described in any one of the fourth aspect or the possible implementations of the fourth aspect.

According to a fiftieth aspect, an embodiment of this application provides a communications apparatus. The communications apparatus includes a processor. The processor is coupled to a memory. The memory stores instructions. The processor is configured to run the instructions, to implement the control plane connection establishment method described in any one of the fifth aspect or the possible implementations of the fifth aspect.

According to a fifty-first aspect, an embodiment of this application provides a communications apparatus. The communications apparatus includes a processor. The processor is coupled to a memory. The memory stores instructions. The processor is configured to run the instructions, to implement the control plane connection establishment method described in any one of the sixth aspect or the possible implementations of the sixth aspect.

According to a fifty-second aspect, an embodiment of this application provides a communications apparatus. The communications apparatus includes a processor. The processor is coupled to a memory. The memory stores instructions. The processor is configured to run the instructions, to implement the control plane connection establishment method described in any one of the seventh aspect or the possible implementations of the seventh aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

BRIEF DESCRIPTION OF DRAWINGS

FIG. 10A to FIG. 10D are a specific schematic flowchart of another user plane connection establishment method according to an embodiment of this application;

DESCRIPTION OF EMBODIMENTS

Figure 1:
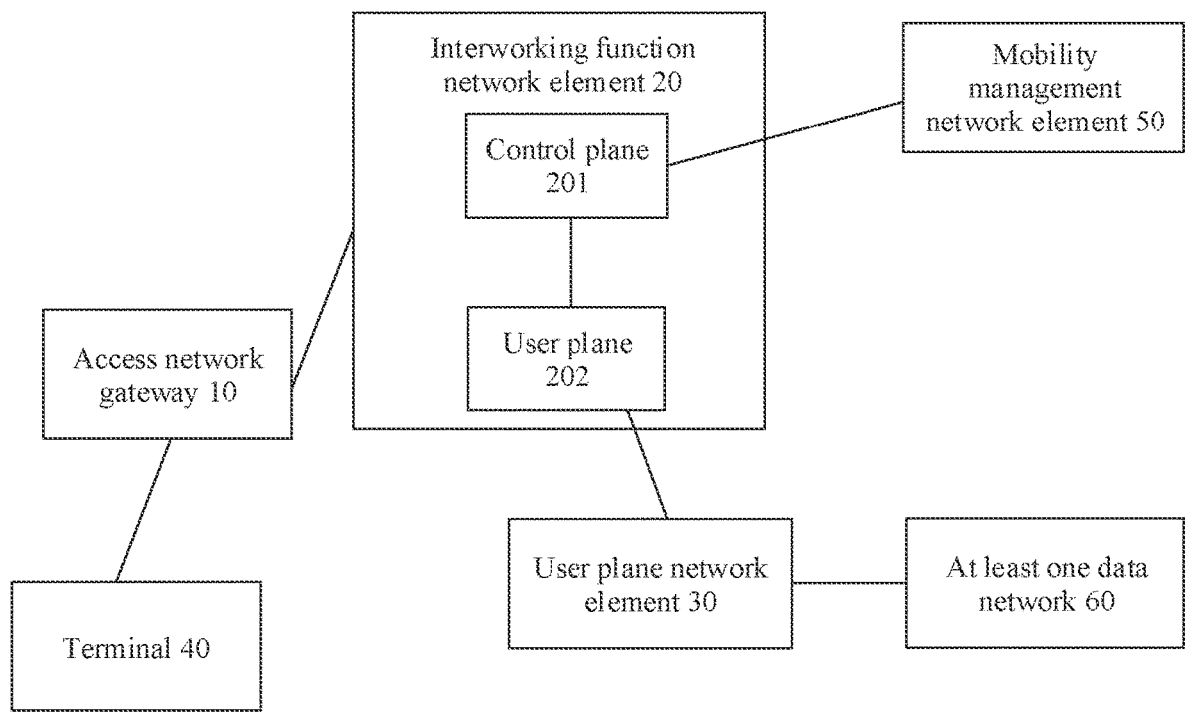
FIG. 1 is a diagram of a system architecture of a communications system according to an embodiment of this application.

In the embodiments of this application, terms such as "first" and "second" are used to distinguish between same items or similar items that have basically same functions and purposes, to clearly describe the technical solutions in embodiments of this application. For example, a first address and a second address are merely intended to distinguish between different addresses, but do not constitute a limitation on a sequence of the first address and the second address. A person skilled in the art may understand that the terms such as "first" and "second" do not constitute a limitation on a quantity or an execution sequence, and the terms such as "first" and "second" do not indicate a definite difference.

It should be noted that, in this application, the term such as "example" or "for example" is used to indicate an example, an illustration, or a description. Any embodiment or design solution described as an "example" or "for example" in this application should not be explained as being more preferred or having more advantages than another embodiment or design solution. Exactly, use of the word such as "example" or "for example" is intended to present a related concept in a specific manner.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be in a singular or plural form. The character "/" usually indicates an "or" relationship between associated objects. "At least one of the following items (pieces)" or a similar expression thereof means any combination of these items, including any combination of singular items (pieces) or plural items (pieces). For example, at least one (piece) of a, b, or c may represent a, b, c, a and b, a and c, b and c, or a, b, and c, where a, b, and c may be in a singular or plural form.

The technical solutions in the embodiments of this application may be applied to various communications systems, for example, code division multiple access (CDMA), time division multiple access (TDMA), frequency division multiple access (FDMA), orthogonal frequency division multiple access (OFDMA), single carrier frequency division multiple access (SC-FDMA), and another system. The terms "system" and "network" may be interchanged. A new release of UMTS, namely, E-UTRA, is used in 3GPP long term evolution (LTE) and various releases evolved based on LTE. A 5G communications system and new radio (NR) are next-generation communications systems that are under research. In addition, the communications systems are also applicable to a future-oriented communications technology, and are applicable to the technical solutions provided in the embodiments of this application.

A system architecture and a service scenario that are described in the embodiments of this application are intended to describe the technical solutions in the embodiments of this application more clearly, but do not constitute a limitation on the technical solutions provided in the embodiments of this application. A person of ordinary skill in the art may know that: With evolution of network architectures and emergence of new service scenarios, the technical solutions provided in the embodiments of this application are also applicable to a similar technical issue.

FIG. 1 is a schematic diagram of an architecture of a communications system according to an embodiment of this application. As shown in FIG. 1, the communications system includes an access network gateway 10, an interworking function network element 20 that communicates with the access network gateway 10, and a user plane network element 30 that communicates with the interworking function network element 20.

The access network gateway 10 is a gateway in a wireline network (which may also be referred to as a fixed network).

In a possible embodiment, the communications system may further include a terminal 40 and a mobility management network element 50 that communicates with the interworking function network element 20. The terminal 40 accesses the access network gateway 10 by using a wireline access network (AN), and accesses a core network (CN) by using the interworking function network element 20. The core network is used to provide a service for the terminal 40. The core network includes a network element that provides a service for the terminal 40, It should be understood that both the mobility management network element 50 and the user plane network element 30 are network elements in the core network.

In an optional implementation, the user plane network element 30 is further connected to at least one data network (DN) 60. The at least one data network 60 may be an operator network that provides a data transmission service for the terminal 40.

Because the core network can support control plane and user plane separation, in a fixed mobile convergence scenario, the interworking, function network element 20 may also be divided into a control plane (CP) and a user plane (UP). The control plane 201 of the interworking function network element 20 communicates with the mobility management network element 50 through a first interface and a second interface. The user plane 202 of the interworking function network element 20 communicates with the user plane network element 30 through a third interface.

Figure 2:
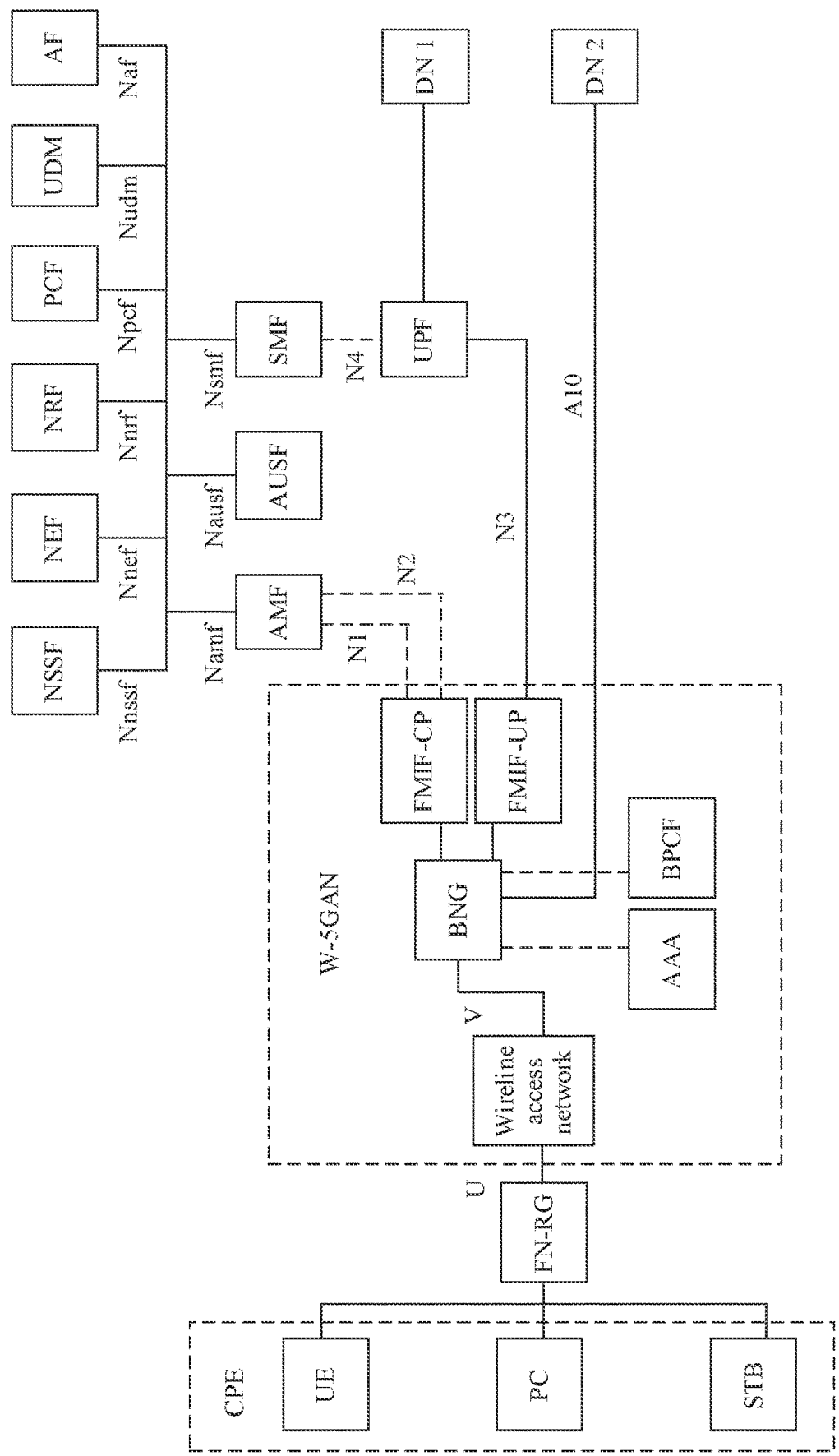
FIG. 2 is a diagram of a specific system architecture of a communications system according to an embodiment of this application.

For example, as shown in FIG. 2, the core network may be a 5G core network (5GC). A network element or an entity corresponding to the mobility management network element 50 may be an access and mobility management function (AMF) network element in the 5GC. A network element or an entity corresponding to a session management network element may be a session management function (SMF) network element in the 5GC. A network element or an entity corresponding to a policy control network element may be a policy control function (PCF) network element in the 5GC. A network element or an entity corresponding to the user plane network element 30 may be a user plane function (UPF) network element.

For example, the terminal 40 accesses the core network by using the wireline network, the terminal 40 is a fixed network residential gateway (FN-RG), the access network gateway 10 is a broadband network gateway (BNG), and the interworking function network element 20 is a fixed mobile interworking function (FMIF). The FN-RG accesses the 5GC by using the wireline access network, the BNG, and the FMIF. As shown in FIG. 2, customer premises equipment (CPE) (for example, the FN-RG) accesses the BNG by using the wireline access network/a fixed network access network. The BNG is connected to an authentication, authorization and accounting (AAA) network element, a broadband policy control function (BPCF), and the FMIF. The FMIF includes an FMIF-CP and an FMIF-UP, The first interface may be an N1 interface, the second interface may be an N2 interface, and the third interface may be an N3 interface. The wireline access network, the BNG, the AAA, the BPCF, the FMIF-CP, and the FMIF-UP are network elements in the wireline network.

As shown in FIG. 2, the AMF network element communicates with the FMIF-CP through the N2 interface and the N1 interface. The AMF network element that communicates with the FMIF-CP through the N1 interface and the N2 interface constitutes a control plane connection between the FMIF and the 5GC. The UPF network element communicates with the FMIF-UP through the N3 interface. The UPF network element is connected to the at least one data network. The UPF network element that communicates with the FMIF-UP through N3 constitutes a user plane connection between the FMIF and the 5GC.

The CPE in this embodiment of this application may be UE, a personal computer (PC), or a set top box (STB).

In FIG. 2, for example, the AAA and the BPCF are integrated into a fixed network. Certainly, the AAA and the BPCF may alternatively be separated from the fixed network. For example, the AAA and the BPCF may alternatively be integrated into the 5GC side.

Figure 3:
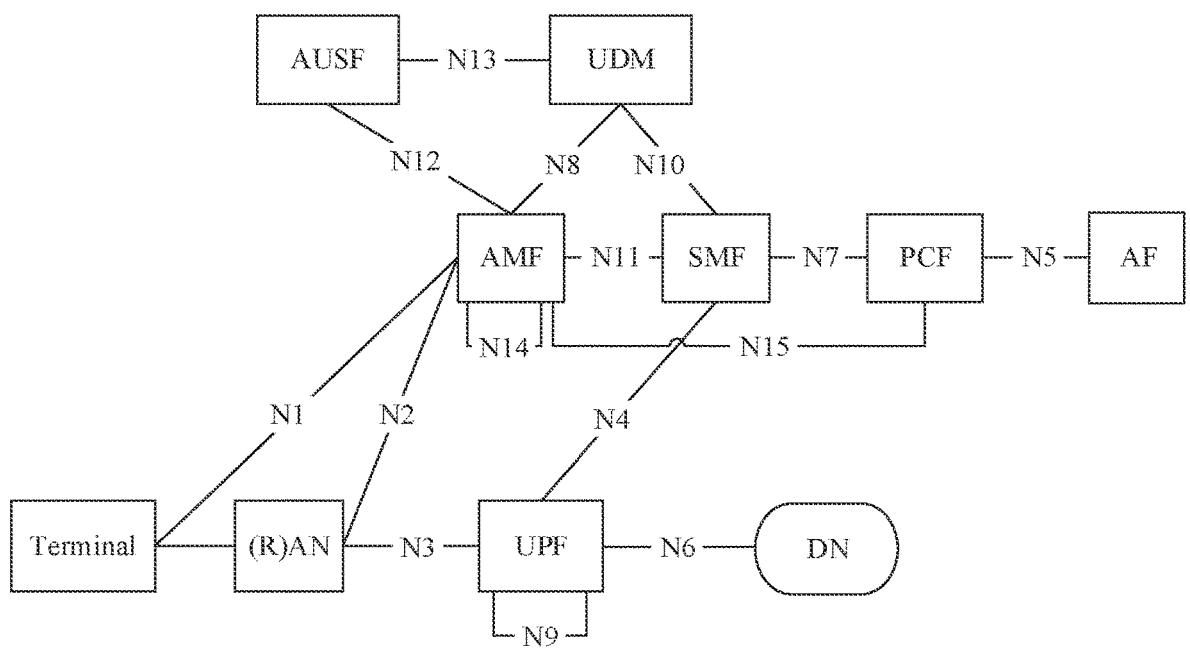
FIG. 3 is a diagram of a system architecture of a 5G network according to an embodiment of this application.

In addition, as shown in FIG. 3, the 5G network architecture may further include an authentication server function (AUSF) network element, a unified data repository (UDR), a unified data management (UDM) network element, a binding support function (BSF), a network repository function (NRF) network element, an application function (AF), a network slice selection function (NSSF) network element, and the like. This is not specifically limited in this embodiment of this application.

The terminal communicates with the AMF network element through an N1 interface (N1 for short). The AMF entity communicates with the SMF network element through an N11 interface (N11 for short). The SMF network element communicates with one or more UPF network elements through an N4 interface (N4 for short). Any two of the one or more UPF network elements communicate with each other through an N9 interface (N9 for short). The UPF network element communicates, through an N6 interface (N6 for short), with the data network (data network, DN) managed and controlled by the AF network element. The terminal accesses a network by using an access device (for example, a RAN device), The access device communicates with the AMF network element through an N2 interface (N2 for short). The AMF network element, the SMF network element, the UDM network element, and the PCF network element interact with each other through a service-based interface. For example, an external service-based interface provided by the AMF network element may be Namf, an external service-based interface provided by the SMF network element may be Nsmf, an external service-based interface provided by the UDM network element may be Nudm, and an external service-based interface provided by the PCF network element may be Npcf. It should be understood that for related descriptions of names of various service-based interfaces, reference may be made to a diagram of a 5G system architecture in the standard 23501. Details are not described herein.

Certainly, a control plane network element in the core network (for example, the AMF network element, the SMF network element, the UDM network element, or the PCF network element) may also perform communication based on an interface. For example, as shown in FIG. 3, the SMF network element communicates with the PCF network element through an N7 interface (N7 for short), and the PCF network element communicates with the AF network element through an N5 interface. The access device communicates with the UPF network element through an N3 interface (N3 for short). Any two AMF network elements communicate with each other through an N14 interface (N14 for short). The SMF network element communicates with the UDM through an N10 interface (N10 for short). The AMF network element communicates with the AUSF through an N12 interface (N12 for short). The AUSF network element communicates with the UDM network element through an N13 interface (N13 for short). The ANTE network element communicates with the UDM network element through an N8 interface (N8 for short).

It should be noted that FIG. 2 or FIG. 3 merely shows an example in which there is one UPF network element and one SMF network element. Certainly, the system architecture may include a plurality of UPF network elements and SMF network elements, for example, include an SMF network element 1 and an SMF network element 2. This is not specifically limited in this embodiment of this application.

It should be noted that the access device, the AMF network element, the SWF network element, the UDM network element, the UPF network element, the PCF network element, and the like in FIG. 2 or FIG. 3 are merely names, and the names do not constitute any limitation on the devices. In a 5G network and another future network, network elements corresponding to the access device, the AMF network element, the SMF network element, the UDM network element, the UPF network element, and the PCF network element may have other names. This is not specifically limited in this embodiment of this application. For example, the UDM network element may alternatively be replaced with a home subscriber server (HSS), a user subscription database (USD), a database entity, or the like. A general description is provided herein, and details are not described below.

The AMF network element is mainly responsible for mobility management in a mobile network, such as user location update, registration of a user with a network, and handover for a user.

The SMF network element is mainly responsible for session management in the mobile network, such as session establishment, modification, and release. For example, specific functions are assigning an IP address to the user and selecting a UPF network element that provides a packet forwarding function.

The PCF network element is responsible for providing a policy, such as a quality of service QoS policy and a slice selection policy, for the AMF network element and the SMF network element.

The UDM network element is configured to store user data such as subscription information and authentication/authorization information.

The UPF network element is mainly responsible for processing such as forwarding and charging for a user packet.

The DN is an operator network that provides a data transmission service for the user, such as an IP multimedia service (IMS) or the internet.

The terminal accesses a data network (DN) by using a session (PDU session) established from the terminal to the RAN, the UPF network element, and the DN.

The terminals (terminal) in the embodiments of this application may include various devices that have a wireless communication function and that can be connected to the mobile network, for example, a handheld device, a vehicle-mounted device, a wearable device, a computing device, or another processing device connected to a wireless modem, or may include a subscriber unit, a cellular phone, a smartphone, a wireless data card, a personal digital assistant (PDA) computer, a tablet computer, a wireless modem, a handheld device (handheld), a laptop computer, a cordless phone, a wireless local loop (WLL) station, a machine type communication (MTC) terminal, user equipment (UE), a mobile station (MS), a terminal device, and relay user equipment. In the following embodiments of this application, the terminal is 5GC capable user equipment. For example, the terminal is an FN-RG.

The following briefly describes network elements in the embodiments of this application.

1. A user plane network element is configured to perform packet routing and forwarding, quality of service (QoS) handling of user plane data, and the like.

In a 5G communications system, the user plane network element may be a UPF network element. In a future communications system, the UPF network element may also have another name. This is not limited in this application.

2. A data network element is configured to provide a network for data transmission.

In a 5G communications system the data network element may be a DN. In a future communications system, the data network element may still be a DN, or may also have another name. This is not limited in this application.

3. A mobility management network element is mainly configured to perform mobility management, access management, and the like, and may be configured to implement functions such as lawful interception and access authorization/authentication in functions of a mobility management entity (MME) other than session management.

In a 5G communications system, the mobility management network element may be an AMF network element. In a future communications system, the mobility management network element may still be an AMF network element, or may also have another name. This is not limited in this application.

4. A session management network element is mainly configured to perform session management, terminal internet protocol (IP) address allocation and management, selection of an endpoint that can manage a user plane function and a policy control and charging function interface, downlink data notification, and the like.

In a 5G communications system, the session management network element may be an SMF network element. In a future communications system, the session management network element may also have another name. This is not limited in this application.

5. A policy control network element is configured to: provide a unified policy framework to govern network behavior, provide policy rule information for a control plane function network element (such as an AMF network element or an SMF network element), and the like.

In a 5G communications system, the policy control network element may be a PCF network element. In a future communications system, the policy control network element may still be a PCF network element, or may also have another name. This is not limited in this application.

6. A binding function network element is configured to find a PCF network element associated with a session.

In a 5G communications system, the binding network element may be a binding support function (BSF) network element. In a future communications system, the binding network element may still be a BSF network element, or may also have another name. This is not limited in this application.

7. An authentication server is configured to: authenticate a service, generate a key to implement bidirectional authentication for a terminal device, and support a unified authentication framework.

In a 5G communications system, the authentication server may be an authentication server function (AUSF) network element. In a future communications system, the authentication server function network element may still be an AUSF network element, or may also have another name. This is not limited in this application.

8. A data management network element is configured to perform terminal identifier handling, access authentication, registration and mobility management, and the like.

In a 5G communications system, the data management network element may be a unified data management (UDM) network element. In a future communications system, the unified data management may still be a UDM network element, or may also have another name. This is not limited in this application.

9. An application network element is configured to: perform application-affected data routing, access a network exposure function network element, interact with a policy framework to perform policy control, and the like.

In a 5G communications system, the application nets pork element may be an application function (AF) network element. In a future communications system, the application network element may still be an AF network element, or may also have another name. This is not limited in this application.

10. A network repository network element is configured to maintain realtime information of all network function services in a network.

In a 5G communications system, the network repository network element may be a network registration function (NRF) network element. In a future communications system, the network repository network element may still be an NRF network element, or may also have another name. This is not limited in this application.

It may be understood that the foregoing network elements or functions may be network elements in a hardware device, software functions running on dedicated hardware, or virtualized functions instantiated on a platform (for example, a cloud platform).

Further, the AMF network element is referred to as an AMF for short, the AF network element is referred to as an AF for short, the BSF network element is referred to as a BSF for short, the NRF network element is referred to as an NRF for short, and the PCF network element is referred to as a PCF for short. In other words, in subsequent descriptions of this application, the AF may be replaced with an application network element, the BSF may be replaced with a binding function network element, the NRF may be replaced with a network repository network element, and the PCF may be replaced with a policy control network element.

In a user plane connection establishment method provided in an embodiment of this application, steps performed by an interworking function network element-control plane may alternatively be performed by a chip applied to the interworking function network element-control plane, steps performed by an access network gateway may alternatively be performed by a chip applied to the access network gateway, and steps performed by an interworking function network element-user plane may alternatively be performed by a chip applied to the interworking function network element-user plane. For example, in the following embodiment, a user plane connection establishment method is performed by an interworking function network element-control plane, an access network gateway, and an interworking function network element-user plane. For details about a method implemented by the chip in the interworking function network element-user plane, the chip in the access network gateway, or the chip in the interworking function network element-control plane, refer to related descriptions in this application. Details are not described herein.

Figure 4:
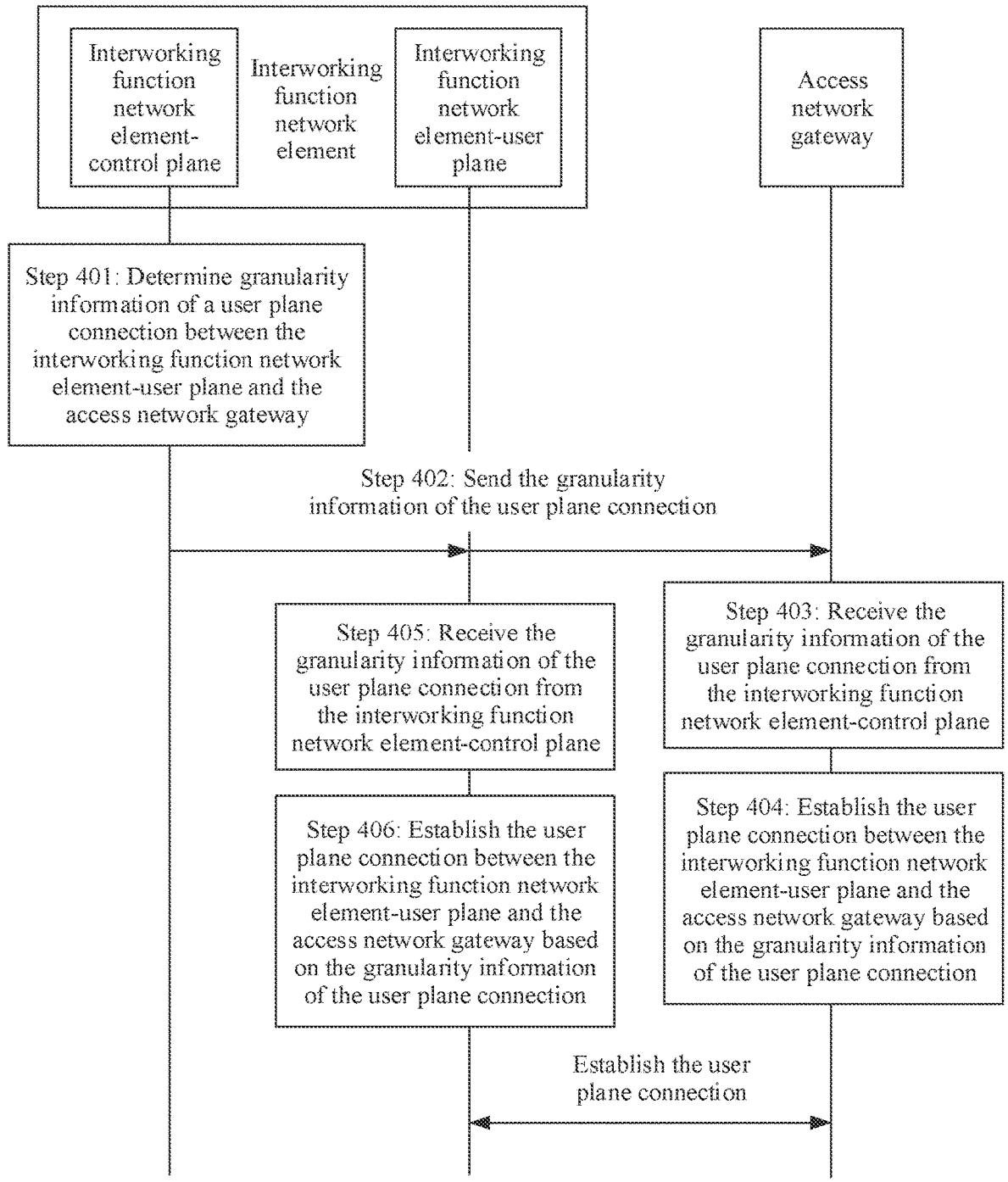
FIG. 4 is a schematic flowchart of a user plane connection establishment method according to an embodiment of this application.
Figure 5A:
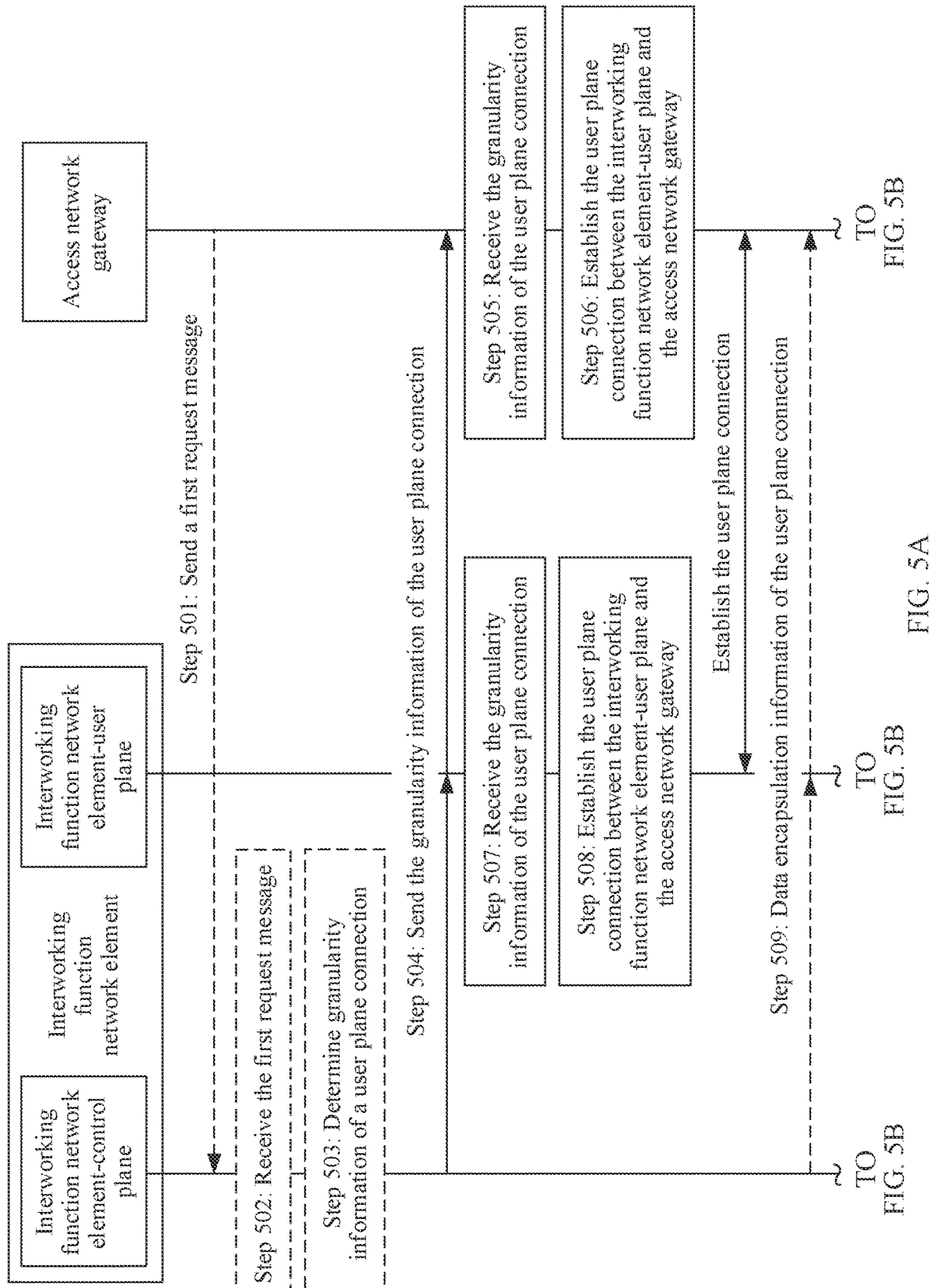
FIG. 5A to FIG. 5D are a schematic flowchart of another user plane connection establishment method according to an embodiment of this application.
Figure 5B:
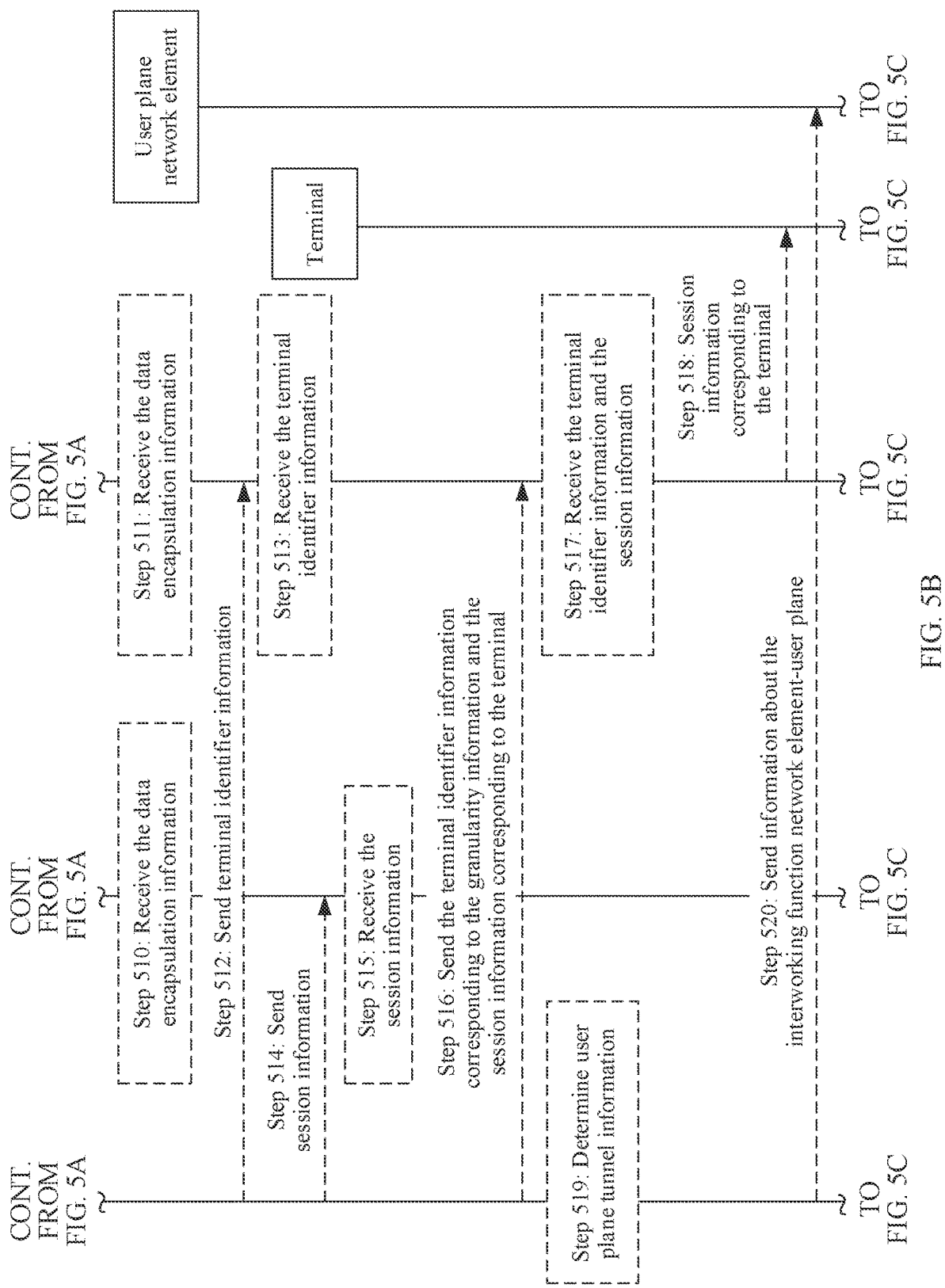
Figure 5C:
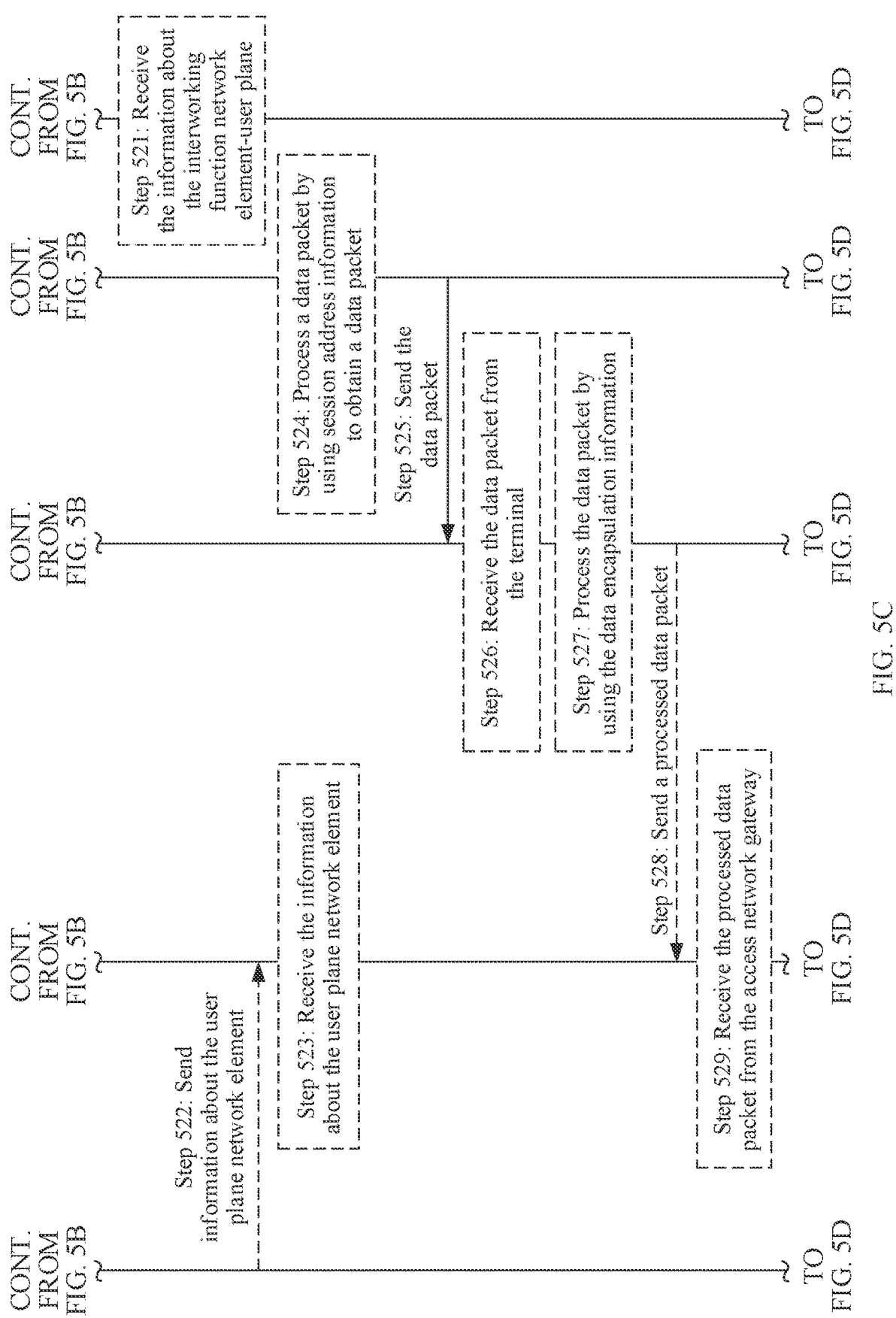
Figure 5D:
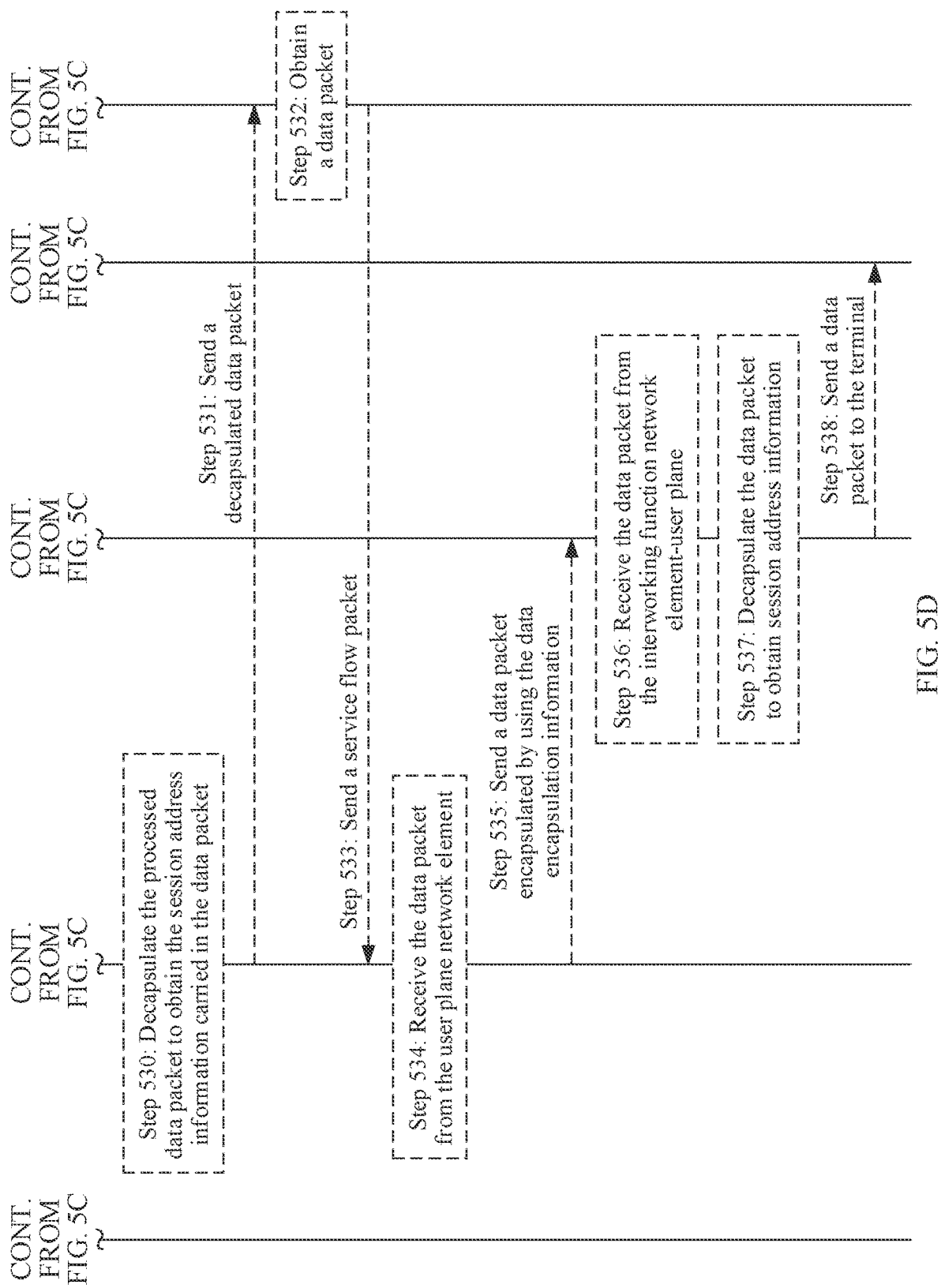
Figure 6A:
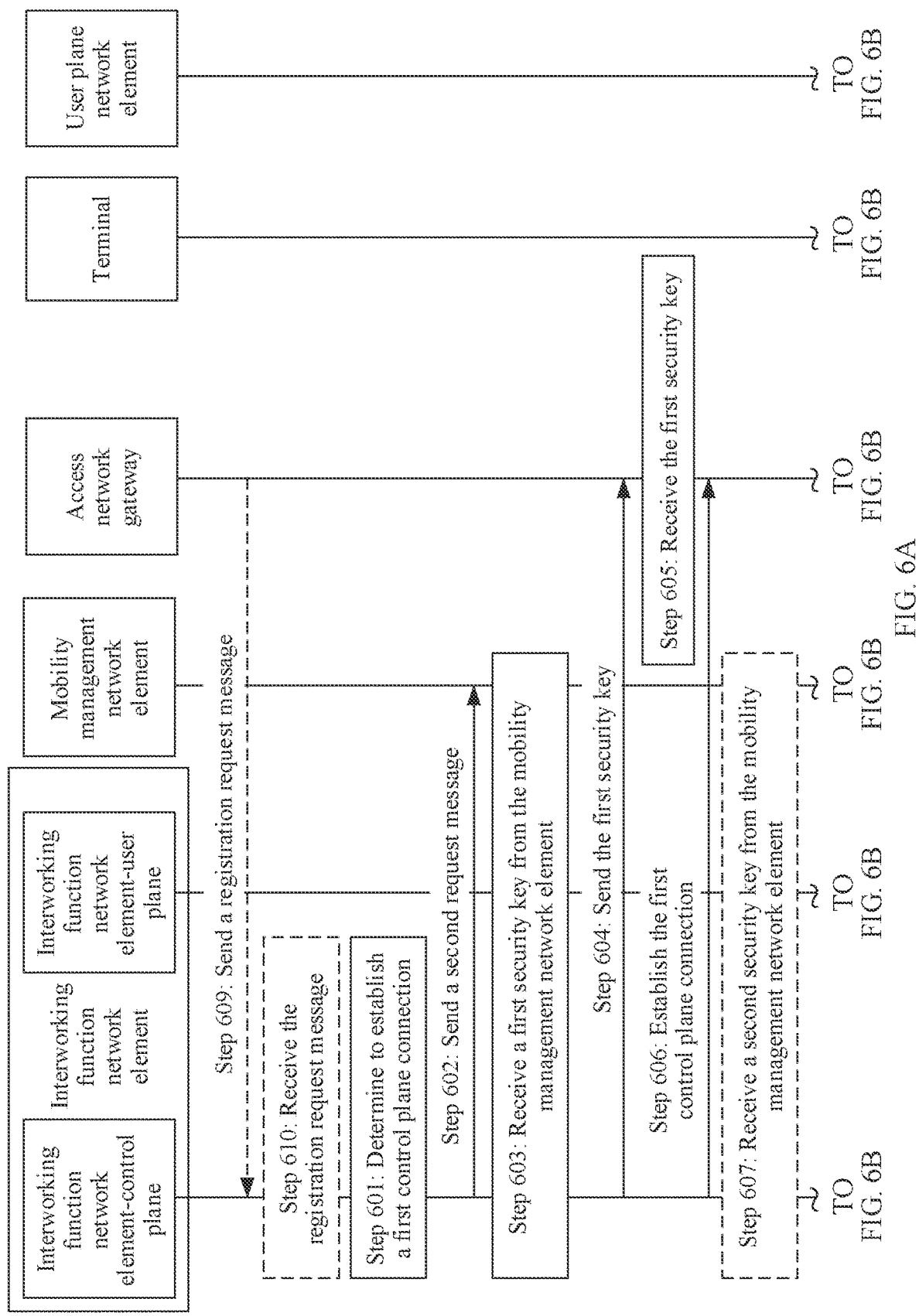
FIG. 6A to FIG. 6D are a schematic flowchart of still another user plane connection establishment method according to an embodiment of this application.
Figure 6B:
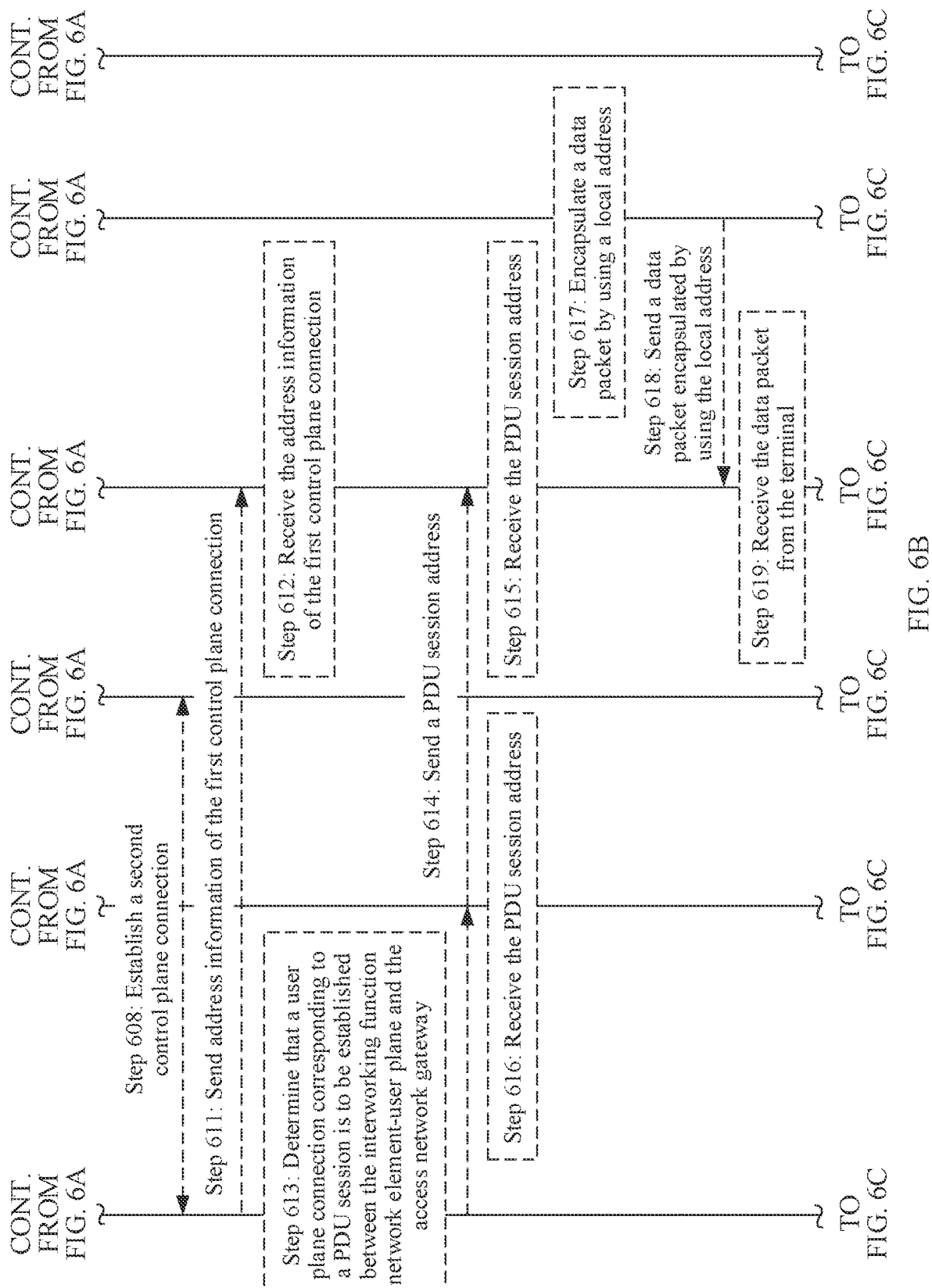
Figure 6C:
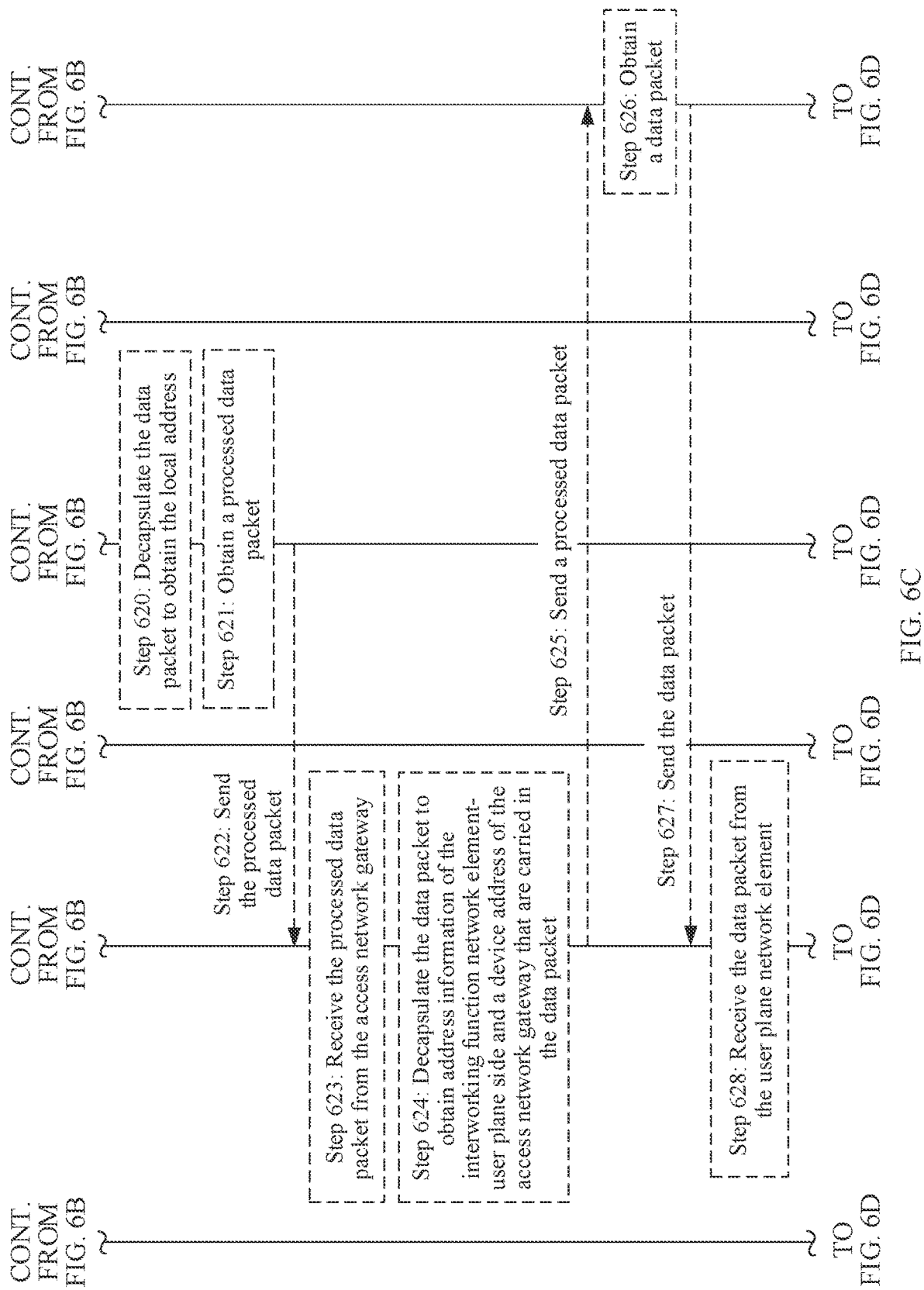
Figure 6D:
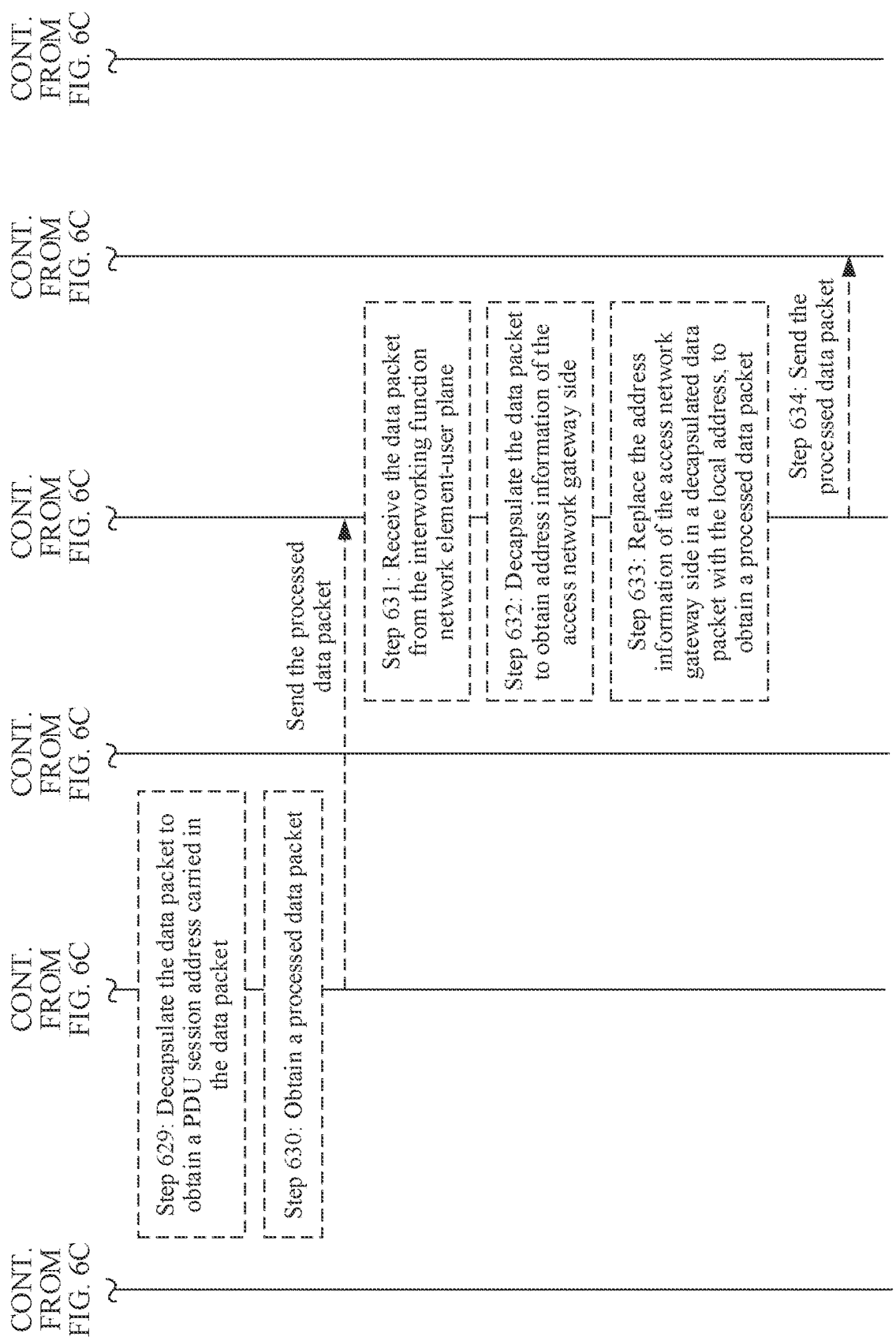
Figure 7A:
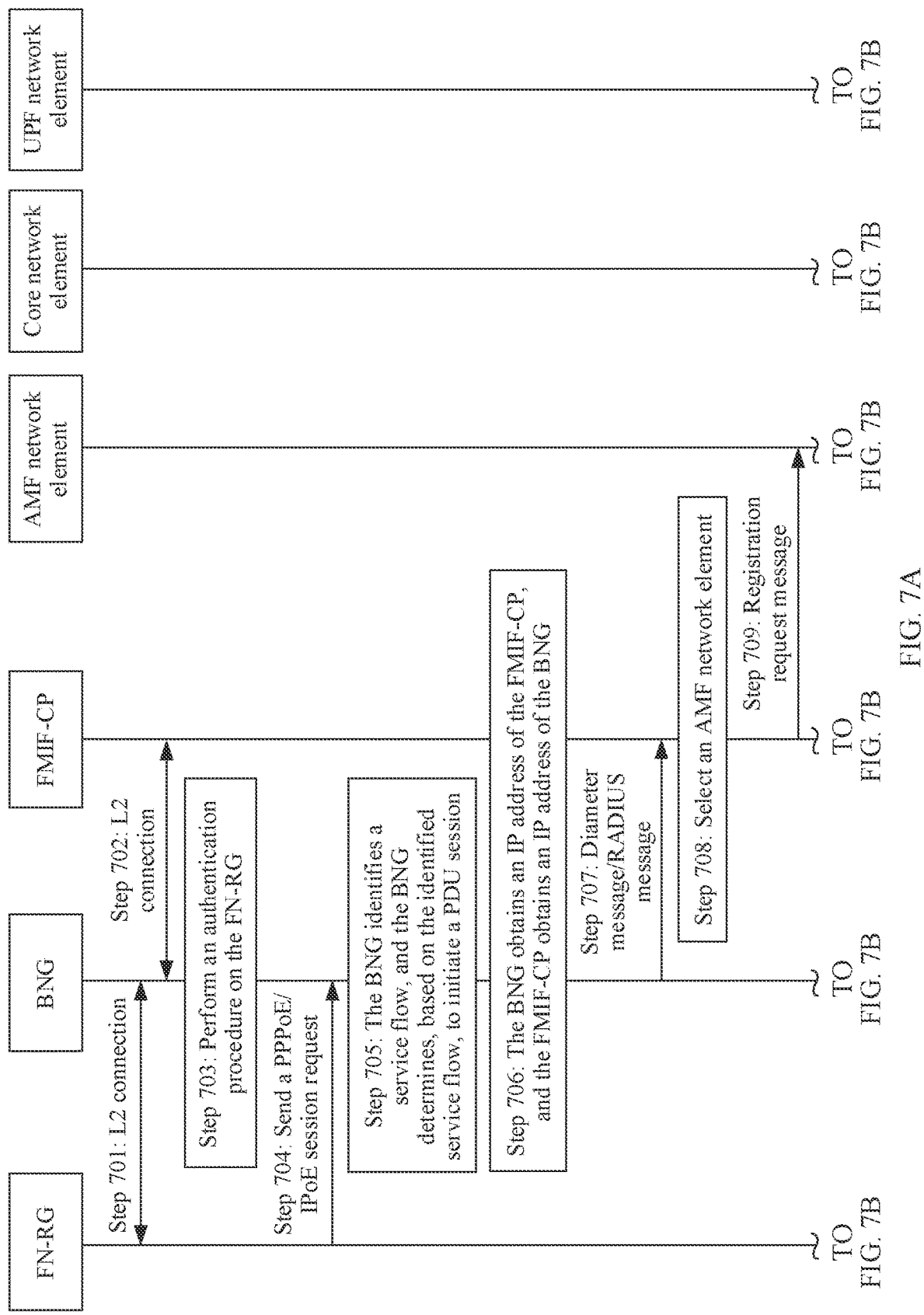
FIG. 7A to FIG. 7D are a specific schematic flowchart of a user plane connection establishment method according to an embodiment of this application.
Figure 7B:
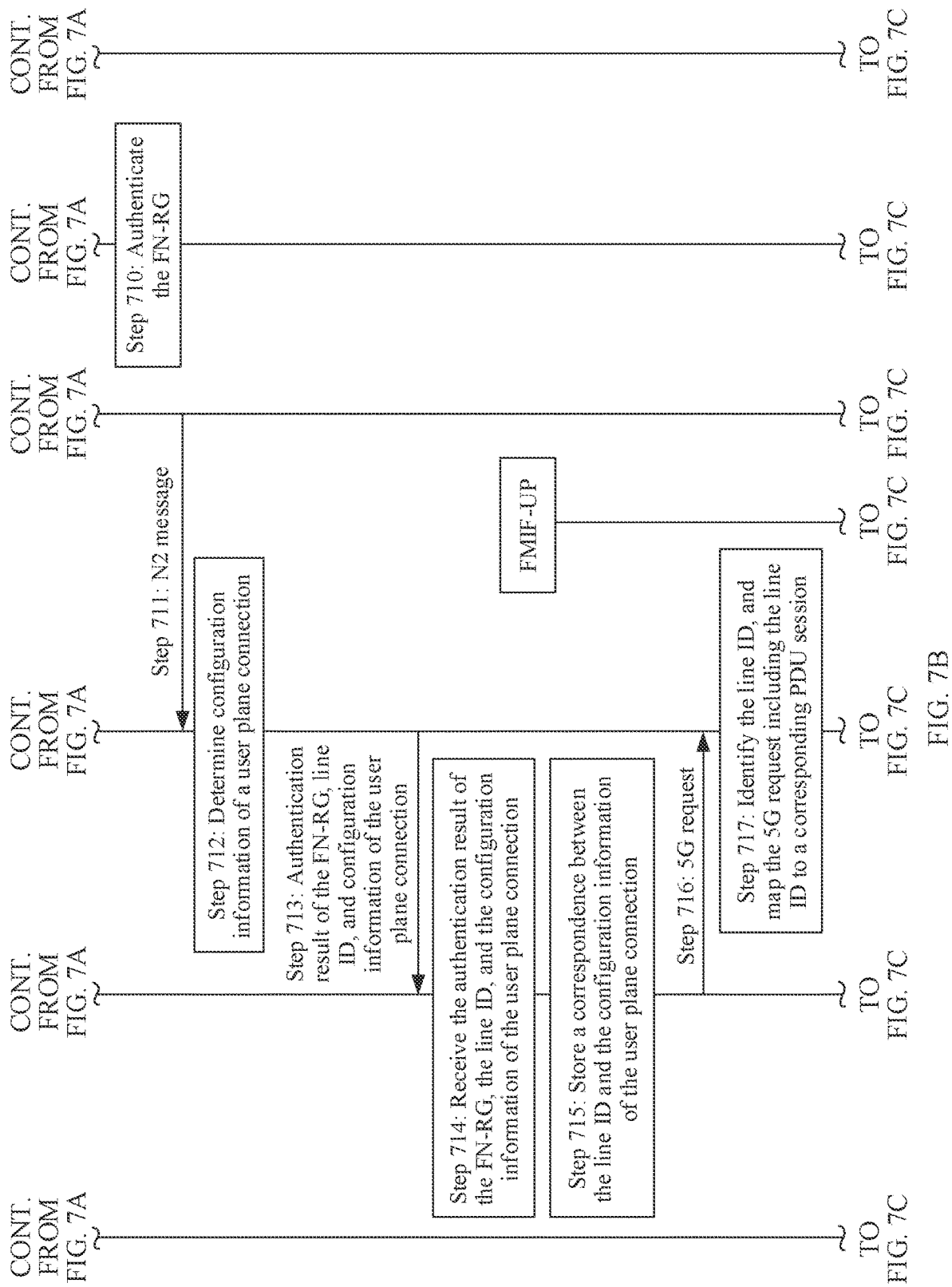
Figure 7C:
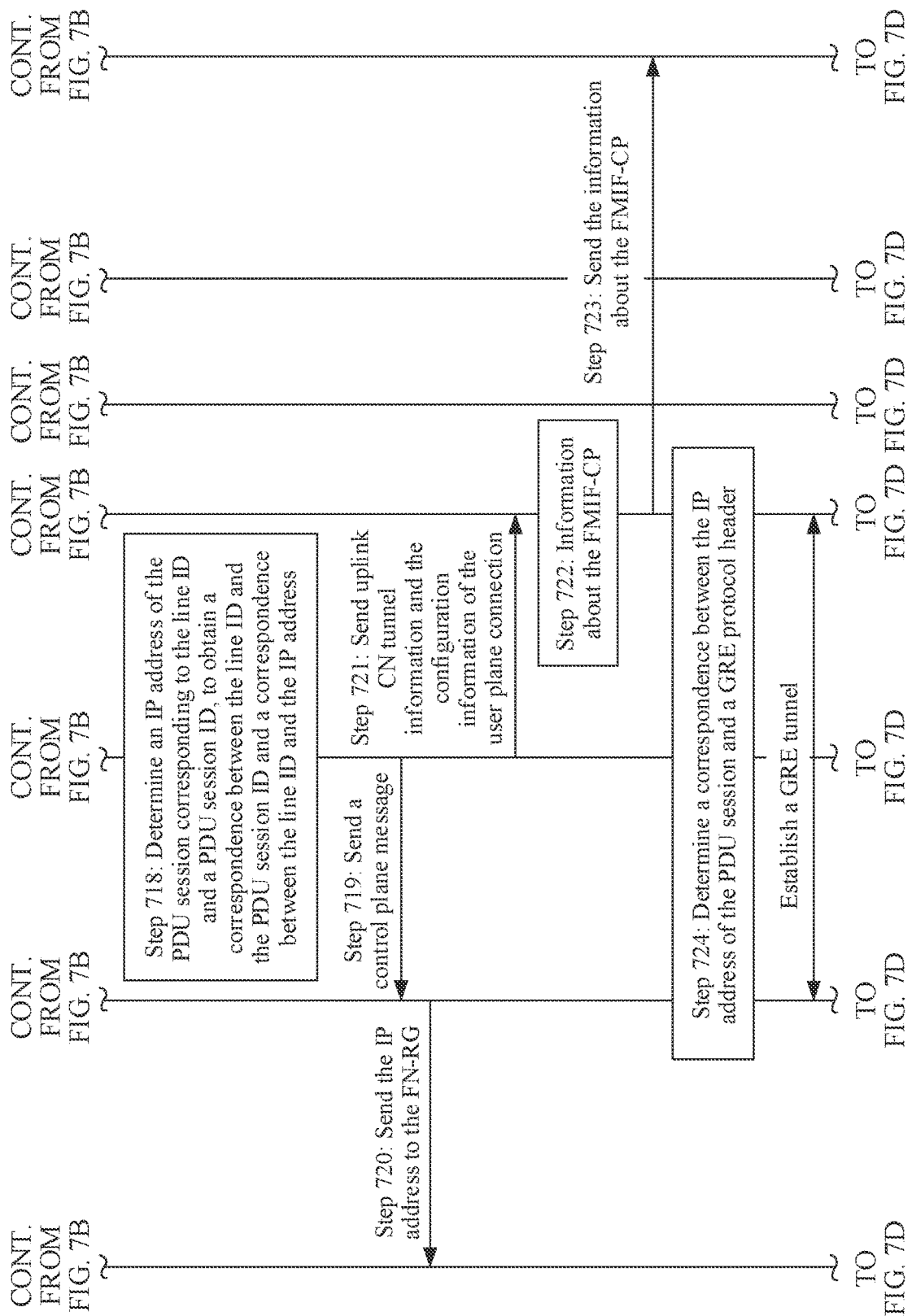
Figure 7D:
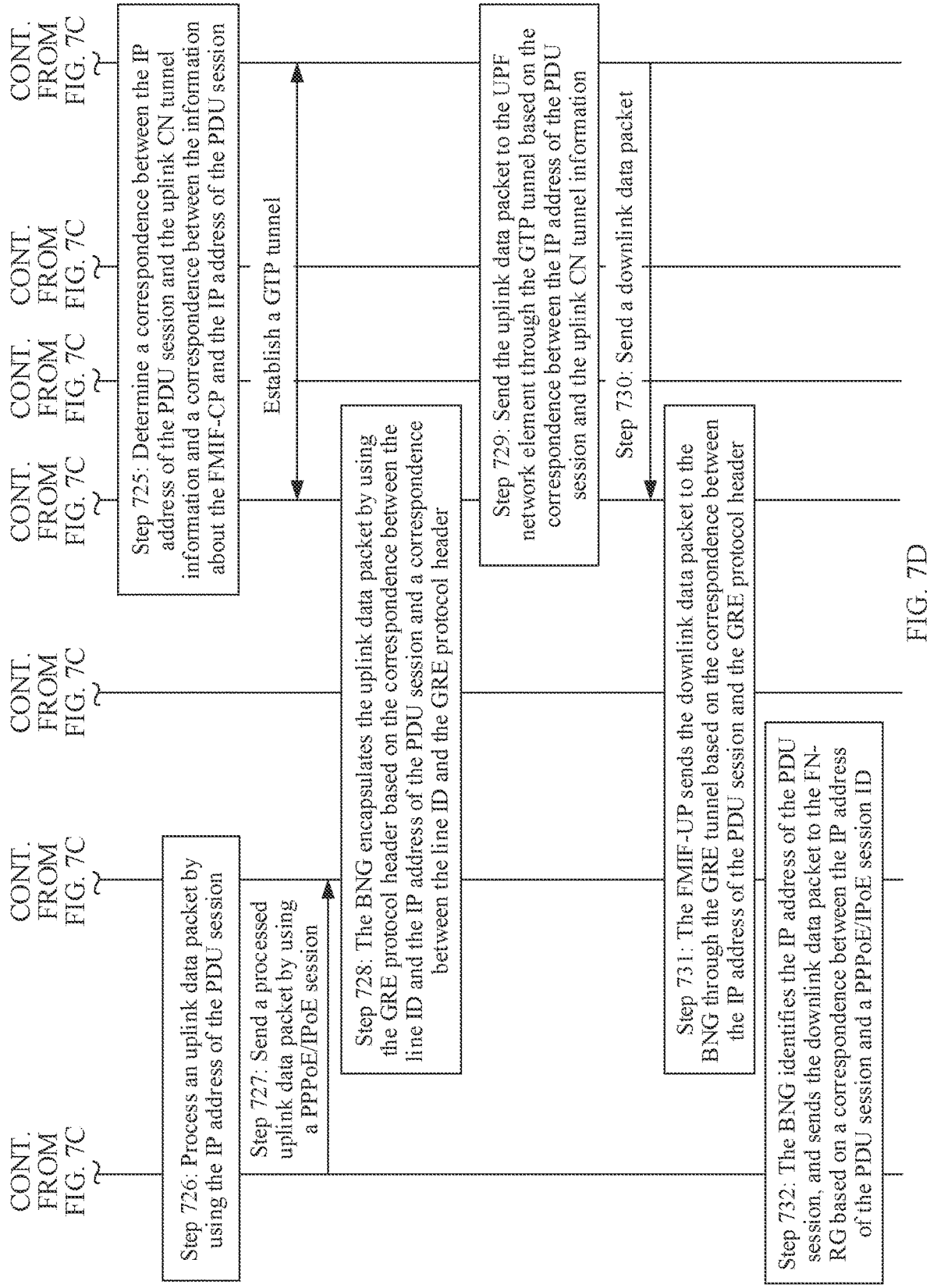

FIG. 4 shows a procedure of a user plane connection establishment method according to an embodiment of this application. The method includes the following steps.

Step 401: An interworking function network element-control plane determines granularity information of a user plane connection between an interworking function network element-user plane and an access network gateway.

The user plane connection is used to transmit a data packet.

It should be understood that the data packet may be an uplink data packet or a downlink data packet. The downlink data packet may be a data packet sent by a DN to a terminal or an access network gateway in FIG. 2. The uplink data packet may be a data packet from an access network gateway, or may be a data packet from a terminal. If the uplink data packet is the data packet from the terminal, the terminal may send the data packet from the terminal by using an access network gateway accessed by the terminal, and then the access network gateway sends the data packet froth the terminal to the interworking function network element-user plane through the user plane connection.

When the interworking function network element-control plane determines that the user plane connection needs to be established between the interworking function network element-user plane and the access network gateway, the interworking function network element-control plane may perform step 401. The interworking function network element-control plane may independently determine whether the user plane connection needs to be established. For example, if the interworking function network element-control plane determines that the terminal is successfully authenticated, even though there is no other network element (for example, the access network gateway) that requests the interworking function network element-control plane to establish the user plane connection, the interworking, function network element-control plane may determine that the user plane connection needs to be established. Certainly, the interworking function network element-control plane may determine, at a request of another network element, that the user plane connection needs to be established.

The granularity information of the user plane connection is used to indicate a granularity of the established user plane connection. For example, the granularity information of the user plane connection may be information about the user plane connection at an access network gateway granularity, information about the user plane connection at a terminal granularity, or information about the user plane connection at a session granularity.

A session in this embodiment of this application may be a packet data unit (PDU) session in a 5G network. For example, a session identifier may be a PDU session ID.

For example, as shown in FIG. 2, the interworking function network element-control plane may be an FMIF-CP, the interworking function network element-user plane may be an FMIF-UP, and the access network gateway may be a BNG.

Step 402: The interworking function network element-control plane sends the granularity information of the user plane connection to the interworking function network element-user plane and the access network gateway. The granularity information of the user plane connection is used to establish the user plane connection between the interworking function network element-user plane and the access network gateway.

Two endpoints of the user plane connection are the access network gateway and the interworking function network element-user plane. Therefore, the interworking function network element-control plane can send the granularity information of the user plane connection to the interworking function network element-user plane and the access network gateway. This helps the interworking function network element-user plane and the access network gateway determine the granularity of the established user plane connection.

In a possible implementation, after the terminal is successfully authenticated, when sending a message used to indicate that the terminal is successfully authenticated to the access network gateway, the interworking function network element-control plane may together send the granularity information of the user plane connection to the access network gateway.

In another possible implementation, in a process in which the access network gateway requests a PDU session for the terminal, the interworking function network element-control plane sends the granularity information of the user plane connection to the access network gateway, and sends the granularity information of the user plane connection to the interworking function network element-user plane.

Step 403: The access network gateway receives the granularity information of the user plane connection from the interworking function network element-control plane.

For example, the access network gateway may receive the granularity information of the user plane connection in a process of receiving the message used to indicate that the terminal is successfully authenticated.

In another example, in a process in which the access network gateway requests the PDU session for the terminal, the access network gateway receives the granularity information of the user plane connection.

Step 404: The access network gateway establishes the user plane connection between the interworking function network element-user plane and the access network gateway based on the granularity information of the user plane connection.

In a possible implementation, after obtaining the granularity information of the user plane connection, the access network gateway may determine the granularity of the user plane connection that needs to be established between the interworking function network element-user plane and the access network gateway.

Step 405: The interworking function network element-user plane receives the granularity information of the user plane connection from the interworking function network element-control plane.

Step 406: The interworking function network element-user plane establishes the user plane connection between the interworking function network element-user plane and the access network gateway based on the granularity information of the user plane connection.

In a possible implementation, after obtaining the granularity information of the user plane connection, the interworking function network element-user plane may determine the granularity of the user plane connection that needs to be established between the interworking function network element-user plane and the access network gateway.

The user plane connection is used to connect the interworking function network element-user plane and the access network gateway. Therefore, when the interworking function network element-user plane and the access network gateway separately obtain the granularity information of the user plane connection, the interworking function network element-user plane and the access network gateway may separately determine the granularity of the user plane connection between the interworking function network element-user plane and the access network gateway based on the granularity information of the user plane connection. After the user plane connection between the interworking function network element-user plane and the access network gateway is established, the interworking function network element-user plane may send a downlink data packet to the access network gateway or the terminal through the user plane connection, or may receive an uplink data packet from the access network gateway or the terminal through the user plane connection. The access network gateway may receive the downlink data packet from the interworking function network element-user plane through the user plane connection, or send the uplink data packet to the interworking function network element-user plane through the user plane connection.

This embodiment of this application provides the user plane connection establishment method. In the method, the interworking function network element-control plane determines the granularity information used to establish the user plane connection between the interworking function network element-user plane and the access network gateway. Then, the interworking function network element-control plane sends the granularity information of the user plane connection to the two endpoints of the user plane connection (that is, the interworking function network element-user plane and the access network gateway), so that the access network gateway and the interworking function network element-user plane each establish the user plane connection at a corresponding granularity based on the granularity information of the user plane connection. In this way, a data packet can be subsequently transmitted between the access network gateway and the interworking function network element-user plane through the established user plane connection.

In a possible embodiment, FIG. 5A to FIG. 5D show an embodiment of another user plane connection establishment method according to this application. The method includes step 503 to step 508. For details, refer to descriptions in step 401 to step 406. Details are not described herein again.

In the embodiment shown in FIG. 5A to FIG. 5D, before step 503, the method provided in this embodiment of this application further includes the following steps.

Step 501: The access network gateway sends a first request message to the interworking function network element-control plane. The first request message includes terminal identifier information and any one or more of the following information: a request for establishing the user plane connection or an authentication request message. The authentication request message is used to request to authenticate a terminal.

In step 501, that the authentication request message and the request for establishing the user plane connection are carried in the same message is used as an example for description. In an actual process, the authentication request message and the request for establishing the user plane connection may be carried in different messages. For example, the access network gateway sends the authentication request message to the interworking function network element-control plane. Then, after determining that the terminal is successfully authenticated, the access network gateway sends, to the interworking function network element-control plane, the terminal identifier information and the request for establishing the user plane connection. The terminal identifier information, the request for establishing the user plane connection, and the authentication request message are carried in the first request message, so that signaling overheads can be reduced. In addition, the request for establishing the user plane connection is sent in a process of requesting to authenticate the terminal, so that a delay can be further reduced.

The terminal identifier information in this embodiment of this application is used to identify the terminal. For example, the terminal identifier information in this embodiment of this application may be one or more of the following: location information of the terminal, an internet protocol (IP) address, a subscription permanent identifier (SUPI), a permanent equipment identifier (PEI), a generic public subscription identifier (GPSI), an international mobile subscriber identifier (IMSI), an international mobile equipment identity (IMEI), an IP address, and a mobile station international integrated services digital network number (MSISDN). For details about terminal identifier information described in the following embodiments, refer to the description herein. Details are not described subsequently. For example, the location information of the terminal may be a line identifier (Line ID) of the terminal.

The terminal in step 501 in this embodiment of this application may be the FN-RG shown in FIG. 2.

In a possible implementation, the first request message may further carry information about the access network gateway. Because the first request message is sent by the access network gateway to the interworking function network element-control plane, the information about the access network gateway is optional information.

Step 502: The interworking function network element-control plane receives the first request message from the access network gateway.

It should be understood that, after obtaining the first request message, the interworking function network element-control plane may obtain the terminal identifier information from the first request message.

In a possible implementation, as shown in FIG. 5A to FIG. 5D, step 503 in this embodiment of this application may be specifically implemented in the following manner: The interworking function network element-control plane determines the granularity information of the user plane connection based on any one or more of the terminal identifier information or policy information.

Certainly, the interworking function network element-control plane may further determine the granularity information of the user plane connection based on any one or more of the information about the access network gateway, the terminal identifier information, or the policy information.

For example, the information about the access network gateway may be an identifier of the access network gateway or a device address of the access network gateway.

In an example, the policy information may include a deployment policy of an operator (for example, a correspondence between an interworking function network element-control plane and an interworking function network element-user plane) and a load status of the user plane the interworking function network element.

For example, if an interworking function network element-control plane and an interworking function network element-user plane are deployed in 1:1, and load of the interworking function nets pork element-user plane is less than a preset load threshold, the interworking function network element-control plane preferentially establishes a user plane connection for the terminal at an access network gateway granularity.

For example, when an interworking function network element-control plane and interworking function network element-user planes are deployed in one to many, that is, one interworking function network element-control plane may be connected to a plurality of interworking function network element-user planes, the interworking function network element-control plane may preferentially select, from the plurality of interworking function network element-user planes, an interworking function network element-user plane whose load is less than a preset threshold, and establish a user plane connection for the terminal at an access network gateway granularity, or establish a user plane connection for the terminal at a terminal granularity.

For example, if an interworking function network element-control plane and an interworking function network element-user plane are deployed in 1:1, and load of the interworking function network element-user plane is greater than a preset load threshold, the interworking function network element-control plane preferentially establishes a user plane connection for the terminal at a terminal granularity.

In this embodiment of this application, when determining that the terminal is successfully authenticated, the interworking function network element-control plane determines the granularity information of the user plane connection based on any one or more of the terminal identifier information or the policy information. This avoids blindly determining the granularity information of the user plane connection.

After the granularity of the user plane connection is determined by the access network gateway and the interworking function network element-user plane, still with reference to FIG. 5A to FIG. 5D, the method provided in this embodiment of this application may further include the following steps, to help the access network gateway and the interworking function network element-user plane determine an encapsulation format of a data packet to be transmitted through the user plane connection.

Step 509: The interworking function network element-control plane sends data encapsulation information of the user plane connection to the interworking function network element-user plane and the access network gateway.

The data encapsulation information is used to determine encapsulation information of the data packet to be transmitted through the user plane connection.

For example, the data encapsulation information may be a generic routing encapsulation (GRE) protocol header. Certainly, the data encapsulation information may alternatively be encapsulation information other than the GRE protocol header (for example, multi-protocol label switching (MPLS)), It should be understood that, if the data encapsulation information of the user plane connection is the GRE protocol header, the user plane connection between the interworking function network element-user plane and the access network gateway may be referred to as a GRE tunnel.

For example, when the user plane connection is at a session granularity, the data encapsulation information may alternatively be address information of the user plane connection. For example, the address information of the user plane connection may include address information of the access network gateway side and address information of the interworking function network element-user plane side. The address information of the access network gateway side is used to determine the terminal to which the data packet is to be transmitted. The address information of the interworking function network element-user plane side is used to determine a PDU session address that the data packet comes from.

When the user plane connection is established at the session granularity, the interworking function network element-control plane first determines the PDU session of the terminal based on a 5G request sent by the access network gateway. Then, the interworking function network element-control plane determines to establish the PDU session of the terminal corresponding to the user plane connection.

When the 5G request is received, if the interworking function network element-control plane determines that the PDU session of the terminal exists, the interworking function network element-control plane maps the 5G request to the PDU session. If the interworking, function network element-control plane determines that the PDU session does not exist, the interworking function network element-control plane obtains the PDU session address. Then, the interworking function network element-control plane establishes a new PDU session with a core network for the terminal based on the PDU session address.

It should be understood that, in FIG. 5A to FIG. 5D, that the inter-working function network element-control plane sends the data encapsulation information and the granularity information of the user plane connection in two processes is used as an example for description. Usually, the data encapsulation information may be sent to the interworking, function network element-user plane and the access network gateway together with the granularity information of the user plane connection.

In a possible implementation, before step 509, the method provided in this embodiment of this application may further include: The interworking function network element-control plane determines the data encapsulation information.

Step 510: The interworking function network element-user plane receives data encapsulation information from the interworking function network element-control plane.

Step 511: The access network gateway receives the data encapsulation information from the interworking function network element-control plane.

It should be understood that, after step 510 and step 511, the interworking function network element-user plane and the access network gateway can determine that the data packet to be transmitted through the user plane connection is processed by using the data encapsulation information.

For example, the data encapsulation information is the GRE protocol header. For an uplink data packet, the access network gateway may encapsulate the uplink data packet by using the GRE protocol header, and send an uplink data packet encapsulated by using the GRE protocol header to the interworking function network element-user plane through the GRE tunnel.

In a possible implementation, the method provided in this embodiment of this application further includes: The interworking function network element-control plane sends the terminal identifier information corresponding to the granularity information to the interworking function network element-user plane and the access network gateway.

In a possible implementation, when the interworking function network element-control plane performs step 509, that is, sends the data encapsulation information to the access network gateway, the method further includes the following step:

Step 512: The interworking function network element-control plane sends the terminal identifier information corresponding to the data encapsulation information to the access network gateway.

In this way, the access network gateway can determine a correspondence between the data encapsulation information and the terminal identifier information. In addition, in an alternative implementation, step 509 in this embodiment of this application may be specifically implemented in the following manner: The interworking function network element-control plane sends the correspondence between the data encapsulation information and the terminal identifier information to the access network gateway.

Correspondingly, when the access network gateway performs step 511, that is, the access network gateway receives the data encapsulation information from the interworking function network element-control plane, the method provided in this embodiment of this application may further include the following step:

Step 513: The access network gateway receives, from the interworking function network element-control plane, the terminal identifier information corresponding to the data encapsulation information.

It should be understood that if the access network gateway receives the terminal identifier information and the corresponding data encapsulation information, the access network gateway can determine the correspondence between the terminal identifier information and the data encapsulation information.

In a possible implementation, when the interworking function network element-control plane performs step 509, that is, sends the data encapsulation information to the interworking function network element-user plane, the method provided in this embodiment of this application further includes the following step:

Step 514: The interworking function network element-control plane sends session information corresponding to the terminal to the interworking function network element-user plane.

For example, the session information may be session identifier information or session address information. The session identifier information and the session address information may be allocated by the interworking function network element-control plane in a session establishment process. Certainly, the session identifier information or the session address information may alternatively be allocated for a session of the terminal when the access network gateway requests to establish the session. Alternatively, the session identifier information and the session address information may be allocated upon a request from the interworking function network element-control plane to the core network in a session establishment process. This is not limited in this embodiment of this application.

In this way, the interworking function network element-user plane can determine a correspondence between the data encapsulation information and the session information. In addition, in an alternative implementation, step 509 in this embodiment of this application may be specifically implemented in the following manner: The interworking function network element-control plane sends the correspondence between the data encapsulation information and the session information corresponding to the terminal to the interworking function network element-user plane.

Step 515: The interworking function network element-user plane receives the session information corresponding to the terminal from the interworking function network element-control plane.

It should be understood that, if the interworking function network element-user plane receives the session information of the terminal and the data encapsulation information, the interworking function network element-user plane can establish the correspondence between the session information of the terminal and the data encapsulation information of the user plane connection.

Still with reference to FIG. 5A to FIG. 5D, in another embodiment of this application, after step 515, the method provided in this embodiment of this application may further include the following steps.

Step 516: The interworking function network element-control plane sends the terminal identifier information corresponding to the granularity information and the session information corresponding to the terminal to the access network gateway.

Certainly, in an alternative implementation of step 516, step 512 may be specifically implemented in the following manner: The interworking function network element-control plane sends a correspondence between the terminal identifier information corresponding to the granularity information and the session information corresponding to the terminal to the access network gateway.

Step 517: The access network gateway receives the terminal identifier information corresponding to the granularity information and the session information corresponding to the terminal from the interworking function network element-control plane.

In this way, after step 516 and step 517, the access network gateway can determine the correspondence between the terminal identifier information corresponding to the granularity information and the session information corresponding to the terminal.

After step 517, the method provided in this embodiment of this application further includes the following step:

Step 518: The access network gateway sends, to the terminal, the session information corresponding to the terminal, where the session information includes session address information, and the session address information is used to encapsulate a data packet sent by the terminal, so that the terminal determines to encapsulate, by using the session address information, the data packet to be sent to the access network gateway.

It should be noted that in this embodiment of this application, the access network gateway further has a correspondence between the session information of the terminal and a first connection. The first connection is a connection between the access network gateway and the terminal. For example, the first connection may be a point-to-point protocol over Ethernet (PPPoE)/IP protocol over Ethernet (IPoE) connection. The session corresponding to the terminal is a PDU session corresponding to the terminal, that is, a session between the terminal and the core network. The first connection may correspond to a plurality of PDU sessions.

The correspondence between the session information of the terminal and the first connection is used by the access network gateway to determine to transmit a downlink data packet that carries the session information of the terminal to the terminal through the first connection. Alternatively, the correspondence between the session information of the terminal and the first connection is used to determine session information carried in an uplink data packet transmitted through the first connection.

The terminal identifier information corresponding to the data encapsulation information is sent to the interworking function network element-user plane and the access network gateway, because the uplink data packet sent by the terminal to the access network gateway may usually carry the session information or the terminal identifier information. After receiving the uplink data packet from the terminal, the access network gateway may identify the session information of the terminal or the terminal identifier information in the uplink data packet by decapsulating the uplink data packet. The access network gateway has the correspondence between the terminal identifier information and the session information, and therefore the access network gateway can determine identifier information of a terminal that the uplink data packet comes from. In addition, the access network gateway may further determine, based on the correspondence between the data encapsulation information and the terminal identifier information, to encapsulate the uplink data packet by using the data encapsulation information that has a correspondence with the terminal identifier information.

For a downlink data packet, the interworking function network element-user plane may obtain the downlink data packet from a user plane network element. The interworking function network element-user plane decapsulates the downlink data packet, to obtain the session information corresponding to the terminal. The interworking function network element-user plane may determine, based on the correspondence between the session information corresponding to the terminal and the data encapsulation information, the data encapsulation information for processing the downlink data packet, After the interworking function network element-user plane determines the data encapsulation information, the interworking function network element-user plane processes the downlink data packet by using the data encapsulation information, to obtain a downlink data packet encapsulated by using the data encapsulation information. Then, the interworking function network element-user plane sends the downlink data packet encapsulated by using the data encapsulation information to the access network gateway through the user plane connection. The access network gateway decapsulates the received downlink data packet encapsulated by using the data encapsulation information, to obtain the session information in the downlink data packet. The interworking function network element-user plane sends the downlink data packet to the terminal through the first connection based on the correspondence between the session information and the first connection.

It should be noted that the downlink data packet obtained by the interworking function network element-user plane from the user plane network element may usually carry a packet header (for example, a GTP-u tunnel identifier, an IP address, and a media access control (MAC) address). To send the downlink data packet to the access network gateway, the interworking function network element-user plane needs to decapsulate the downlink data packet to remove the packet header (for example, the GTP-u tunnel identifier, the IP address, and the MAC address), and then re-encapsulates, by using the data encapsulation information, the IP address, and the device address of the access network gateway, a downlink data packet obtained after the packet header is removed. When sending the downlink data packet to the terminal, the access network gateway further needs to remove the data encapsulation information and the device address of the access network gateway.

In this embodiment of this application, the interworking function network element-control plane may determine to establish user plane connections at different granularities. For a user plane connection at a different granularity, an access network gateway and an interworking function network element-user plane also have a different manner for processing a data packet. The details are separately described below.

In Example 1, granularity information of a user plane connection is information about the user plane connection at an access network gateway granularity.

The information about the user plane connection at the access network gateway granularity is used to indicate to process a data packet from an access network gateway by using data encapsulation information, or process, by using data encapsulation information, a data packet to be sent to an access network gateway.

(A) At the access network gateway granularity, an interworking function network element-control plane may establish one user plane connection between each access network gateway and an interworking function network element-user plane at a granularity of an access network gateway. To be specific, if there are P access network gateways, P user plane connections are established between the P access network gateways and an interworking function network element-user plane, and each of the P access network gateways is independently associated with one user plane connection, where is an integer greater than or equal to 1.

A user plane connection associated with any access network gateway may be used to transmit an uplink data packet of the any access network gateway, or may be used to transmit an uplink data packet of at least one terminal that accesses the any access network gateway.

Any access network gateway may receive, through an associated user plane connection, a downlink data packet from an interworking function network element-user plane. The downlink data packet includes a downlink data packet to the access network gateway or a downlink data packet to at least one terminal that accesses the access network gateway.

It should be noted that, at the access network gateway granularity, if a plurality of terminals access a same access network gateway, and each terminal has at least one session, a user plane connection between the access network gateway and the interworking function network element-user plane may be used to transmit a data packet carried by using the at least one session of each terminal.

In Example 2, granularity information of a user plane connection is information about the user plane connection at a terminal granularity.

The information about the user plane connection at the terminal granularity is used to indicate to process a data packet from a terminal by using data encapsulation information.

(B) At the terminal granularity, an interworking function network element-control plane may establish one user plane connection for each terminal at a granularity of a terminal. In this case, the user plane connection associated with each terminal is a user plane connection between an access network gateway accessed by each terminal and an interworking function network element-user plane. In other words, at the terminal granularity, different terminals are associated with different user plane connections. For example, if there are Q terminals, there may be Q user plane connections between an access network gateway and an interworking function network element-user plane, and each of the Q user plane connections is used to transmit a data packet of a terminal associated with the user plane connection, where Q is an integer greater than or equal to 1.

For example, the interworking function network element-control plane may establish a user plane connection 1 for a terminal 1, and establish a user plane connection 2 for a terminal 2. The user plane connection 1 is a user plane connection between an access network gateway accessed by the terminal 1 and an interworking function network element-user plane. The user plane connection 2 is a user plane connection between an access network gateway accessed by the terminal 2 and an interworking function network element-user plane. It should be understood that at the terminal granularity, different terminals may access a same access network gateway, but different terminals may correspond to different interworking function network element-user planes. Alternatively, different terminals may access different access network gateways, and the access network gateways accessed by the different terminals communicate with different interworking function network element-user planes. Alternatively, different terminals may access a same interworking function network element-user plane, but the different terminals access different access network gateways, and the different access network gateways communicate with the same interworking function network element-user plane.

It should be noted that, at the terminal granularity, if one terminal has at least one session, a data packet carried by using the at least one session of the terminal may be transmitted through a user plane connection corresponding to the terminal.

It should be understood that, when a user plane connection is established at the terminal granularity, even if a plurality of terminals access a same access network gateway, a plurality of user plane connections need to be established between the access network gateway and an interworking function network element-user plane. It should be noted that the plurality of terminals may communicate with different interworking function network elements. For example, a terminal 1 and a terminal 2 access a same access network gateway. Both the terminal 1 and the terminal 2 access an access network gateway 1, but the terminal 1 communicates with an interworking function network element 1, and the terminal 2 communicates with an interworking, function network element 2. Therefore, a user plane connection 1 associated with the terminal 1 may be a user plane connection between the access network gateway 1 and a user plane of the interworking function network element 1, and a user plane connection 2 associated with the terminal 2 may be a user plane connection between the access network gateway 1 and a user plane of the interworking function network element 2.

In Example 3, granularity information of a user plane connection is information about the user plane connection at a granularity of a session of a terminal.

At the session granularity, an interworking function network element-control plane uses a session of a terminal as a granularity. If the terminal has a plurality of sessions, each session of the terminal is associated with a user plane connection between an access network gateway and an interworking function network element-user plane. Different sessions may be associated with different user plane connections. The user plane connections corresponding to the different sessions may have different addresses. The user plane connection corresponding to each session may be used to transmit a data packet carried by using the session.

Different user plane connections have different address information. Address information of a user plane connection includes address information of an access network gateway side and address information of an interworking function network element-user plane side.

For example, if the terminal has a session 1 and a session 2. The session 1 is associated with a user plane connection 1, and address information of the user plane connection 1 includes address information of an access network gateway side (which is briefly referred to as address information 1) and address information of a user plane side of an interworking function network element 1 (which is briefly referred to as address information 21). The session 2 is associated with a user plane connection 2, and address information of the user plane connection 2 includes the address information of the access network gateway side and address information of a user plane side of an interworking function network element 2 (which is briefly referred to as address information 22). In this case, the access network gateway may process, by using the address information 21, an uplink data packet transmitted by using the session 1, and transmit an uplink data packet processed by using the address information 21 to the interworking, function network element-user plane 1 through the user plane connection 1. The access network gateway may process, by using the address information 22, an uplink data packet transmitted by using the session 2, and send a processed uplink data packet to the interworking function network element 2 through the user plane connection 2.

At the session granularity, different sessions of a same terminal may be associated with different interworking function network element-user planes.

In Example 3, the user plane connection may be an IPsec child security association between the interworking function network element-user plane and the access network gateway.

In this embodiment of this application, after the interworking function network element-control plane determines the granularity information for establishing the user plane connection, the interworking function network element-control plane further needs to notify the user plane network element of information about the interworking function network element-user plane, and notify the interworking function network element-user plane of information about the user plane network element, to help the interworking function network element-user plane determine the information about the user plane network element to which an uplink data packet is transmitted, and help the user plane network element determine the information about the interworking function network element-user plane to which a downlink data packet is transmitted.

Based on the foregoing descriptions, still with reference to FIG. 5A to FIG. 5D, in another embodiment of this application, after step 517, the method provided in this embodiment of this application may further include the following steps:

Step 519: The interworking function network element-control plane determines user plane tunnel information, where the user plane tunnel information includes the information about the user plane network element and the information about the interworking function network element-user plane.

Step 520: The interworking function network element-control plane sends the information about the interworking function network element-user plane to the user plane network element.

For example, the information about the interworking unction network element-user plane may be an address of the interworking function network element-user plane or an identifier of the interworking function network element-user plane. The address of the interworking function network element-user plane may be an address of the interworking function network element, and the identifier of the interworking function network element-user plane may be an identifier of the interworking function network element. Certainly, the information about the interworking function network element-user plane may be allocated by the interworking function network element-control plane to the interworking function network element-user plane. Alternatively, the information about the interworking function network element-user plane may be autonomously al located by the interworking function network element-user plane, and then sent to the interworking function network element-control plane. When the interworking function network element-user plane autonomously allocates the information about the user plane, the interworking function network element-user plane may allocate the information about the user plane to the interworking function network element-user plane at a request of the interworking function network element-control plane.

For example, the information about the inter-working function network element-user plane may be referred to as downlink access network (AN) tunnel information. For example, the information about the interworking function network element-user plane may be the identifier or an address of the interworking function network element.

For example, the information about the user plane network element may be an identifier of the user plane network element, an address of the user plane network element, or a tunnel endpoint identifier (TEID) of the user plane network element. The information about the user plane network element may be referred to as uplink CN tunnel information.

Step 521: The user plane network element receives the information about the interworking function network element-user plane from the interworking function network element-control plane.

After step 520 and step 521 are performed, the user plane network element can determine the downlink AN tunnel information.

Step 522: The interworking function network element-control plane sends the information about the user plane network element to the interworking function network element-user plane.

Step 523: The interworking function network element-user plane receives the information about the user plane network element from the interworking function network element-control plane.

In addition, the interworking function network element-user plane may further establish a correspondence between the session information of the terminal and the downlink AN tunnel information, and establish a correspondence between the uplink CN tunnel information and the session information of the terminal. In this way, a user plane connection may be established between the interworking function network element-user plane and the user plane network element. For example, the user plane connection between the interworking function network element-user plane and the user plane network element may be a GPRS tunneling protocol (GTP) tunnel.

Still with reference to FIG. 5A to FIG. 5D, in another embodiment of this application, after step 523, the method provided in this embodiment of this application may further include the following steps.

Step 524: The terminal processes a data packet by using the obtained session address information, to obtain a processed data packet. It should be understood that the processed data packet in step 524 carries the session address information.

Step 525: The terminal sends the processed data packet to the access network gateway.

For example, the terminal may send the processed data packet to the access network gateway by using a PPPoE/IPoE session.

Step 526: The access network gateway receives the data packet from the terminal, where the data packet includes the session address information.

Step 527: The access network gateway processes the data packet based on the session address information by using the data encapsulation information.

For example, the access network gateway may decapsulate the data packet to obtain the session address information carried in the data packet from the terminal.

Specifically, step 527 in this embodiment of this application may be specifically implemented in the following manner: Because the access network gateway has a correspondence between the session address information and the terminal identifier information, the access network gateway may determine, based on the session address information, the terminal identifier information corresponding to the data packet. After determining the terminal identifier information corresponding to the data packet, the access network gateway determines, based on the correspondence between the terminal identifier information and the data encapsulation information, to use the data encapsulation information associated with the terminal identifier information to process the data packet.

For example, the data encapsulation information is a GRE protocol header. In this case, the access network gateway processes the data packet by using the GRE protocol header.

It should be understood that, in step 527, the access network gateway may further encapsulate the device address of the access network gateway in an outer layer of a data packet encapsulated by using the GRE protocol header. The device address of the access network gateway is carried, to help the interworking function network element-user plane determine which access network gateway sends the data packet encapsulated by using the GRE protocol header.

Step 528: The access network gateway sends a processed data packet to the interworking function network element-user plane through the user plane connection.

Specifically, the access network gateway may further send the processed data packet through IP layers of the access network gateway and the interworking function network element-user plane.

Step 529: The interworking function network element-user plane receives the processed data packet from the access network gateway.

Step 530: The interworking function network element-user plane decapsulates the processed data packet, to obtain session the address information in the data packet.

Specifically, after receiving the data packet encapsulated by using the data encapsulation information, the interworking function network element-user plane may split the data encapsulation information, to identify the session address information in the data packet.

Step 531: The interworking function network element-user plane sends a decapsulated data packet to the user plane network element based on a correspondence between the session address information and the information about the user plane network element.

Certainly, in step 531, the interworking function network element-user plane further needs to process the decapsulated data packet by using a data packet processing protocol between the interworking function network element-user plane and the user plane network element. In addition, after the information about the user plane network element is determined based on the correspondence between the session address information and the information about the user plane network element, the interworking function network element-user plane may send the data packet to the user plane network element through the GTP tunnel, where the GTP tunnel is the user plane connection between the user plane network element and the interworking function network element-user plane.

Still with reference to FIG. 5A to FIG. 5D, in another embodiment of this application, after step 523, the method provided in this embodiment of this application may further include the following steps.

Step 532: The user plane network element obtains a data packet, where the data packet carries session address information.

For example, the user plane network element may obtain a data packet from a DN.

Step 533: The user plane network element sends the data packet to the interworking function network element-user plane.

Figure 8:
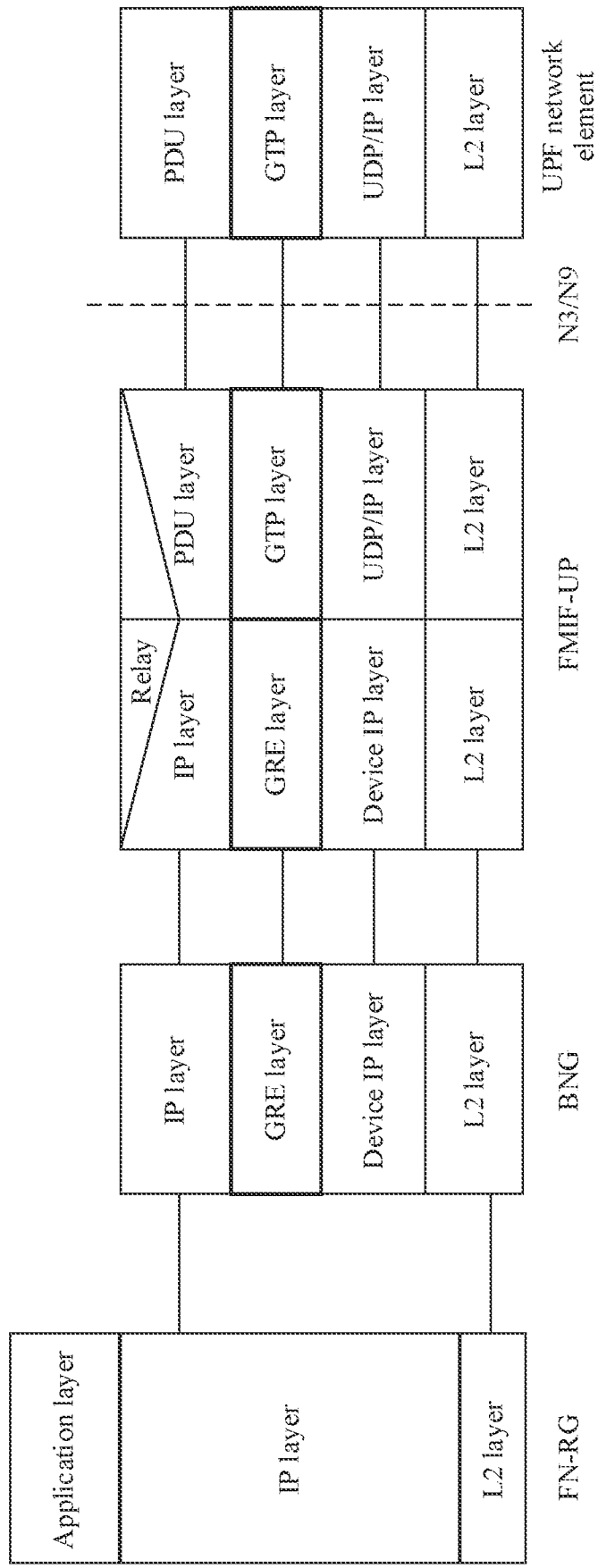
FIG. 8 is a schematic diagram of a user plane protocol stack according to an embodiment of this application.

It should be understood that when performing step 533, the user plane network element needs to perform, on the data packet, protocol stack processing shown in FIG. 8.

Specifically, after decapsulating the data packet from the DN, the user plane network element obtains the session address information. The user plane network element sends the data packet to the interworking function network element-user plane through a downlink AN tunnel based on a correspondence between the session address information and the information about the interworking function network element-user plane.

Step 534: The interworking function network element-user plane receives the data packet from the user plane network element.

Step 535: The interworking function network element-user plane encapsulates the data packet by using the data encapsulation information, and sends a data packet encapsulated by using the data encapsulation information to the access network gateway through the user plane connection.

For example, after decapsulating the data packet from the user plane network element, the interworking function network element-user plane obtains the session address information. The interworking function network element-user plane determines the data encapsulation information based on the session address information. After determining the data encapsulation information, the interworking function network element-user plane processes the data packet by using the data encapsulation information, and then sends the data packet to the access network gateway through the user plane connection.

Step 536: The access network gateway receives the data packet from the interworking function network element-user plane, where the data packet includes the session address information.

Step 537: The access network gateway decapsulates the data packet to obtain the session address information.

Step 538: The access network gateway sends the data packet to the terminal based on the session address information and a correspondence between the session address information and a connection between the access network gateway and the terminal.

It should be understood that step 524 to step 531 are used to describe a process of transmitting a data packet from the terminal to the user plane network element. Step 532 to step 538 are used to describe a process of transmitting a data packet from the user plane network element to the terminal. Step 524 to step 531 and step 532 to step 538 may be performed in parallel without a sequence.

For example, the access network gateway identifies the session address information in the data packet from the interworking function network element-user plane, and sends the data packet to the terminal based on the correspondence between the session address information and the connection between the access network gateway and the terminal.

FIG. 6A to FIG. 6D show a control plane connection establishment method according to an embodiment of this application. The method includes the following steps.

Step 601: An interworking function network element-control plane determines that a first control plane connection is to be established between the interworking function network element-control plane and an access network gateway.

Step 602: The interworking function network element-control plane sends a second request message to a mobility management network element, where the second request message includes terminal identifier information. For example, the mobility management network element may be the AMF network element in FIG. 2.

For example, the second request message sent by the interworking function network element-control plane to the mobility management network element may be a registration request message. After receiving the second request message, the mobility management network element may request a core network element to authenticate a terminal based on the terminal identifier information. After determining that the terminal is successfully authenticated, the core network element generates a first security key and a second security key. Then, the core network element may send the first security key and the second security key to the mobility management network element.

It should be noted that if the core network element determines that the terminal fails to be authenticated, the core network element may not generate the first security key and the second security key.

Step 603: The interworking function network element-control plane receives the first security key from the mobility management network element.

For example, the mobility management network element may send the first security key to the interworking function network element-control plane in a process of sending an authentication result of the terminal to the interworking function network element-control plane.

Step 604: The interworking function network element-control plane sends the first security key to the access network gateway, where the first security key is used to establish the first control plane connection between the interworking function network element-control plane and the access network gateway.

For example, the interworking function network element-control plane sends the first security key to the access network gateway in a process of sending the authentication result of the terminal to the access network gateway, so that the access network gateway can receive the first security key in parallel in a process of receiving the authentication result of the terminal.

For example, the authentication result of the terminal and the first security key may be carried in an IKE_AUTH message.

Step 605: The access network gateway receives the first security key from the interworking function network element-control plane.

Step 606: The access network gateway establishes the first control plane connection between the interworking function network element-control plane and the access network gateway based on the first security key.

Two endpoints of the first control plane connection are the access network gateway and the interworking function network element-control plane. Therefore, after separately obtaining the same first security key, the interworking function network element-control plane and the access network gateway can establish the first control plane connection based on the first security key.

For example, for uplink, the access network gateway may encrypt, by using the first security key, a first control plane message to be sent to the interworking function network element-control plane, to obtain an encrypted first control plane message. The access network gateway sends the encrypted first control plane message to the interworking function network element-control plane. After receiving the encrypted first control plane message, the interworking function network element-control plane may obtain the first control plane message through decryption.

For downlink, the interworking function network element-control plane may encrypt, by using the first security key, a first control plane message to be sent to the access network gateway, to obtain an encrypted first control plane message. The interworking function network element-control plane sends the encrypted first control plane message to the access network gateway. After receiving the encrypted first control plane message, the access network gateway may obtain the first control plane message through decryption.

For example, the first control plane connection may be an IPsec SA tunnel. After the IPsec SA tunnel is established, the IPsec SA tunnel may be configured based on a deployment requirement. The interworking function network element-control plane allocates address information for the first control plane connection. The address information of the first control plane connection includes address information of the access network gateway side and address information of the interworking function network element-control plane side.

For example, the address information of the access network gateway side is used by the interworking function network element-control plane to encapsulate a terminal-related control plane message between the access network gateway and the interworking function network element-control plane. The address information of the access network gateway side may be referred to as terminal-related address information.

The address information of the interworking function network element-control plane side is used by the access network gateway to encapsulate a terminal-related control plane message between the access network gateway and the interworking function network element-control plane. The address information of the interworking function network element-control plane side may be referred to as address information related to the mobility management network element.

The address information of the first control plane connection is an address pair, and the address information of the interworking function network element-control plane side and the address information of the access network gateway side are cooperatively used depending on uplink or downlink.

It should be understood that, when the interworking function network element-control plane sends a downlink control plane message to the access network gateway, the downlink control plane message is processed by using the address information of the access network gateway side and a device address of the interworking function network element-control plane. The device address of the interworking function network element-control plane is used by the access network gateway to determine that the downlink control plane message comes from the interworking function network element-control plane. The address information of the access network gateway side is used to determine the terminal to which the downlink control plane message is transmitted. When the access network gateway sends an uplink control plane message to the interworking function network element-control plane, the uplink control plane message is processed by using the address information of the interworking function network element-control plane side and a device address of the access network gateway. The device address of the access network gateway is used by the interworking function network element-control plane to determine that the uplink control plane message comes from the access network gateway. The address information of the interworking function network element-control plane side is used by the interworking, function network element-control plane to determine the mobility management network element to which the uplink control plane message is transmitted.

For example, the address information of the access network gateway side in the address information of the first control plane connection may be an address allocated by the interworking function network element-control plane to the terminal. For example, a tunnel mode or transport mode may be configured for the IPsec SA tunnel.

In another possible embodiment, with reference to FIG. 6A to FIG. 6D, after step 606, the method provided in this embodiment of this application may further include the following steps.

Step 607: The interworking function network element-control plane receives the second security key from the mobility management network element, where the second security key is used to establish a second control plane connection between the interworking function network element-control plane and the mobility management network element.

Step 608: The interworking function network element-control plane establishes the second control plane connection based on the second security key.

Two endpoints of the second control plane connection are the mobility management network element and the interworking function network element-control plane. Therefore, after obtaining the same second security key, the interworking function network element-control plane and the mobility management network element can establish the second control plane connection based on the second security key.

For example, the interworking function network element-control plane may encrypt, by using the second security key, a control plane message to be sent to the mobility management network element, to obtain an encrypted control plane message. The interworking function network element-control plane sends the encrypted control plane message to the mobility management network element, After receiving the encrypted control plane message, the mobility management network element obtains the control plane message through decryption.

For example, the second control plane connection may be a secure N2 message channel, and the secure N2 message channel and the IPsec SA tunnel each are at a terminal granularity. To be specific, each terminal is associated with one first control plane connection and one second control plane connection. A first control plane connection and a second control plane connection that are associated with a terminal are used to transmit a terminal-related control plane message. For example, the access network gateway may send a terminal-related control plane message to the interworking function network element-control plane through the first control plane connection, or the access network gateway receives, through the first control plane connection, a control plane message sent by the interworking function network element-control plane to the terminal. For another example, the interworking function network element-control plane may send a terminal-related control plane message to the mobility management network element through the second control plane connection, or the interworking function network element-control plane receives, through the second control plane connection, a control plane message sent by the mobility management network element to the terminal.

It should be noted that the first control plane connection and the second control plane connection may be established in parallel. In other words, when the first control plane connection is established, the second control plane connection is also established.

For example, address information of the second control plane connection includes address information of the interworking function network element-control plane side and address information of the mobility management network element side. The access network gateway may process, by using the address information of the mobility management network element side, a control plane message to be sent to the mobility management network element. The mobility management network element may process, by using the address information of the interworking function network element-control plane side, a control plane message to be sent to the access network gateway. The address information of the interworking function network element-control plane side in the address information of the second control plane connection may be the same as or different from the address information of the interworking function network element-control plane side in the address information of the first control plane connection. This is not limited in this embodiment of this application.

In still another possible embodiment, still with reference to FIG. 6A to FIG. 6D, before step 601, the method provided in this embodiment of this application may further include the following steps.

Step 609: The access network gateway sends a registration request message to the interworking function network element-control plane, where the registration request message includes the terminal identifier information and any one or more of the following information: a request for establishing a control plane connection or an authentication request message, and the authentication request message is used to request to authenticate the terminal.

When the access network gateway identifies a data packet and finds that the data packet needs to be processed by a 5GC, the access network gateway may send the registration request message to the interworking function network element-control plane, to request the 5GC to process the data packet. It should be understood that the request for establishing the control plane connection is an optional information element. In this case, even if the registration request message does not carry the request for establishing the control plane connection, the interworking function network element-control plane may determine that the first control plane connection needs to be established.

Before step 609 is performed, the method provided in this embodiment of this application may further include: The access network gateway and the selected the interworking function network element-control plane perform security association (SA) through exchange of a first IKE message. Then, an IKE message transmitted between the access network gateway and the interworking function network element-control plane through the SA is encrypted and integrity protected.

For example, the registration request message may be carried in an IKE_AUTH message.

Step 610: The interworking function network element-control plane receives the registration request message from the access network gateway.

Correspondingly, step 601 may be specifically implemented in the following manner: The interworking function network element-control plane determines, based on the registration request message, that the first control plane connection is to be established. It should be understood that, if the interworking function network element-control plane autonomously determines that the first control plane connection is to be established, the registration request message may not carry the request for establishing the control plane connection.

In addition, step 609 is described by using an example in which the terminal identifier information, the request for establishing the control plane connection, and the authentication request message are carried in a same message. Certainly, the access network gateway may alternatively first send the authentication request message to the interworking function network element-control plane, and then send the terminal identifier information and the request for establishing the control plane connection to the interworking function network element-control plane after determining that the terminal is successfully authenticated. In this way, a process of establishing the first control plane connection is performed only when the terminal is successfully authenticated.

Still with reference to FIG. 6A to FIG. 6D, in another possible embodiment of this application, after step 606, the method provided in this embodiment of this application may further include the following steps.

Step 611: The interworking function network element-control plane sends the address information of the first control plane connection to the access network gateway, where the address information of the first control plane connection includes the address information of the access network gateway side and the address information of the interworking function network element-control plane side.

Step 612: The access network gateway receives the address information of the first control plane connection from the interworking, function network element-control plane. After step 612, the access network gateway may have a correspondence between the terminal identifier information, a local address of the terminal or an identifier of a first connection, and the address information of the first control plane connection. In this way, a control plane message that carries the terminal identifier information/the local address of the terminal or the first connection can be sent by the access network gateway to the interworking function network element-control plane through the first control plane connection.

The local address of the terminal is an address allocated by the access network gateway to the terminal when the terminal is successfully authenticated.

Still with reference to FIG. 6A to FIG. 6D, in another possible embodiment of this application, after step 611, the method provided in this embodiment of this application may further include the following steps.

Step 613: The interworking function network element-control plane determines that a user plane connection corresponding to a PDU session is to be established between an interworking function network element-user plane and the access network gateway.

It should be noted that, before step 613, the method may further include: The access network gateway sends a 5G request to the interworking function network element-control plane through the first control plane connection between the access network gateway and the interworking function network element-control plane. The interworking function network element-control plane determines a session of the terminal based on the 5G request. If the interworking function network element-control plane determines that a PDU session exists, the interworking function network element-control plane maps the 5G request to the PDU session. If the interworking function network element-control plane determines that a PDU session does not exist, the interworking function network element-control plane establishes a corresponding PDU session for the 5G request.

The method provided in this embodiment of this application further includes: The interworking function network element-control plane sends address information of the user plane connection to the access network gateway and the interworking function network element-user plane.

The interworking function network element-control plane establishes the user plane connection at a PDU session granularity between the access network gateway and the interworking function network element-user plane. The user plane connection is identified based on the address information of the user plane connection.

In a possible implementation, the address information of the user plane connection includes address information of the interworking function network element-user plane side and address information of the access network gateway side. In a possible implementation, the address information of the access network gateway side in the address information of the user plane connection is associated with the local address of the terminal, and the address information of the interworking function network element-user plane side is associated with a PDU session address.

The address information of the access network gateway side is used by the interworking function network element-user plane to encapsulate a terminal-related data packet between the access network gateway and the interworking function network element-user plane. The address information of the access network gateway side in the address information of the user plane connection may be the same as the address information of the access network gateway side in the address information of the first control plane connection.

The address information of the interworking function network element-user plane side is used to assist the interworking function network element-user plane in obtaining the PDU session address that the data packet comes from.

The address information of the user plane connection is an address pair. For example, the address information of the access network gateway side may be referred to as a terminal-related address, and the address information of the interworking function network element-user plane side may be referred to as a PDU-related address. The address information of the access network gateway side and the address information of the interworking function network element-user plane side are cooperatively used depending on uplink or downlink.

In a possible implementation, the address information of the interworking function network element-user plane side is the MU session address.

In addition, the first control plane connection is at a terminal granularity. Therefore, when the 5G request is sent through the first control plane connection, the 5G request may not need to carry the terminal identifier information.

Regardless of whether the PDU session is newly established or already exists, after the PDU session is determined, the interworking function network element-control plane may determine the PDU session address. The PDU session address may be obtained by the interworking function network element-control plane in a process in which the core network establishes the session for the terminal.

Step 614: The interworking function network element-control plane sends the PDU session address to the access network gateway and the interworking function network element-user plane.

Specifically, the interworking function network element-control plane may determine that the user plane connection corresponding to the PDU session is to be established. For example, a granularity of the user plane connection may be a session granularity, and the user plane connection may be an IPsec child SA.

A tunnel mode or transport mode may be configured for the IPsec child SA.

Step 615: The access network gateway receives the PDU session address from the interworking function network element-control plane.

Step 616: The interworking function network element-user plane receives the PDU session address from the interworking function network element-control plane.

It should be understood that after the access network gateway and the interworking function network element-user plane separately obtain the address of the session of the terminal, the user plane connection between the interworking function network element-user plane and the access network gateway is successfully established. The address information of the access network gateway side in the address information of the user plane connection is associated with the local address of the terminal, and the address information of the interworking, function network element-user plane side is associated with the PDU session address.

In a specific implementation, the access network gateway and the interworking function network element-user plane may determine a correspondence between the local address or an identifier of the data packet and the PDU session.

In a specific implementation, the interworking function network element-control plane may further establish a user plane connection between the interworking function network element-user plane and a user plane network element. For a specific process, refer to the descriptions in the embodiment shown in FIG. 5A to FIG. 5D. Details are not described herein again.

One PDU session may correspond to one user plane network element. Therefore, if the user plane connection between the interworking function network element-user plane and the access network gateway is associated with a PDU session 1, the interworking function network element-control plane establishes a user plane connection between the interworking function network element-user plane and a user plane network element corresponding to the PDU session 1.

In a possible embodiment, still with reference to FIG. 6A to FIG. 6D, after step 616, the method provided in this embodiment of this application may further include the following steps.

Step 617: The terminal encapsulates a data packet by using the local address.

It should be understood that the data packet may carry information for determining the terminal, for example, the terminal identifier information.

Step 618: The terminal sends a data packet encapsulated by using the local address to the access network gateway.

For example, the terminal may send the data packet encapsulated by using the local address to the access network gateway through the first connection (for example, a PPPoE/IPoE session) between the terminal and the access network gateway.

Step 619: The access network gateway receives the data packet from the terminal, that is, the foregoing data packet encapsulated by using the local address.

Step 620: The access network gateway decapsulates the data packet to obtain the local address.

Step 621: The access network gateway processes a decapsulated data packet based on the local address by using the address information of the interworking function network element-user plane side, and replaces the local address in the data packet with a second address, to obtain a processed data packet, where the second address is the device address of the access network gateway.

It should be understood that, in step 621, the data packet processed by the access network gateway includes at least the address information of the interworking function network element-user plane side and the second address. The second address is used by the interworking function network element-user plane to determine that the data packet comes from the access network gateway. The address information of the interworking function network element-user plane side is used to determine a PDU session address that the data packet comes from, so that the interworking function network element-user plane determines, based on the PDU session address, a user plane network element to which the data packet is transmitted.

It should be understood that for a data packet corresponding to a PDU session 1 (a PDU session between the terminal and a user plane network element 1), the access network gateway may process the data packet by using an address of the PDU session 1, and then send a processed data packet to the interworking function network element-user plane. In this way, the interworking function network element-user plane can send the data packet to the user plane network element 1.

Step 622: The access network gateway sends the processed data packet to the interworking function network element-user plane through the user plane connection.

Step 623: The interworking function network element-user plane receives the processed data packet from the access network gateway.

Step 624: The interworking function network element-user plane decapsulates the data packet to obtain the address information of the interworking function network element-user plane side and the device address of the access network gateway that are carried in the data packet.

Step 625: The interworking function network element-user plane processes the data packet based on the address information of the interworking function network element-user plane side and a correspondence between the PDU session address and information about the user plane network element, and then sends a processed data packet to the user plane network element.

The address information of the interworking function network element-user plane side is associated with or the same as the PDU session address. Therefore, the interworking function network element-user plane can determine the PDU session address based on the address information of the interworking function network element-user plane side. Then, the interworking function network element-user plane sends the processed data packet to the user plane network element through the user plane connection between the interworking function network element-user plane and the user plane network element based on the correspondence between the PDU session address and the information about the user plane network element.

For downlink, refer to descriptions in step 626 to step 634.

Step 626: The user plane network element obtains a data packet, where the data packet carries a PDU session address.

Step 627: The user plane network element sends the data packet to the interworking function network element-user plane.

Specifically, the user plane network element identifies the PDU session address in the data packet. Then, the user plane network element determines, based on a correspondence between the PDU session address and downlink AN tunnel information, the interworking network element-user plane to which the data packet is transmitted. Then, the user plane network element sends the data packet to the interworking function network element-user plane through the user plane connection between the user plane network element and the interworking function network element-user plane.

Step 628: The interworking function network element-user plane receives the data packet from the user plane network element.

Step 629: The interworking function network element-user plane decapsulates the data packet to obtain the PDU session address carried in the data packet.

Step 630: The interworking function network element-user plane processes a decapsulated data packet based on the PDU session address by using the address information of the access network gateway side, to obtain a processed data packet.

Figure 13:
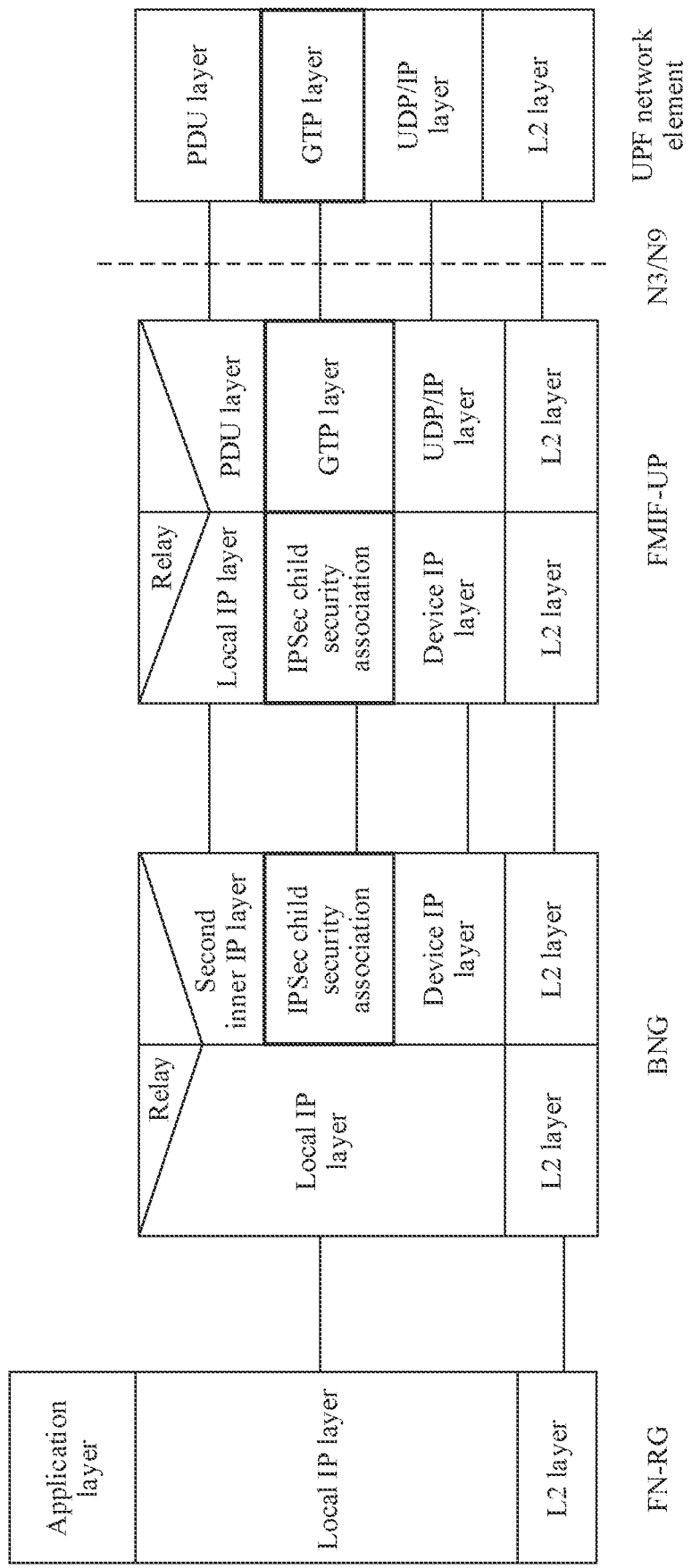
FIG. 13 is a schematic diagram of another user plane protocol stack according to an embodiment of this application.

Step 631: The access network gateway receives a data packet from the interworking function network element-user plane, where the data packet includes the PDU session address. In addition, as shown in FIG. 13, the data packet may further carry a device address of the interworking function network element-user plane.

Step 632: The access network gateway decapsulates the data packet to obtain the address information of the access network gateway side.

Step 633: The access network gateway replaces the address information of the access network gateway side in a decapsulated data packet with the local address, to obtain a processed data packet.

For example, an address on the access network gateway side is used to determine the terminal to which the data packet is transmitted. For example, the PDU session address carried in the data packet is an address 1. The address 1 is associated with FN_RG_IP_ADDRESS1, and FN_RG_IP_ADDRESS1 points to a terminal 1. In this case, the address information of the access network gateway side may be FN_RG_IP_ADDRESS1. In this way, after receiving a data packet encapsulated by using FN_RG_IP_ADDRESS1, the access network gateway can determine that the data packet is to be transmitted to the terminal 1, and the access network gateway can replace the address in the data packet with a local address of the terminal 1.

Step 634: The access network gateway sends the processed data packet to the terminal.

The following provides descriptions by using an example in which user plane connection establishment methods described in FIG. 7A to FIG. 7D to FIG. 13 are applied to an NR system or a 5G communications system.

FIG. 7A to FIG. 7D are a specific schematic flowchart of a user plane connection establishment method according to an embodiment of this application. In FIG. 7A to FIG. 7D, for example, a terminal is an FN-RG, an access network gateway is a BNG, and an interworking function network element is an FMIF. In this embodiment, an FMIF-CP determines that a GRE tunnel at a BNG granularity is to be established as a user plane connection between the BNG and an FMIF-UP The method includes the following steps.

Step 701: Establish an L2 connection between the FN-RG and the BNG.

Step 702: Establish an L2 connection between the BNG and the FMIF.

For a process of establishing the L2 connection between the FN-RG and the BNG or between the BNG and the FMIF, refer to descriptions in the conventional technology. Details are not described herein.

Step 703: The BNG performs an authentication procedure on the FN-RG.

It should be noted that if the BNG has an AAA connection, the BNG may directly perform authentication on the FN-RG. If the BNG does not have an AAA connection, authentication of the FN-RG needs to be performed by a 5GC. Authentication of FN-RG access to the 5GC is simpler in a case in which the BNG has the AAA connection, compared with a case in which the BNG does not have the AAA connection. Specifically, for details about authentication of the FN-RG in the case in which the BNG does not have the AAA connection, refer to descriptions in the conventional technology. It should be understood that step 702 is an optional step.

Specifically, step 703 may be implemented in the following manner: The FN-RG sends an authentication request message to the BNG; and the BNG performs step 703 after receiving the authentication request message from the FN-RG.

For example, the authentication request message in this embodiment of this application may be an extensible authentication protocol (EAP) request message.

Step 704: The FN-RG sends a PPPOE session request/an IPoE session request to the BNG, so that the BNG receives the PPPoE/IPoE session request from the FN-RG.

Usually, when the FN-RG needs to receive a service from a network, the FN-RG needs to select a PPPoE procedure or an IPoE procedure to obtain a connection to the network.

Step 705: The BNG identifies a service flow, and the BNG determines, based on the identified service flow to initiate a PDU session.

For example, identification of the service flow may be session information or a virtual local area network (VLAN) tag. If the BNG determines to initiate the PDU session, and the FN-RG does not register with the 5GC, the BNG first performs a registration procedure to register the FN-RG with the 5GC.

Step 706: The BNG obtains an IP address of the FMIF-CP, and the FMIF-CP obtains an IP address of the BNG.

Specifically, step 706 may be implemented in the following manner: The BNG and the FMIF-CP each obtain the IP address of the other party by using a dynamic host configuration protocol (DHCP) procedure or a PPPoE procedure. For example, the BNG obtains the IP address of the FMIF-CP by using the DHCP procedure or the PPPoE procedure. The FMIF-CP obtains the IP address of the BNG by using the DHCP procedure or the PPPoE procedure.

It should be noted that the FMIF-CP has an address 1, and the FMIF-UP has an address 2, The address of the FMIF-CP may be the same as or different from the address of the FMIF-UP, When the FMIF-CP and the FMIF-UP share a same address, the address 1 and the address 2 are the same (for example, may be an IP address of the FMIF). Certainly, the address 1 may be different from the address 2, but there is a correspondence between the address 1 and the address 2. Message exchange between the FMIF-CP and the FMIF-UP belongs to inner message exchange in the FMIF.

Step 707: The BNG sends a request message to the FMIF-CP, where the request message includes a line ID of the IFN-RG. Optionally, the request message may further include the authentication request message or a user plane (UP) establishment request.

For example, the request message may be a Diameter message/a remote authentication dial-in user service (RADIUS) message. The Diameter message/the RADIUS message may be the first request message in the foregoing embodiment.

It should be understood that the line ID of the FN-RG is the terminal identifier information in the foregoing embodiment.

Step 708: The FMIF-CP selects an AMF network element.

Step 709: The FMIF-CP sends a registration request message to the AMF network element by using an N2 message, where the registration request message carries the line ID of the FN-RG.

Step 710: A core network element in a core network performs authentication on the FN-RG.

It should be understood that the core network elements in step 710 include a control plane network element and a user plane network element that are in the core network and that are required for authenticating the FN-RG. For details about the core network element, refer to descriptions in the conventional technology. Details are not described herein.

Specifically, the control plane network element authenticates the FN-RG based on the line ID, and obtains an authentication result of the FN-RG from an AUSF network element or a. UDM network element.

Step 711: The AMF network element sends an N2 message to the FMIF-CP, so that the FMIF-CP receives the N2 message, where the N2 message includes the line ID and the authentication result of the FN-RG.

The IP address of the BNG is obtained by using the PPPoE procedure.

Interaction between the FN-RG and the BNG may all be performed by using the IP address.

Step 712: The FMIF-CP determines that the FN-RG is successfully authenticated, and the FMIF-CP determines configuration information of the user plane connection based on policy information and the line ID.

The configuration information of the user plane connection includes a BNG granularity indication and a GRE protocol header. The BNG granularity indication is used to indicate to establish the user plane connection at the BNG granularity. The GRE protocol header is used to indicate to encapsulate, by using the GRE protocol header, a data packet to be transmitted through the user plane connection.

It should be understood that the GRE protocol header is a type of the data encapsulation information in the foregoing embodiment, and the BNG granularity indication is a type of the granularity information of the user plane connection.

For example, step 712 may be implemented in the following manner: The FMIF-CP generates the configuration information of the user plane connection based on a deployment policy of an operator (for example, a correspondence between an FMIF-CP and an FMIF-UP), a load status of the FMIF-UP, the line ID, and the like. For example, if the operator deploys a 1:1 correspondence between an FMIF-CP and an FMIF-UP and the FMIF-UP is not overloaded, the FMIF-CP preferentially establishes a user plane connection at a BNG granularity for an FN-RG. Then, after the FN-RG is successfully authenticated, data packets for all service flows for the FN-RG from the same BNG are transmitted through the user plane tunnel at the BNG granularity. Alternatively, if the operator deploys a 1:N (N>1) correspondence between an FMIF-CP and FMIF-UPs, and an FMIF-UP@1 selected from the FMIF-UPs is overloaded, the FMIF-CP selects an FMIF-UP@2 for the FN-RG. The user plane connection may be at the BNG granularity.

If the FMIF-CP and the FMIF-UP have different addresses, the FMIF-CP further needs to indicate the address of the FMIF-UP to the BNG.

Step 713: The FMIF-CP sends the authentication result of the FN-RG, the line ID, and the configuration information of the user plane connection to the BNG.

In an optional implementation, the FMIF-CP may further send a registration complete message to the AMF network element. In addition, it should be noted that the authentication result of the FN-RG may be carried in a same message as the line ID and the configuration information of the user plane connection, to reduce signaling overheads. Certainly, the FMIF-CP may alternatively send the authentication result of the FN-RG to the BNG independently.

For example, step 713 may be specifically implemented in the following manner: The FMIF-CP sends a Diameter message/a RADIUS message to the BNG. The Diameter message/the RADIUS message carries the authentication result of the FN-RG, the line ID, and the configuration information of the user plane connection, and is sent to the BNG.

Step 714: The BNG receives the authentication result of the FN-RG, the line ID, and the configuration information of the user plane connection from the FMIF-CP.

Step 715: After obtaining the authentication result of the FN-RG and an UP establishment method, the BNG stores a correspondence between the line ID and the configuration information of the user plane connection.

Step 716: The BNG sends a 5G request to the FMIF-CP for a session requested by the FN-RG, where the 5G request includes the line ID.

A purpose of the 5G request is that the FN-RG may initiate a plurality of PPPoE/IPoE sessions. The plurality of PPPoE/IPoE sessions may all be used to transfer data packets to the FMIF-UP by using the BNG. To identify a correspondence between a data packet and a. PPPoE/IPoE session, the BNG needs to include a message in a control plane establishment request, to distinguish between different session requests for the FN-RG from the control plane. Otherwise, the control plane establishes one PDU session for the FN-RG.

Step 717: The FMIF-CP identifies the line ID, and maps the 5G request including the line ID to a corresponding PDU session.

It should be understood that if the FMIF-CP determines that no PDU session corresponds to the line ID, the FMIF-CP allocates a new PDU session ID for the line ID, and the FMIF-CP sends an N2 message to the AMF network element, where the N2 message includes a PDU session request. The PDU session request carries the new PDU session ID allocated by the FMIF-CP for the line ID. The 5GC allocates information such as an IP address and information about a user plane network element (for example, uplink core network (CN) tunnel information) for the PDU session based on an existing procedure, and sends the information to the FMIF-CP.

Step 718: The FMIF-CP determines the IP address of the PDU session corresponding to the line ID and a PDU session ID, to obtain a correspondence between the line ID and the PDU session ID and a correspondence between the line ID and the IP address.

Step 719: The FMIF-CP sends a control plane message to the BNG based on the correspondence between the line ID and the configuration information of the user plane connection and a correspondence between the line ID and the PDU session (the PDU session ID and the IP address), where the control plane message includes the IP address of the PDU session.

Step 720: The BNG sends the IP address of the PDU session to the FN-RG by using a. PPPoE/IPoE session, and uses the IP address as an IP address of the PPPoE/IPoE session. The BNG stores a correspondence between the line ID, a PPPoE/IPoE session ID, and the IP address.

Step 721: The FMIF-CP sends the uplink CN tunnel information (for example, a TEID of a UPF network element) and the configuration information of the user plane connection to the FMIF-UP, so that the FMIF-UP receives the uplink CN tunnel information and the configuration information of the user plane connection.

Step 722: The FMIF-UP allocates information about the FMIF-CP, and sends the information about the FMIF-CP to the FMIF-CP.

For example, the information about the FMIF-CP may be downlink AN tunnel information.

Step 723: The FMIF-CP sends the information about the FMIF-CP to the UPF network element.

Step 724: The FMIF-UP determines a correspondence between the IP address of the PDU session and the GRE protocol header. In this way, the GRE tunnel between the FMIF-UP and the BNG is established.

Step 725: The FMIF-UP determines a correspondence between the IP address of the PDU session and the uplink CN tunnel information and a correspondence between the information about the FMIF-CP and the IP address of the PDU session. In this way, a GPRS tunneling protocol (GTP) tunnel between the FMIF-UP and the UPF network element is established.

It should be understood that, after the GTP tunnel is established between the FMIF-UP and the UPF network element and the GRE tunnel is established between the FMIF-UP and the BNG, a data packet can be transmitted between the terminal and the UPF network element through the GTP tunnel and the GRE tunnel. Therefore, in a possible embodiment, after step 725, the method may further include the following steps.

Step 726: For an uplink data packet, the FN-RG processes the uplink data packet by using the obtained IP address of the PDU session, to obtain a processed uplink data packet, where the processed uplink data packet carries the IP address of the PDU session.

It should be understood that the uplink data packet may be a data packet of the FN-RG, or may be a data packet of another terminal that accesses the 5GC by using the FN-RG.

Step 727: The FN-RG sends the processed uplink data packet to the BNG by using a PPPoE/IPoE session.

Step 728: The BNG decapsulates the processed uplink data packet to obtain the IP address of the PDU session. The BNG encapsulates the uplink data packet by using the GRE protocol header based on the correspondence between the line ID and the IP address of the PDU session and a correspondence between the line ID and the GRE protocol header. The BNG sends an uplink data packet encapsulated using the GRE protocol header to the FMIF-UP through IP layers of the BNG and the FMIF-UP.

Optionally, the uplink data packet encapsulated by using the GRE protocol header may further carry a device address of the BNG.

Step 729: The FMIF-UP decapsulates the uplink data packet encapsulated by using the GRE protocol header, and identifies the IP address of the PDU session. The FMIF-UP sends an uplink data packet to the UPF network element through the GTP tunnel based on the correspondence between the IP address of the PDU session and the uplink CN tunnel information.

Step 730: For a downlink data packet, the UPF network element sends the downlink data packet to the FMIF-UP through a downlink AN tunnel.

Step 731: The FMIF-UP identifies the IP address of the PDU session carried in the downlink data packet. The FMIF-UP sends the downlink data packet to the BNG through the GRE tunnel based on the correspondence between the IP address of the PDU session and the GRE protocol header.

Step 732: The BNG identifies the IP address of the PDU session, and sends the downlink data packet to the FN-RG based on a correspondence between the IP address of the PDU session and a PPPoE/IPoE session ID.

It should be understood that, after the FN-RG receives the downlink data packet, if the FN-RG determines that the downlink data packet is sent to the FN-RG, the FN-RG may process the downlink data packet. If the FN-RG determines that the received downlink data packet is sent to another terminal that accesses the FN-RG, the FN-RG sends the downlink data packet to the another terminal.

For details about a user plane protocol stack used in this embodiment shown in FIG. 7A to FIG. 7D, refer to FIG. 8. As shown in FIG. 8, devices related to the user plane protocol stack include the FN-RG, the BNG, the FMIF-UP, and the UPF network element. A user plane protocol stack of the FN-RG sequentially includes an application layer, an interact protocol (IP) layer, and an L2 layer from top to bottom. A user plane protocol stack of the BNG sequentially includes an IP layer, a GRE layer, a device IP layer, and an L2 layer from top to bottom. The IP layer of the BNG corresponds to the IP layer of the FN-RG, and the L2 layer of the BNG corresponds to the L2 layer of the FN-RG.

A user plane protocol stack of the FMIF-UP includes a first protocol stack and a second protocol stack. The first protocol stack sequentially includes an IP layer, a GRE layer, a device IP layer, and an L2 layer from top to bottom. The IP layer of the FMIF-UP corresponds to the IP layer of the BNG, the GRE layer of the FMIF-UP corresponds to the GRE layer of the BNG, the device IP layer of the FMIF-UP corresponds to the device IP layer of the BNG, and the L2 layer of the FMIF-UP corresponds to the L2 layer of the BNG. The second protocol stack sequentially includes a PDU layer, a general packet radio service tunneling protocol (GTP) layer, a user datagram protocol (UDP)/IP layer, and an L2 layer from top to bottom. A user plane protocol stack of the UPF network element sequentially includes a PDU layer, a GTP layer, a UDP/IP layer, and an L2 layer from top to bottom. The PDU layer of the UPF network element corresponds to the PDU layer of the first protocol stack, the GTP layer of the UPF network element corresponds to the GTP layer of the first protocol stack, the UDP/IP layer of the UPF network element corresponds to the UDP/IP layer of the first protocol stack, and the L2 layer of the UPF network element corresponds to the L2 layer of the first protocol stack.

In the embodiment shown in FIG. 7A to FIG. 7D, the GRE tunnel is established at the BNG granularity. Therefore, each GRE tunnel between a BNG and an FMIF independently corresponds to one BNG. Each GRE tunnel may be used to distinguish different FN-RGs and different PPPoE/IPoE sessions of the FN-RGs. The GRE tunnel meets a 1:1 correspondence between a PPPoE/IPoE session and a PDU session, and the GRE tunnel meets N:1 deployment between BNGs and an FMIF (where N≥1 and N is an integer).

Figure 9:
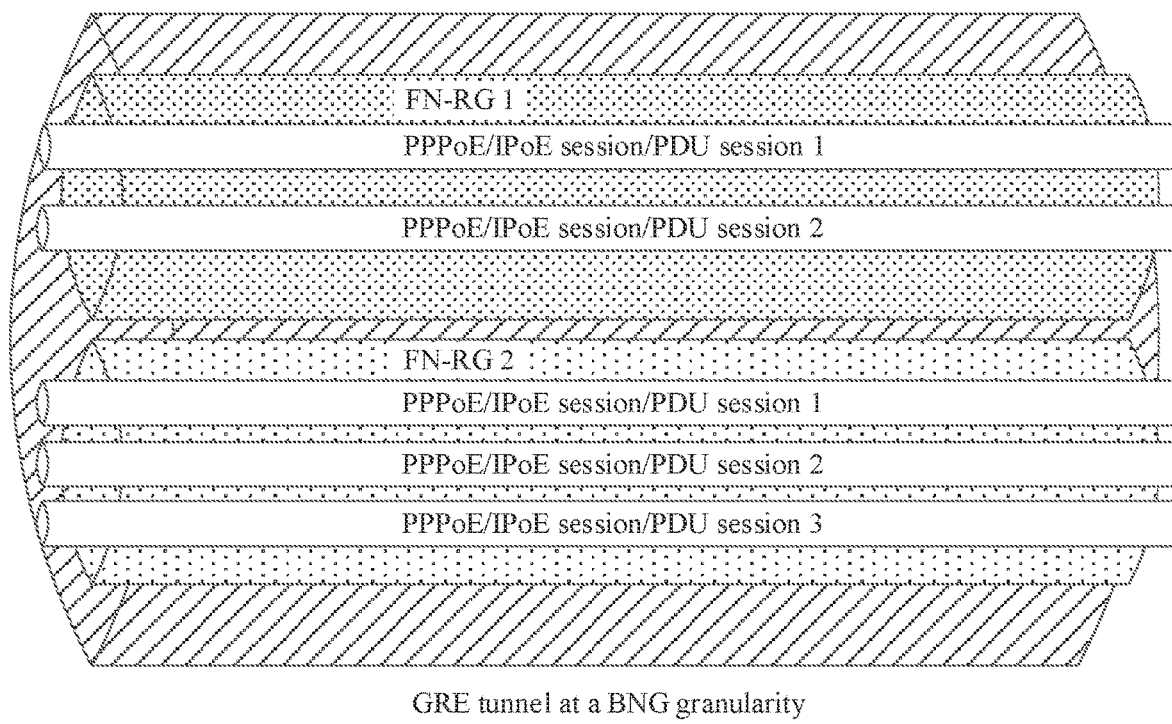
FIG. 9 is a schematic diagram of a user plane connection at a BNG granularity according to an embodiment of this application.
Figure 10A:
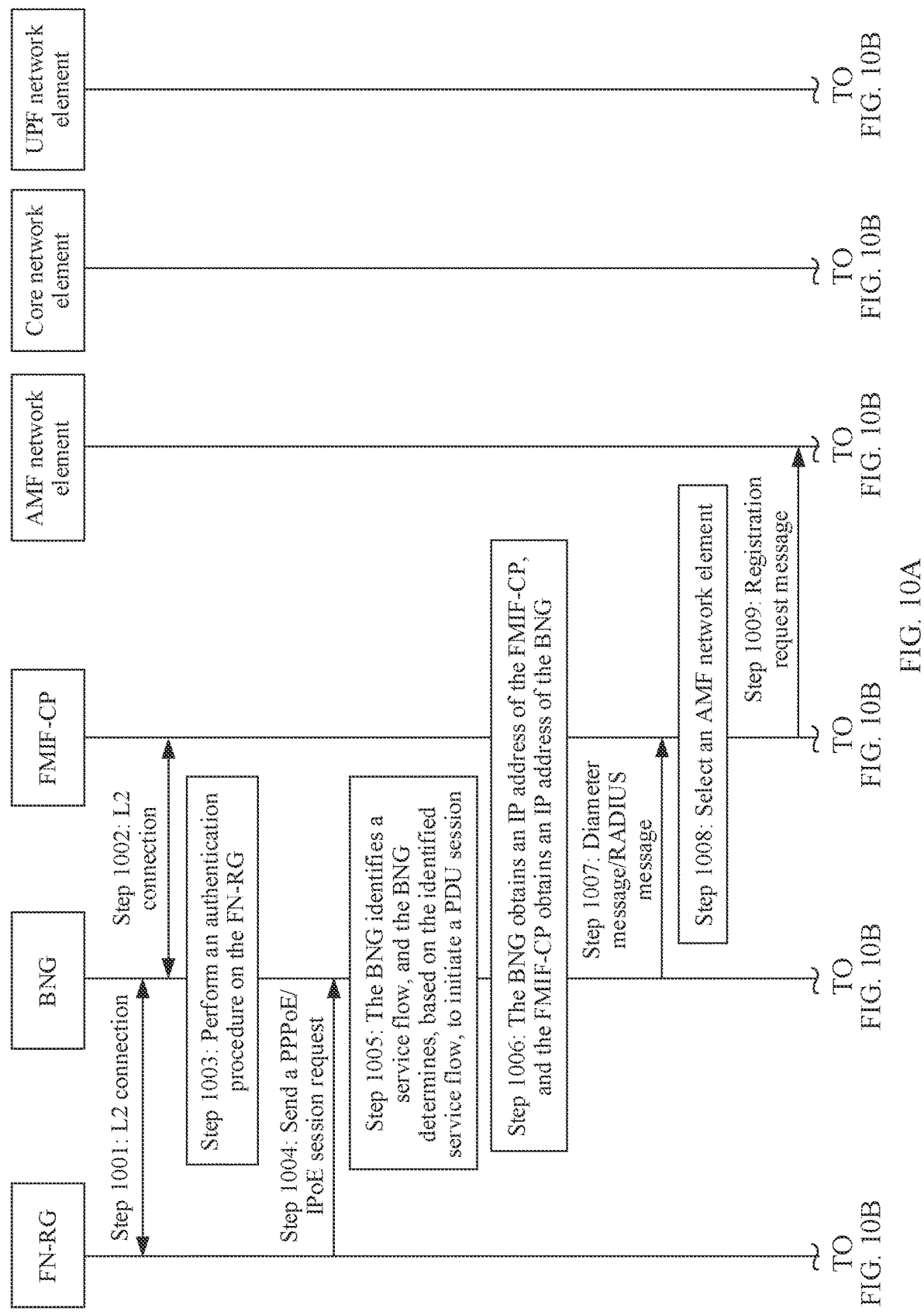
Figure 10C:
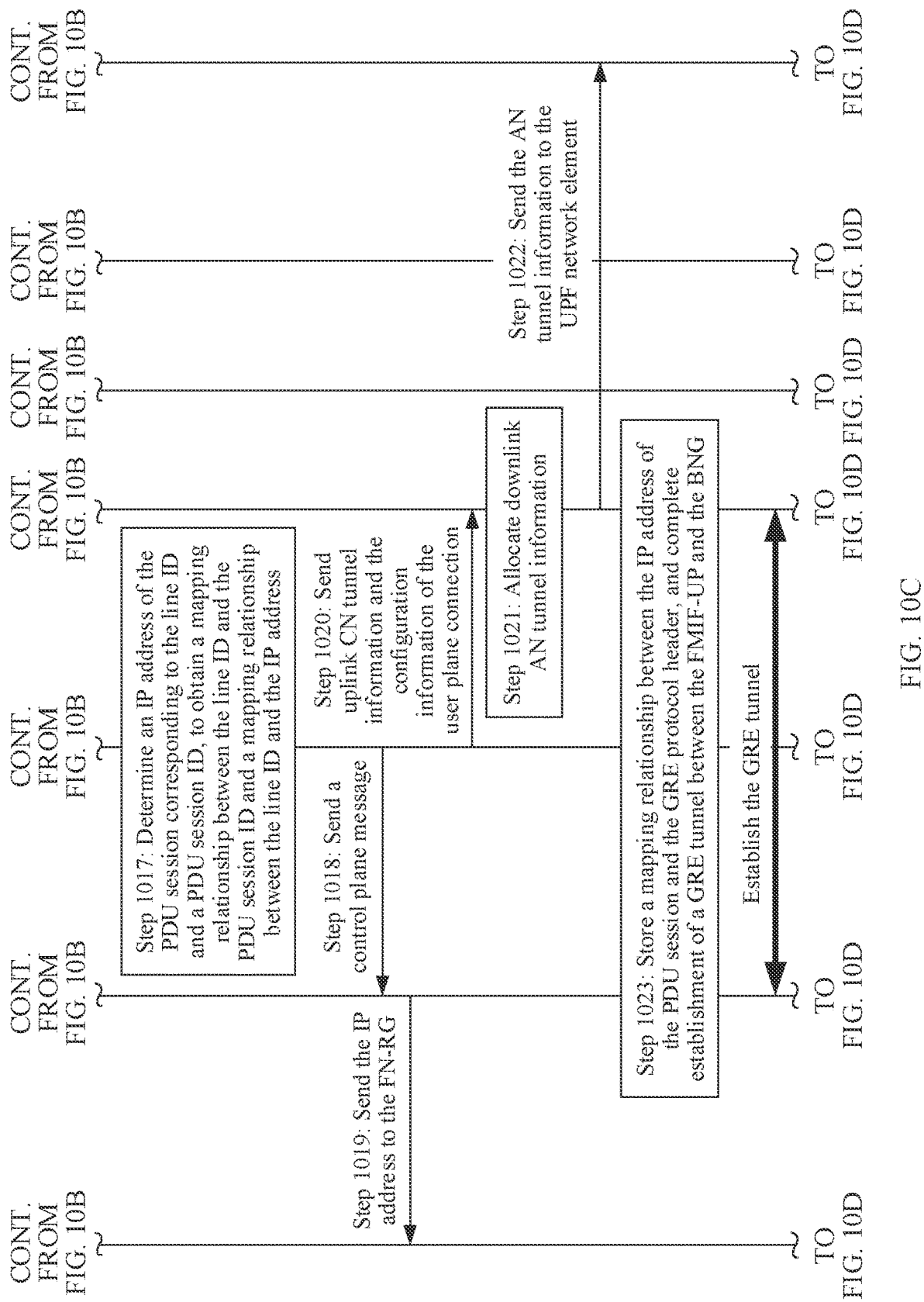
Figure 10D:
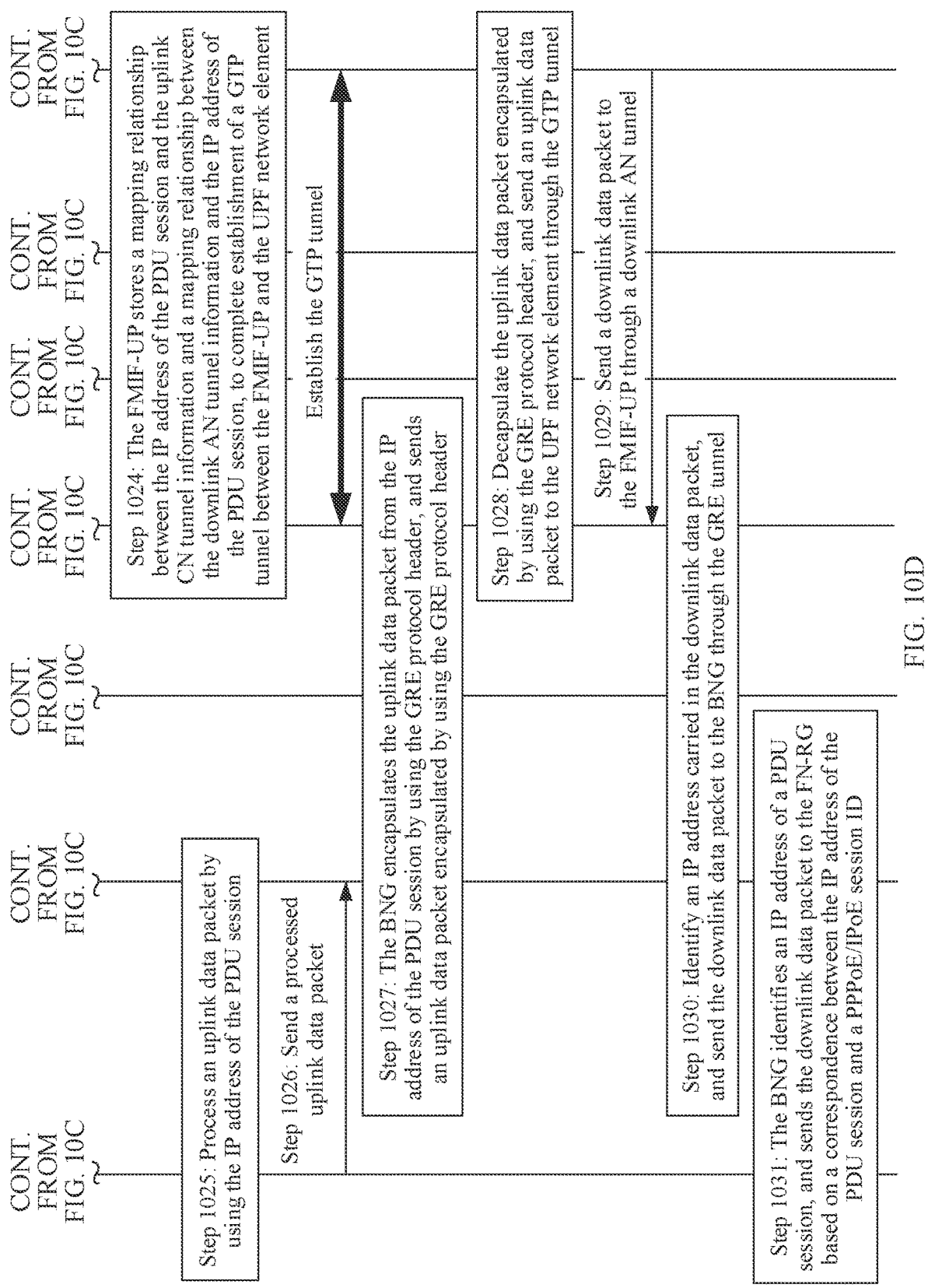

For example, as shown in FIG. 9, both an FN-RG 1 and an FN-RG 2 are connected to a BNG, and there is a GRE tunnel between the BNG and an FMIF. In this case, uplink data packets transmitted by using a PDU session 1 and a PDU session 2 that correspond to the FN-RG 1 may be transmitted through the GRE tunnel, and uplink data packets transmitted by using a PDU session 1, a PDU session 2, and a PDU session 3 that correspond to the FN-RG 2 may be transmitted through the GRE tunnel. For transmission of a downlink data packet, refer to transmission of the uplink data packet. Details are not described herein again. It should be understood that an uplink data packet is transmitted by the FN-RG 1 or the FN-RG 2 to the UPF network element through the GRE tunnel, and a downlink data packet is transmitted by the UPF network element to the FN-RG 1 or the FN-RG 2 through the GRE tunnel.

If the FN-RG 1 and the FN-RG 2 are connected to different BNGs, but the BNGs accessed by the FN-RG 1 and the FN-RG 2 are connected to a same FMIF, a GRE tunnel 1 may be established between the BNG accessed by the FN-RG 1 and an FMIF-UP, and a GRE tunnel 2 may be established between the BNG accessed by the FN-RG 2 and the FMIF-UP. That is, in the embodiment shown in FIG. 7A to FIG. 7D, one or more GRE tunnels may be established between the same FMIF-UP and one or more BNGs.

As shown in FIG. 10A to FIG. 10D, a difference between an embodiment shown in FIG. 10A to FIG. 10D and the embodiment shown in FIG. 7A to FIG. 7D lies in: In FIG. 10A to FIG. 10D, FMIF-CP determines that a GRE tunnel at an FN-RG granularity is to be established as a user plane connection between a BNG and an FMIF-UP. The method includes the following steps.

Step 1001 to step 1011 are the same as step 701 to step 711. For details, refer to the descriptions in step 701 to step 711. Details are not described herein again.

Step 1012: The FMIF-CP determines that the FN-RG is successfully authenticated, and the FMIF-CP determines configuration information of the user plane connection based on the line ID and policy information.

The configuration information of the user plane connection includes an FN-RG granularity indication and a GRE protocol header. The FN-RG granularity indication is used to indicate that the established user plane connection is at the FN-RG granularity. The GRE protocol header is used to indicate to encapsulate, by using the GRE protocol header, a data packet to be transmitted through the user plane connection.

If the FMIF-CP and the FMIF-UP have different addresses, the FMIF-CP further needs to indicate the address of the FMIF-UP to the BNG.

Specifically, the FMIF-CP determines that the FN-RG is successfully authenticated, and the FMIF-CP determines the configuration information of the user plane connection based on a deployment policy of an operator (for example, a correspondence between an FMIF-CP and an FMIF-UP), a load status of the FMIF-UP, and the line ID. For example, when an FMIF-CP and an FMIF-UP have a 1:1 correspondence, and the FMIF-UP is overloaded, the FMIF-CP determines to establish the user plane connection the FN-RG granularity for the FN-RG, to ensure quality of service of the FN-RG. When a plurality of FN-RGs request 5G services via the BNG, the FMIF-CP may reject the requests from the FN-RGs due to overloading. Alternatively, when an FMIF-CP and FMIF-UPs have a 1:N (N>1) correspondence, and the FMIF-CP is connected to an FMIF-UP@1 and an FMIF-UP@2, if the FMIF-UP@1 is overloaded, the FMIF-CP selects the FMIF-UP@2 for the FN-RG to establish the user plane connection. Herein, a granularity of the user plane connection may be the IFN-RG granularity.

Step 1013: The FMIF-CP sends the authentication result of the FN-RG, the line ID, and the configuration information of the user plane connection to the BNG.

For specific implementation of step 1013, refer to the specific implementation of step 713. Details are not described herein again.

Step 1014: After obtaining the authentication result of the FN-RG and the configuration information of the user plane connection, the BNG stores a correspondence between the line ID and the GRE protocol header.

Step 1015: The BNG sends a 5G request to the FMIF-CP for a data packet requested by the where the 5G request includes the line ID.

Descriptions of step 1016 to step 1024 are the same as the corresponding descriptions in step 717 to step 725. Details are not described herein again.

In the embodiment shown in FIG. 10A to FIG. 10D, after step 1024, the method may further include step 1025 to step 1031. For specific content of step 1025 to step 1031, refer to the descriptions in step 726 to step 732. Details are not described herein again.

In the embodiment shown in FIG. 10A to FIG. 10D, the GRE tunnel is established at the FN-RG granularity. Therefore, each of one or more GRE tunnels between a BNG and an FMIF-UP independently corresponds to one FN-RG. Each GRE tunnel may be used to distinguish different PPPoE/IPoE sessions of FN-RGs. The GRE tunnel meets a 1:1 correspondence between a PPPoE/IPoE session and a PDU session, and the GRE tunnel meets N:M deployment between BNGs and FMIFs (where N≥1, M≥1, and N and M are integers).

Figure 11:
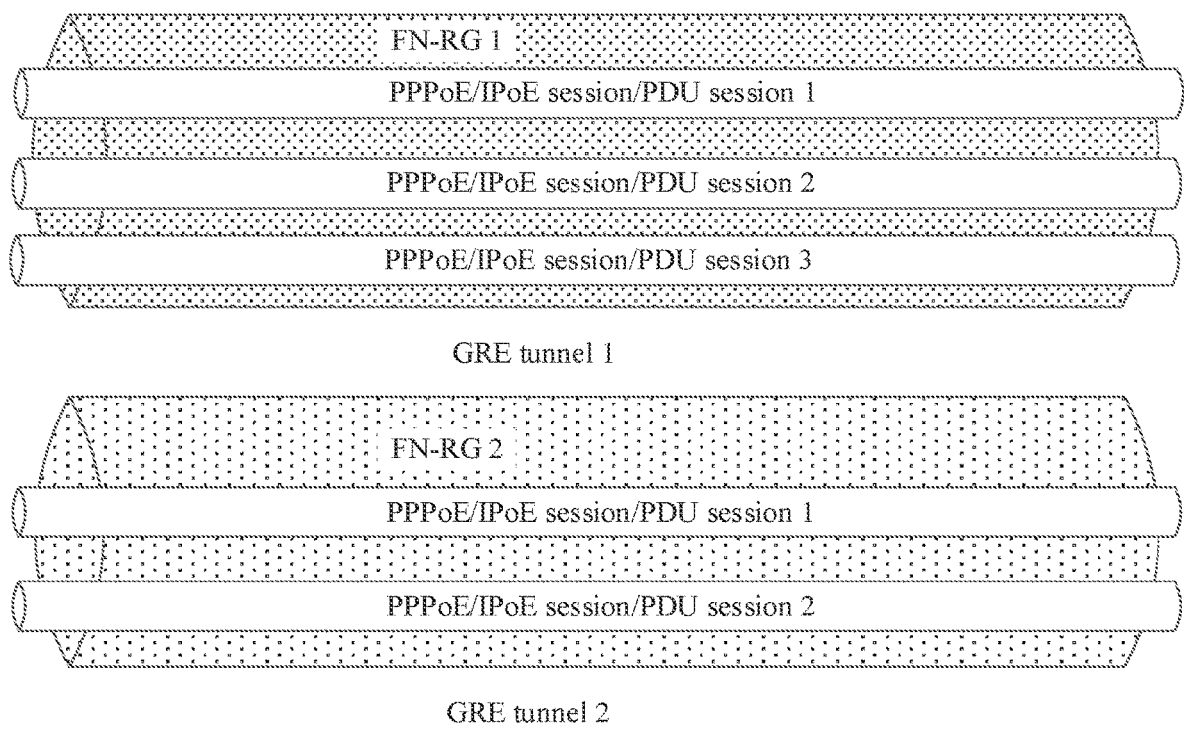
FIG. 11 is a schematic diagram of a user plane connection at an FN-RG granularity according to an embodiment of this application.
Figure 12A:
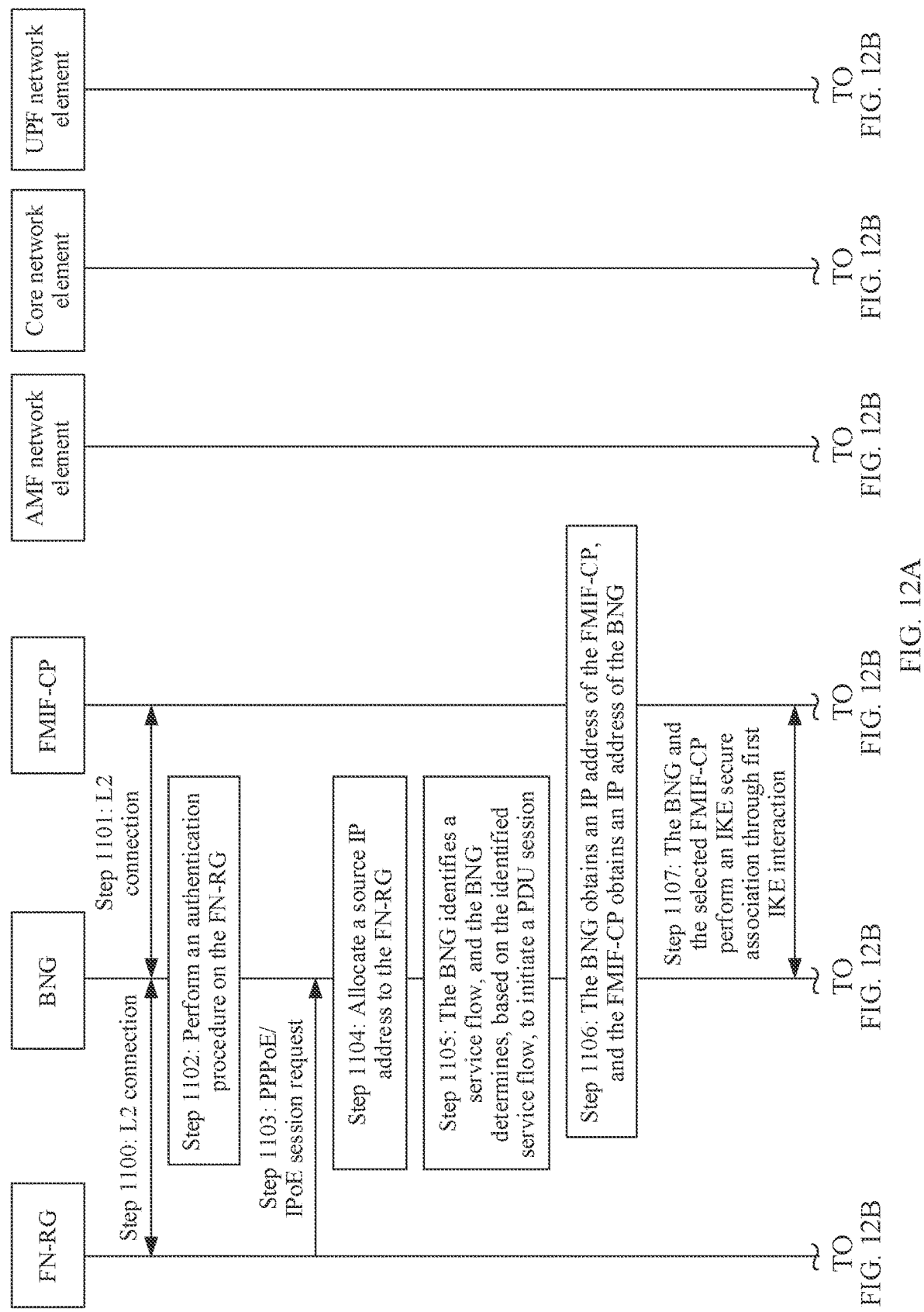
FIG. 12A to FIG. 12D are a specific schematic flowchart of still another user plane connection establishment method according to an embodiment of this application.
Figure 12B:
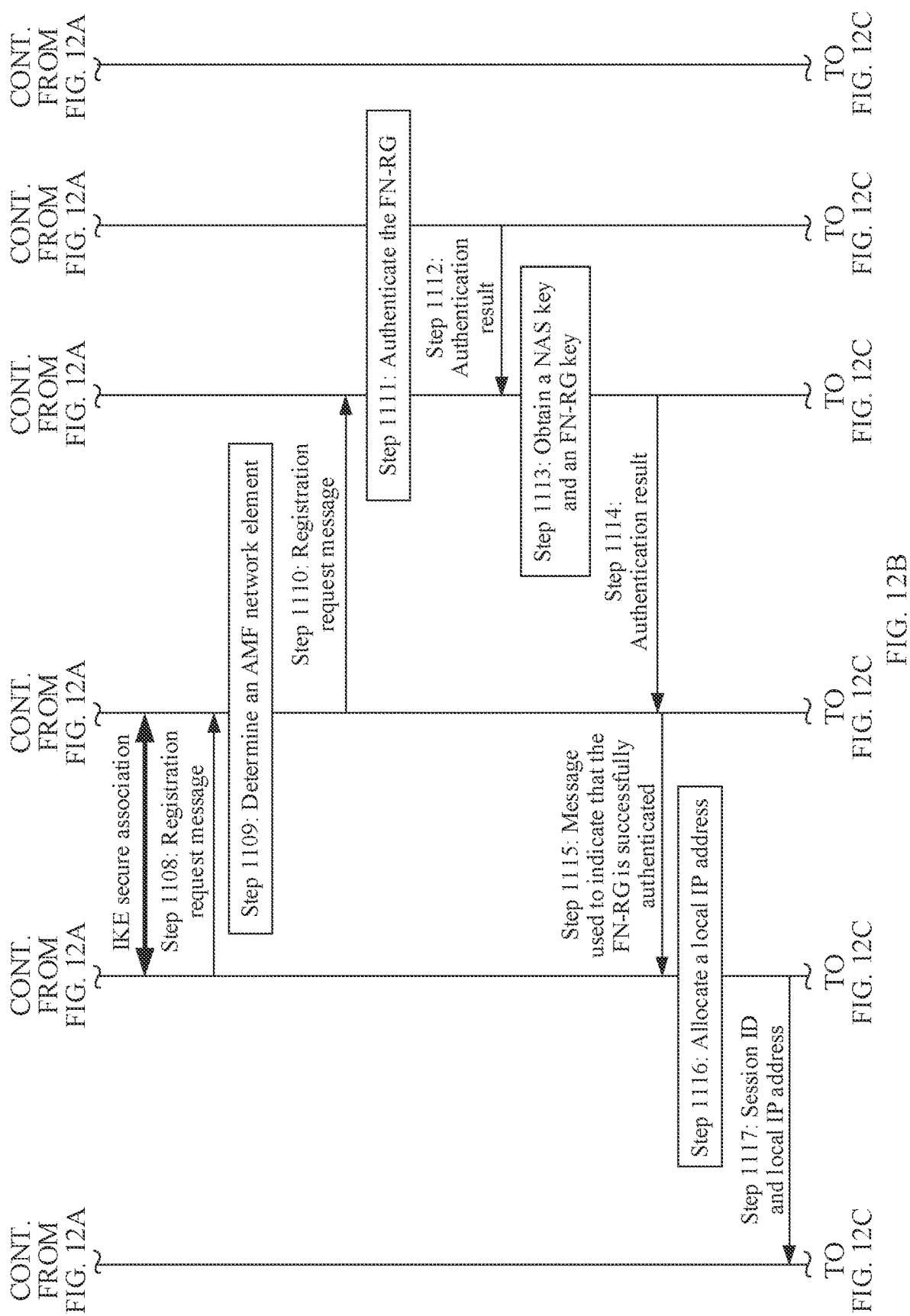
Figure 12C:
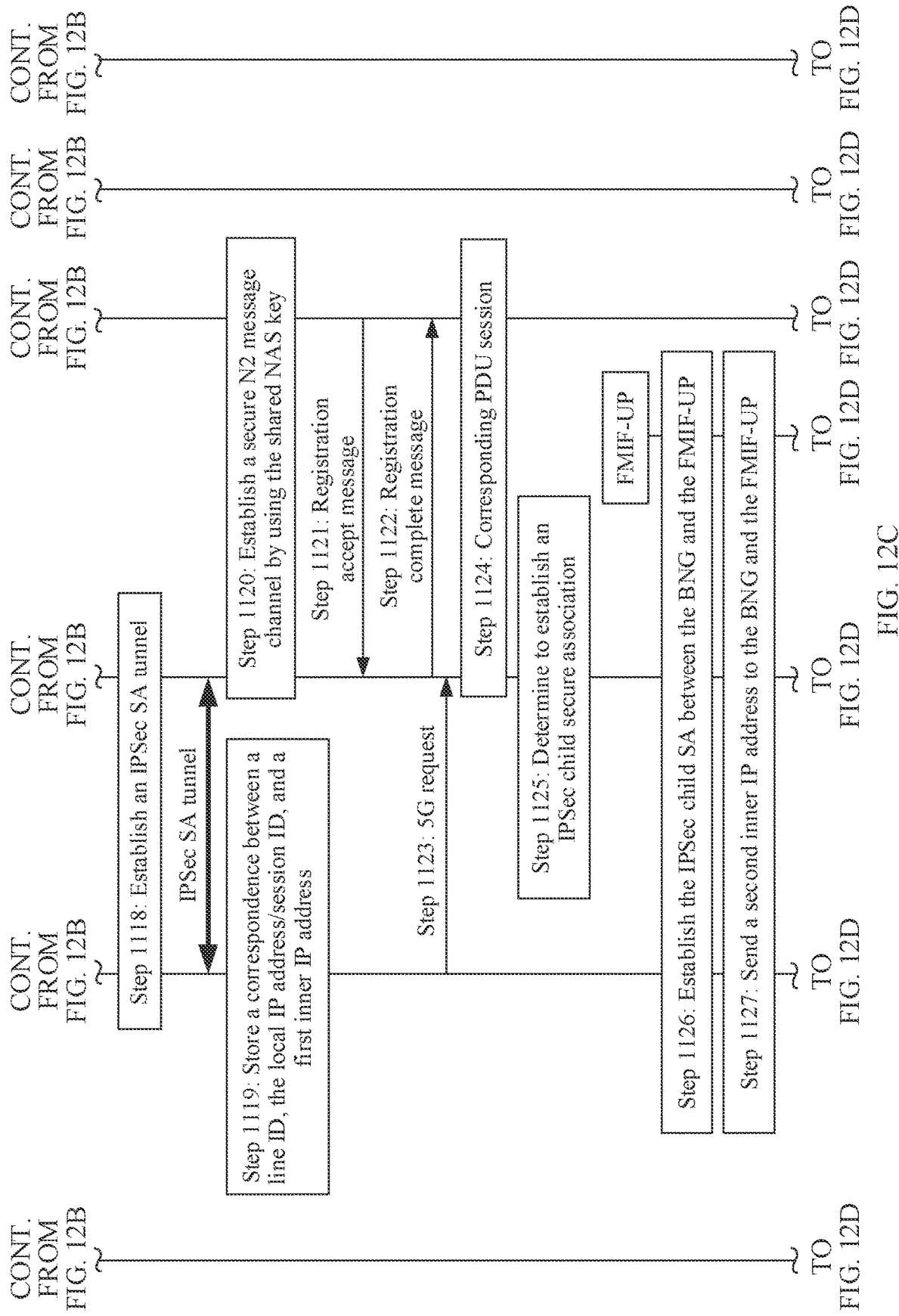
Figure 12D:
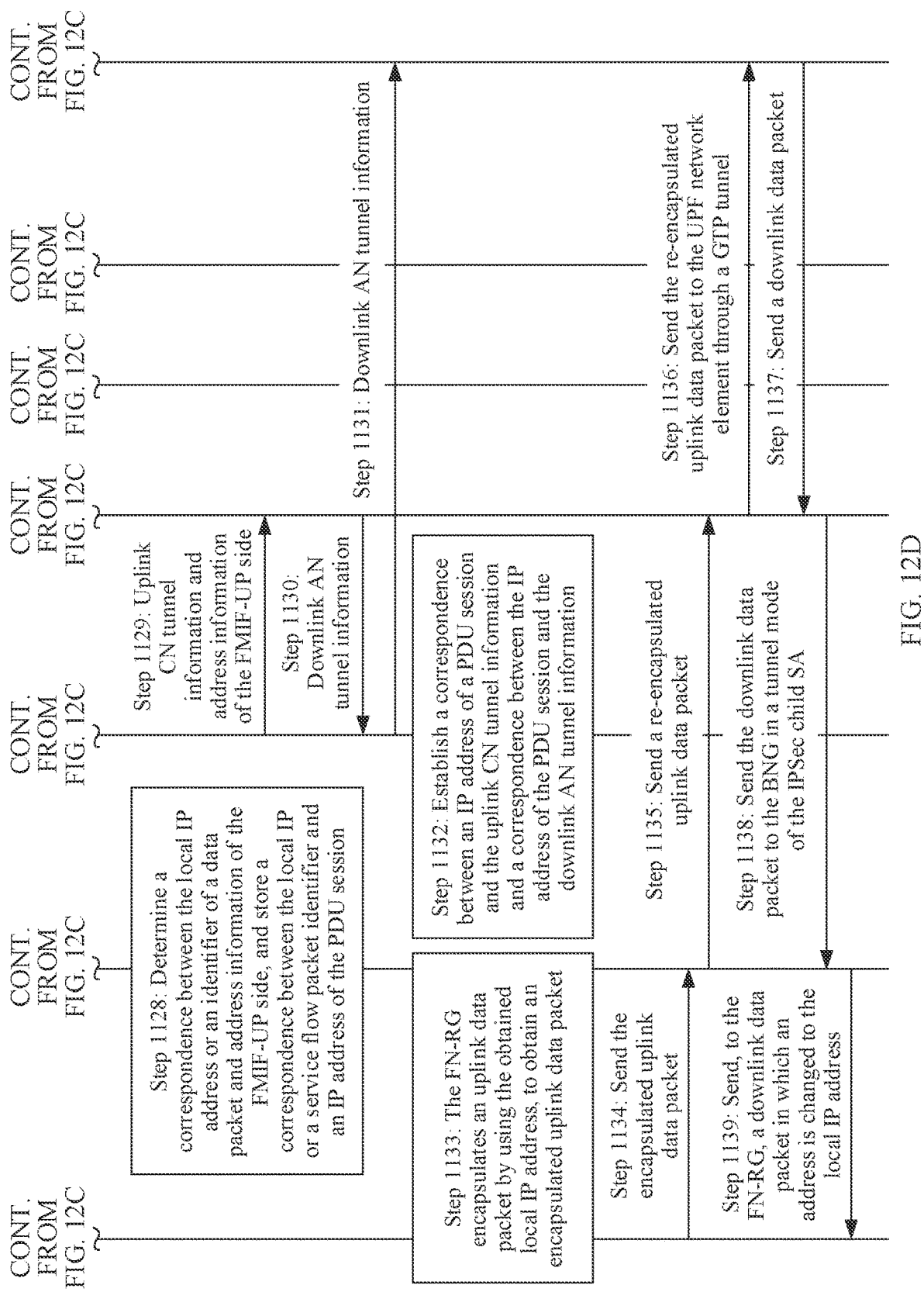

For example, as shown in FIG. 11, both an FN-RG 1 and an FN-RG 2 are connected to a BNG, and there is a GRE tunnel 1 and a GRE tunnel 2 between the BNG and an FMIF. The GRE tunnel 1 corresponds to the FN-RG 1, and the GRE tunnel 2 corresponds to the FN-RG 2. In this case, uplink data packets transmitted by using a PDU session 1, a PDU session 2, and a PDU session 3 that correspond to the FN-RG 1 may be transmitted through the GRE tunnel 1, and uplink data packets transmitted by using a PDU session 1 and a PDU session 2 that correspond to the FN-RG 2 may be transmitted through the GRE tunnel 2. For transmission of a downlink data packet, refer to transmission of the uplink data packet. Details are not described herein again.

It should be understood that an uplink data packet of the FN-RG 1 is transmitted by the FN-RG 1 to a UPF network element through the GRE tunnel 1, a downlink data packet of the FN-RG 1 is transmitted by the UPF network element to the FN-RG 1 through the GRE tunnel 1, an uplink data packet of the FN-RG 2 is transmitted by the FN-RG 2 to the INF network element through the GRE tunnel 2, and a downlink data packet of the FN-RG 2 is transmitted by the UPF network element to the FN-RG 2 through the GRE tunnel 2. It should be understood that, in this embodiment of this application, different FN-RGs may communicate with different UPF network elements. Certainly, different FN-RGs may alternatively communicate with a same UPF network element. This is not limited in this embodiment of this application.

As shown in FIG. 12A to FIG. 12D, a difference between an embodiment shown in FIG. 12A to FIG. 12D and the embodiment shown in FIG. 7A to FIG. 7D or FIG. 10A to FIG. 10D lies in: In FIG. 12A to FIG. 12D, an FMIF-CP determines that a GRE tunnel at a PDU session granularity is to be established as a user plane connection between a BNG and an FMIF-UP and a first control plane connection at an FN-RG granularity is to be established between the BNG and the FMIF-CP. The method includes the following steps.

Step 1100 to step 1106 are the same as step 701 to step 706 in the embodiment shown in FIG. 7A to FIG. 7D, Details are not described herein again.

Step 1107: The BNG and the selected FMIF-CP perform IKE secure association through exchange of a first IKE message.

For example, step 1107 may be specifically implemented in the following manner: The BNG sends an internet key exchange (IKE)_SA_INIT request message to the FMIF-CP. The IKE_SA_INIT request message is used to request to establish an IPsec secure association. The FMIF-CP sends an IKE_SA_INIT response message to the BNG, where the IKE_SA_INIT response message is used to indicate that an IKE security association is successfully established.

After the IPsec secure association is established between the BNG and the FMIF-CP, an IKE message transmitted between the BNG and the FMIF-CP through the IKE SA is encrypted and integrity protected.

Step 1108: The BNG sends a registration request message to the FMIF-CP, where the registration request message carries the line ID, the authentication request message, and a control plane (CP) establishment request.

For example, the BNG may send the registration request message by using an internet key exchange protocol authentication (IKE_AUTH) message.

Step 1109: The FMIF-CP determines an AMF network element.

Step 1110: The FMIF-CP sends a registration request message to the AMF network element by using an N2 message, where the registration request message carries the line ID of the FN-RG.

Step 1111: A core network element in a core network performs authentication on the FN-RG.

Step 1112: The core network element returns an authentication result of the FN-RG to the AMF network element. If the FN-RG is successfully authenticated, the authentication result includes a security key established on a control plane.

Step 1113: After Obtaining the security key established on the control plane, the AMF network element analyzes the security key to obtain, from the security key, an FN-RG key that is at an FN-RG granularity and that protects a control plane connection between the BNG and the FMIF-CP and a non-access stratum (NAS) key that is at an FN-RG granularity and that protects a control plane connection between the FMIF-CP and the AMF.

It should be understood that the FN-RG key is the foregoing first security key, and the NAS Key is the foregoing second security key.

Step 1114: The AMF network element sends the authentication result of the FN-RG to the FMIF-CP, where the authentication result of the FN-RG carries the FN-RG key and the NAS key.

Certainly, the AMF network element may send the FN-RG key and the NAS key to the FMIF-CP in a process of sending the authentication result of the FN-RG to the FMIF-CP.

Step 1115: After determining that the FN-RG is successfully authenticated, the FMIF-CP sends an IKE_AUTH message to the BNG, where the IKE_AUTH message carries the FN-RG key and a message used to indicate that the FN-RG is successfully authenticated.

Step 1116: After obtaining a result indicating that the FN-RG is successfully authenticated, the BNG allocates a local IP address to the FN-RG.

For example, the BNG may allocate the local IP address to the FN-RG by using a PPPoE/IPoE session.

The local IP address is the local address in the foregoing embodiment.

Step 1117: The BNG sends a session ID and the local IP address to the FN-RG by using the PPPoE/IPoE session.

Step 1118: The BNG and the FMIF-CT establish an IPsec SA tunnel by using the shared FN-RG key, and configure a tunnel mode for the IPsec SA tunnel. In addition, the FMIF-CP allocates a first inner IP address to the IPsec SA tunnel. The first inner IP address on the BNG side may be EN_RG_IP_ADDRESS, and the first inner IP address on the FMIF-CP side may be NAS_IP_ADDRESS.

The first inner IP address is the address information of the first control plane connection in the foregoing embodiment.

Step 1119: The BNG establishes a correspondence between the line ID, the local IP address/session ID, and the first inner IP address.

Step 1120: The FMIF-CP and the AMF network element establish a secure N2 message channel by using a common NAS key, where the secure N2 message channel is at an FN-RG granularity. Step 1119 may be performed in parallel with step 1114 to step 1118.

It should be understood that, in step 1114 to step 1118 provided in this embodiment of this application, the FN-RG-related first control plane connection may be established between the BNG and the FMIF-CP, and in step 1119, an FN-RG-related second control plane connection may be established between the FMIF-CP and the AMF network element.

Step 1121: The AMF network element sends a registration accept message to the FMIF-CP.

Step 1122: The FMIF-CP sends a registration complete message to the AMF network element. It should be understood that step 1121 is an optional step.

Step 1123: The BNG sends a 5G request to the FMIF-CP through the first control plane connection between the BNG and the FMIF-CP. The first control plane connection is at the FN-RG granularity. Therefore, the line ID may not be carried herein.

Step 1124: The FMIF-CP identifies the line ID, and maps the 5G request including the line ID to a corresponding PDU session.

For specific implementation of step 1124, refer to step 717. Details are not described herein again.

Step 1125: The FMIF-CP determines that an IPsec child security association (Child SA) corresponding to the PDU session is to be established. A second inner IP address includes address information of the BNG side and address information of the FMIF-UP side. For example, the address information of the FMIF-UP side may be an IP address of the PDU session.

The second inner IP address is the address information of the user plane connection in the foregoing embodiment.

Step 1126: The FMIF-CP establishes the IPsec child SA between the BNG and the FMIF-UP, where a tunnel mode or transport mode may be configured for the IPsec child SA.

Step 1127: The FMIF-CP sends the second inner IP address to the BNG and the FMIF-UP.

Step 1128: The BNG determines a correspondence between the local IP address or an identifier of a data packet and the address information of the FMIF-UP side.

The local IP address is the local address in the foregoing embodiment. Interaction between the FN-RG and the BNG may all be performed by using the local IP address.

Step 1129: The FMIF-CP sends uplink CN tunnel information and the address information of the FMIF-UP side to the FMIF-UP.

In step 1129, the FMIF-UP may have a correspondence between the address information of the FMIF-UP side and the uplink CN tunnel information.

Step 1130: The FMIF-UP sends downlink AN tunnel information to the FMIF-CP.

Step 1131: The FMIF-CP sends the downlink AN tunnel information to a user plane network element.

Step 1132: The FMIF-UP establishes a correspondence between the FP address of the PDU session and the uplink CN tunnel information and a correspondence between the IP address of the PDU session and the downlink AN tunnel information.

It should be understood that after step 1132, the IPsec child SA is used as the user plane connection between the FMIF-UP and the BNG, and a GTP tunnel is established between the FMIF-UP and the user plane network element.

It should be understood that, after the GTP tunnel is established between the FMIF-UP and the UPF network element and the IPsec child SA is established between the FMIF-UP and the BNG, a data packet can be transmitted between the terminal and the UPF network element through the GTP tunnel and the IPsec child SA. Therefore, in a possible embodiment, after step 1131, the method may further include the following steps.

Step 1133: For an uplink data packet, the FN-RG encapsulates the uplink data packet by using the obtained local IP address, to obtain an encapsulated uplink data packet. For example, as shown in FIG. 13, after the uplink data packet is processed at an application layer, a local IP layer, and an L2 layer on the FN-RG side, the encapsulated uplink data packet is obtained.

Step 1134: The FN-RG sends the encapsulated uplink data packet to the BNG by using a PPPoE/IPoE session.

Step 1135: The BNG identifies the local IP address and an identifier of the data packet in the encapsulated uplink data packet, and processes the uplink data packet based on a correspondence between the identifier of the data packet and the second inner IP address by using the address information of the FMIF-UP side. The BNG replaces the local IP address in the uplink data packet with a device address (for example, a device IP address) of the BNG for a connection between the BNG and the FMIF-UP. The BNG sends a re-encapsulated uplink data packet to the MIT-UP through the IPsec child SA.

It should be understood that the BNG first needs to decapsulate the data packet from the FN-RG, to obtain the uplink data packet, the identifier of the data packet, and the local IP address. The BNG processes the obtained uplink data packet by using the address information of the FMIF-UP side, and then replaces the local IP address in the processed data packet with the device address of the BNG, to obtain the re-encapsulated uplink data packet. In other words, the re-encapsulated uplink data packet carries the device address of the BNG and the address information of the FMIF-UP side.

Step 1136: The FMIF-UP sends the re-encapsulated uplink data packet to the UPF network element through the GIP tunnel based on the address information of the FMIF-UP side carried in the re-encapsulated uplink data packet and the correspondence between the IP address of the PDU session and the uplink CN tunnel information.

It should be understood that the FMIF-UP first removes a packet header of the re-encapsulated uplink data packet, to obtain the uplink data packet, the address information of the FMIF-UP side, and the device address of the BNG. After performing PDU layer, GIP layer, UDP/IP layer, and L2 layer processing on the uplink data packet, the FMIF-UP obtains a processed uplink data packet. The FMIF-UP sends the processed uplink data packet to the UPF through the GTP tunnel.

It should be understood that the address information of the FMIF-UP side may be the same as the IP address of the PDU session. Therefore, the FMIF-UP may determine a correspondence between the re-encapsulated uplink data packet and an uplink CN tunnel, and further determine the UPF network element to which the re-encapsulated uplink data packet needs to be forwarded.

For example, the uplink CN tunnel information may be an IP address of the UPF network element and a TEID of the UPF network element.

For example, there is a correspondence 1 between a PDU session 1 and uplink CN tunnel information 1, and there is a correspondence between a PDU session 2 and uplink CN tunnel information 2. The correspondence 1 is used to determine a UPF network element 1 corresponding to the PDU session 1 and a corresponding TEID 1, and the correspondence 2 is used to determine a UPF network element 2 corresponding to the PDU session 2 and a corresponding TEID 2, Therefore, an uplink data packet encapsulated by using an address of the PDU session 1 may be sent to the UPF network element 1 through a GTP tunnel between the FMIF-UP and the UPF network element 1, and an uplink data packet encapsulated by using an address of the PDU session 2 may be sent to the UPF network element 2 through a GTP tunnel between the FMIF-UP and the UPF network element 2.

Step 1137: For a downlink data packet, the UPF network element sends the downlink data packet to the FMIF-UP by using the downlink AN tunnel information, where the downlink data packet carries the IP address of the PDU session.

For example, the UPF network element may perform, on the downlink data packet, protocol stack processing shown in FIG. 13. For example, after performing PDU layer, GTP layer, UDP/IP layer, and L2 layer processing on the downlink data packet, the UPF network element sends the downlink data packet to the FMIF-UP. In this case, the downlink data packet to be sent to the FMIF-UP carries the IP address of the PDU session.

Step 1138: The FMIF-UP identifies the IP address of the PDU session in the downlink data packet, and sends the downlink data packet to the BNG in the tunnel mode of the IPsec child SA, where the downlink data packet sent by the FMIF-UP to the BNG carries the address information of the BNG side and a device address of the FMIF-UP.

Step 1139: The BNG identifies the address information of the BNG side in the downlink data packet, and replaces the device address of the FMIF-UP in the downlink data packet with the local IP address based on a correspondence between the address information of the BNG side and an identifier of the data packet and a correspondence between the identifier of the data packet and the local IP address. The BNG sends a downlink data packet in which an address is changed to the local IP address to the FN-RG.

For details about a related network element protocol stack used in the embodiment shown in FIG. 12A to FIG. 12D, refer to FIG. 13.

Devices related the user plane protocol stack include the FN-RG, the BNG, the FMIF-UP, and the UPF network element. A user plane protocol stack of the FN-RG sequentially includes an application layer, a local internet protocol (IP) layer, and an L2 layer from top to bottom. A user plane protocol stack of the BNG includes a second protocol stack that is equivalent to the FN-RG and a third protocol stack corresponding to the FMIF-UP.

The second protocol stack sequentially includes a local IP layer and an L2 (layer 2) layer of the BNG from top to bottom. The local IP layer of the BNG corresponds to the local IP layer of the FN-RG, and the L2 layer of the BNG corresponds to the L2 layer of the FN-RG.

The third protocol stack sequentially includes a second inner IP layer, an IPsec child association layer, a device IP layer, and an L2 layer from top to bottom.

A user plane protocol stack of the FMIF-UP includes a fourth protocol stack corresponding to the third protocol stack and a fifth protocol stack corresponding to a protocol stack of the UPF network element. The fourth protocol stack sequentially includes a second inner IP layer, an IPsec child association layer, a device IP layer, and an L2 layer from top to bottom, and the fourth protocol stack one-to-one corresponds to the third protocol stack. The fifth protocol stack sequentially includes a PDU layer, a GTP layer, a UDP/IP layer, and an L2 layer from top to bottom. The user plane protocol stack of the LIT network element sequentially includes a PINT layer, a GTP layer, a UDP/IP layer, and an L2 layer from top to bottom. The PDU layer of the UPF network element corresponds to the PDU layer of the fourth protocol stack, the GTP layer of the UPF network element corresponds to the GTP layer of the fourth protocol stack, the UDP/IP layer of the UPF network element corresponds to the UDP/IP layer of the fourth protocol stack, and the L2 layer of the UPF network element corresponds to the L2 layer of the fourth protocol stack.

In the embodiment shown in FIG. 12A to FIG. 12D, the IPsec security association at the FN-RG granularity is established as the first control plane connection between the BNG and the FMIF-CP and the IPsec child association at the PDU session granularity is established as the user plane connection between the BNG and the FMIF-UP. One IPsec child association may be established between the BNG and the FMIF-UP for each PDU session, each IPsec child association independently corresponds to one PDU session, and each IPsec child association may be used to distinguish different VLAN tags carried by using PPPoE/IPoE sessions. The IPsec child association meets a 1:N correspondence between a PPPoE/IPoE session and PDU sessions (where N≥1), and the IPsec child association meets N:M deployment between BNGs and FMIFs (where N≥1, and M≥1).

Figure 14:
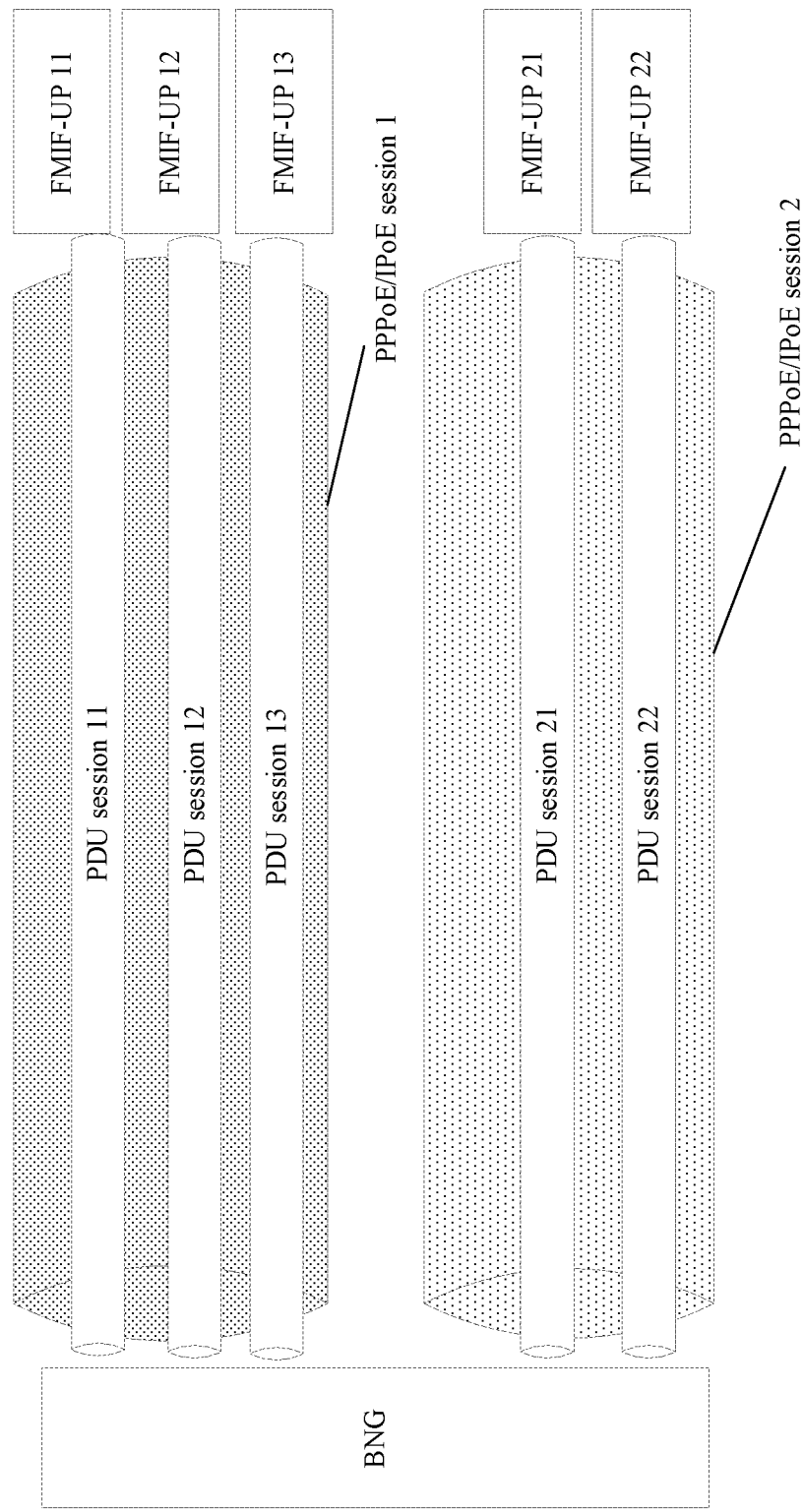
FIG. 14 is a schematic diagram of an IPsec child security association according to an embodiment of this application.

As shown in FIG. 14, there is a PPPoE/IPoE session 1 and a PPPoE/IPoE session 2 between the terminal and the BNG. The PPPoE/IPoE session 1 is a connection between the terminal and the BNG, and the PPPoE/IPoE session 2 is also a connection between the terminal and the BNG. The PPPoE/IPoE session 1 corresponds to a PDU session 11, a PDU session 12, and a PDU session 13. The PDU session 11 is a PDU session between the terminal and an FMIF-UP 11, the PDU session 12 is a PDU session between the terminal and an FMIF-UP 12, and the PDU session 13 is a PDU session between the terminal and an FMIF-UP 13. To be specific, the PDU session 11 is associated with a user plane connection between the BNG and the FMIM-UP 11, the PDU session 12 is associated with a user plane connection between the BNG and the FMIM-UP 12, and the PDU session 13 is associated with a user plane connection between the BNG and the FMIM-UP 13.

The PPPoE/IPoE session 2 corresponds to a PDU session 21 and a PDU session 22. The PDU session 21 is a PDU session between the terminal and an FMIM-UP 21, and the PDU session 22 is a PDU session between the terminal and an FMIM-UP 22. To be specific, the PDU session 21 is associated with a user plane connection between the BNG and the FMIM-UP 21, and the PDU session 22 is associated with a user plane connection between the BNG and the FMIM-UP 22.

The foregoing mainly describes the solutions in the embodiments of this application from a perspective of interaction between the network elements. It may be understood that, to implement the foregoing functions, the network elements such as the interworking function network element-control plane, the interworking function network element-user plane, the access network gateway, and the user plane network element include corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the interworking function network element-control plane, the interworking function network element-user plane, the access network gateway, and the user plane network element may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is an example and merely logical function division, and may be other division in an actual implementation.

The foregoing describes the methods in the embodiments of this application with reference to FIG. 4 to FIG. 14. The following describes user plane connection establishment apparatuses that perform the foregoing methods and that are provided in the embodiments of this application. A person skilled in the art may understand that the method and the apparatus may reference and cite each other, and a user plane connection establishment apparatus provided in the embodiments of this application can perform the steps performed by the interworking function network element-control plane, the interworking function nets pork element-user plane, the access network gateway, and the user plane network in the foregoing user plane connection establishment methods.

The following provides descriptions by using an example in which each functional module is obtained through division based on each corresponding function.

Figure 15:
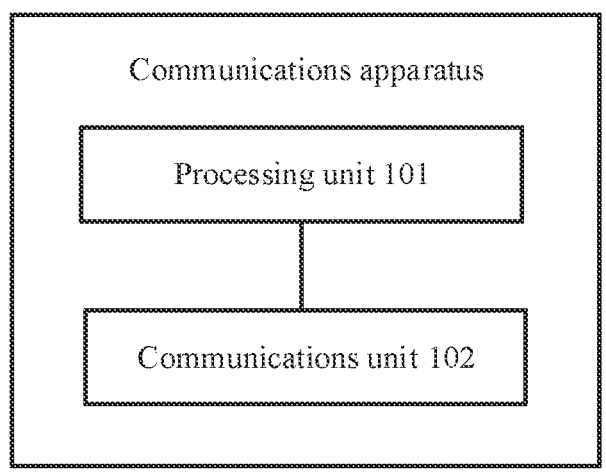
FIG. 15 is a schematic diagram of a structure of a user plane connection establishment apparatus according to an embodiment of this application.

An integrated unit is used. FIG. 15 shows a communications apparatus related to the foregoing embodiments. The communications apparatus may be a user plane connection establishment apparatus, or may be a control plane connection establishment apparatus. The communications apparatus may include a processing unit 101 and a communications unit 102.

In an example, the communications apparatus is an interworking function network element-control plane, or is a chip applied to the interworking function network element-control plane. In this case, the processing unit 101 is configured to support the communications apparatus in performing step 401 (or step 503) performed by the interworking function network element-control plane in the foregoing embodiment. The communications unit 102 is configured to support the communications apparatus in performing step 402 (or step 504) performed by the interworking function network element-control plane in the foregoing embodiment.

In a possible embodiment, the communications unit 102 is further configured to support the communications apparatus in performing step 502, step 509, step 512, step 514, step 516, step 519, step 520, and step 522 that are performed by the interworking function network element-control plane in the foregoing embodiment.

In another example, the communications apparatus is an access network gateway, or is a chip applied to the access network gateway. In this case, the communications unit 102 is configured to support the communications apparatus in performing step 403 (or step 505) performed by the access network gateway in the foregoing embodiment. The processing unit 101 is configured to support the communications apparatus in performing step 404 (or step 506) performed by the access network gateway in the foregoing embodiment.

In a possible implementation, the communications unit 102 is further configured to support the communications apparatus in performing step 501, step 511, step 513, step 517, step 526, step 528, step 536, and step 538 that are performed by the access network gateway in the foregoing embodiment. The processing unit 101 is further configured to support the communications apparatus in performing step 527 and step 537 that are performed by the access network gateway in the foregoing embodiment.

In still another example, the communications apparatus is an interworking function network element-user plane, or is a chip applied to the interworking function network element-user plane. In this case, the processing unit 101 is configured to support the communications apparatus in performing step 406 (or step 508) performed by the interworking function network element-user plane in the foregoing embodiment. The communications unit 102 is configured to support the communications apparatus in performing step 405 (or step 507) performed by the interworking function network element-user plane in the foregoing embodiment.

In a possible implementation, the communications unit 102 is further configured to support the communications apparatus in performing step 510, step 515, step 523, step 529, step 531, step 534, and step 535 in the foregoing embodiment. The processing unit 101 is further configured to support the communications apparatus in performing step 530 performed by the interworking function network element-user plane in the foregoing embodiment.

In yet another example, the communications apparatus is an interworking function network element-control plane, or is a chip applied to the interworking function network element-control plane. In this case, the processing unit 101 is configured to support the communications apparatus in performing step 601 performed by the interworking function network element-control plane in the foregoing embodiment. The communications unit 102 is configured to support the communications apparatus in performing step 602, step 603, and step 604 that are performed by the interworking function network element-control plane in the foregoing embodiment.

In a possible embodiment, the communications unit 102 is further configured to support the communications apparatus in performing step 607, step 610, step 611, and step 614 that are performed by the interworking function network element-control plane in the foregoing embodiment. The processing unit 101 is further configured to support the communications apparatus in performing step 608 and step 613 that are performed by the interworking function network element-control plane in the foregoing embodiment.

In still yet another example, the communications apparatus is an interworking function network element-user plane, or is a chip applied to the interworking function network element-user plane. The communications unit 102 is configured to support the communications apparatus in performing step 616 performed by the interworking function network element-user plane in the foregoing embodiment.

In a possible implementation, the communications unit 102 is further configured to support the communications apparatus in performing step 623, step 625, step 628, and step 630 in the foregoing embodiment.

In a possible implementation, the processing unit 101 is further configured to support the communications apparatus in performing step 624 and step 629 that are performed by the interworking function network element-user plane in the foregoing embodiment.

In a further example, the communications apparatus is an access network gateway, or is a chip applied to the access network gateway. The communications unit 102 is configured to support the communications apparatus in performing step 605 performed by the access network gateway in the foregoing embodiment. The processing unit 101 is configured to support the communications apparatus in performing step 606 performed by the access network gateway in the foregoing embodiment.

In a possible implementation, the communications unit 102 is further configured to support the communications apparatus in performing step 609, step 612, step 615, step 619, step 621, step 622, step 631, and step 634 that are performed by the access network gateway in the foregoing embodiment. The processing unit 101 is further configured to support the communications apparatus in performing step 620, step 632, and step 633 in the foregoing embodiment.

The communications apparatus may further include a storage unit. The storage unit is configured to store computer program code, where the computer program code includes instructions. If the communications apparatus is the chip applied to the access network gateway, the interworking function network element-control plane, or the interworking function network element-user plane, the storage unit may be a storage unit (for example, a register or a cache) in the chip, or may be a storage unit (for example, a read-only memory or a random access memory) that is located in the access network gateway, the interworking function network element-control plane, or the interworking function network element-user plane but located outside the chip.

Figure 16:
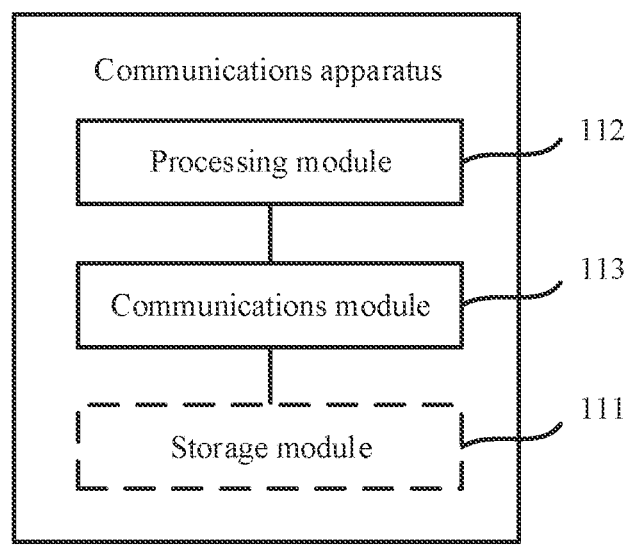
FIG. 16 is a schematic diagram of a structure of another user plane connection establishment apparatus according to an embodiment of this application.

An integrated unit is used. FIG. 16 is a schematic diagram of a possible logical structure of a communications apparatus related to the foregoing embodiment. The communications apparatus may be a communications apparatus, or may be a control plane connection establishment apparatus. The communications apparatus includes a processing module 112 and a communications module 113. The processing module 112 is configured to control and manage actions of the communications apparatus. For example, the processing module 112 is configured to perform an information/data processing step performed by the communications apparatus. The communications module 113 is configured to support the communications apparatus in performing an information/data sending or receiving step.

In a possible embodiment, the communications apparatus may further include a storage module 111, configured to store program code and data of the communications apparatus.

In an example, the communications apparatus is an interworking function network element-control plane, or is a chip applied to the interworking function network element-control plane. In this case, the processing module 112 is configured to support the communications apparatus in performing step 401 (or step 503) performed by the interworking function network element-control plane in the foregoing embodiment. The communications module 113 is configured to support the communications apparatus in performing step 402 (or step 504) performed by the interworking function network element-control plane in the foregoing embodiment.

In a possible embodiment, the communications module 113 is further configured to support the communications apparatus in performing step 502, step 509, step 512, step 514, step 516, step 519, step 520, and step 522 that are performed by the interworking function network element-control plane in the foregoing embodiment.

In another example, the communications apparatus is an access network gateway, or is a chip applied to the access network gateway. In this case, the communications module 113 is configured to support the communications apparatus in performing step 403 (or step 505) performed by the access network gateway in the foregoing embodiment. The processing module 112 is configured to support the communications apparatus in performing step 404 (or step 506) performed by the access network gateway in the foregoing embodiment.

In a possible implementation, the communications module 113 is further configured to support the communications apparatus in performing step 501, step 511, step 513, step 517, step 526, step 528, step 536, and step 538 that are performed by the access network gateway in the foregoing embodiment. The processing module 112 is further configured to support the communications apparatus in performing step 527 and step 537 that are performed by the access network gateway in the foregoing embodiment.

In still another example, the communications apparatus is an interworking function network element-user plane, or is a chip applied to the interworking function network element-user plane. In this case, the processing module 112 is configured to support the communications apparatus in performing step 406 (or step 508) performed by the interworking function network element-user plane in the foregoing embodiment. The communications module 113 is configured to support the communications apparatus in performing step 405 (or step 507) performed by the interworking function network element-user plane in the foregoing embodiment.

In a possible implementation, the communications module 113 is further configured to support the communications apparatus in performing step 510, step 515, step 523, step 529, step 531, step 534, and step 535 in the foregoing embodiment. The processing module 112 is configured to support the communications apparatus in performing step 503 performed by the interworking function network element-user plane in the foregoing embodiment.

In yet another example, the communications apparatus is an interworking function network element-control plane, or is a chip applied to the interworking function network element-control plane. In this case, the processing module 112 is configured to support the communications apparatus in performing step 601 performed by the interworking function network element-control plane in the foregoing embodiment. The communications module 113 is configured to support the communications apparatus in performing step 602, step 603, and step 604 that are performed by the interworking function network element-control plane in the foregoing embodiment.

The communications module 113 is further configured to support the communications apparatus in performing step 607, step 610, step 611, and step 614 that are performed by the interworking function network element-control plane in the foregoing embodiment. The processing module 112 is further configured to support the communications apparatus in performing step 608 and step 613 that are performed by the interworking function network element-control plane in the foregoing embodiment.

In still yet another example, the communications apparatus is an interworking function network element-user plane, or is a chip applied to the interworking function network element-user plane. The communications module 113 is configured to support the communications apparatus in performing step 616 performed by the interworking function network element-user plane in the foregoing embodiment.

In a possible implementation, the communications module 113 is further configured to support the communications apparatus in performing step 623, step 625, step 628, and step 630 in the foregoing embodiment. The processing module 112 is further configured to support the communications apparatus in performing step 624 and step 629 that are performed by the interworking function network element-user plane in the foregoing embodiment.

In a further example, the communications apparatus is an access network gateway, or is a chip applied to the access network gateway. The communications module 113 is configured to support the communications apparatus in performing step 605 performed by the access network gateway in the foregoing embodiment. The processing module 112 is configured to support the communications apparatus in performing step 606 performed by the access network gateway in the foregoing embodiment.

In a possible implementation, the communications module 113 is further configured to support the communications apparatus in performing step 609, step 612, step 615, step 619, step 621, step 622, step 631, and step 634 in the foregoing embodiment. The processing module 112 is further configured to support the communications apparatus in performing step 620, step 632, and step 633 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 112 may implement or execute various examples of logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

Figure 17:
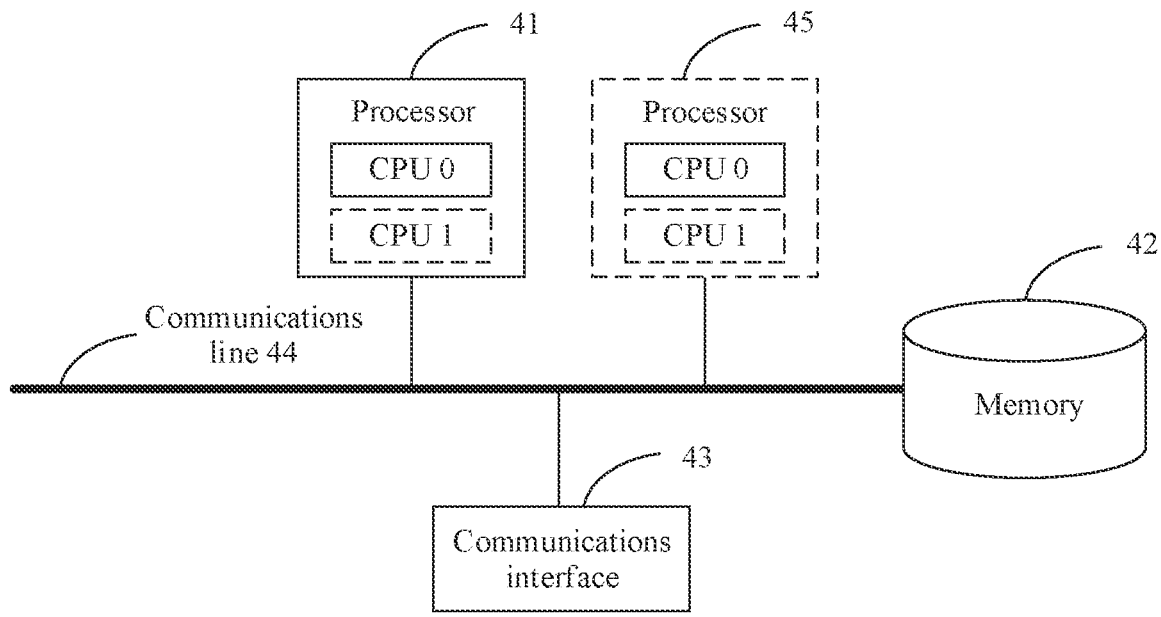
FIG. 17 is a schematic diagram of a structure of stilt another user plane connection establishment apparatus according to an embodiment of this application.

When the processing module 112 is a processor 41 or a processor 45, the communications module 113 is a communications interface 43 or a transceiver, and the storage module 111 is a memory 42, the communications apparatus in this application may be a communications device shown in FIG. 17. The communications device includes the processor 41, a communications line 44, and at least one communications interface (FIG. 17 merely shows an example in which the communications device includes the communications interface 43 for description).

Optionally, the communications device may further include the memory 42.

The processor 41 may be a general-purpose central processing unit (CPU), a microprocessor, an application-specific integrated circuit (ASIC), or one or more integrated circuits configured to control program execution of the solutions of this application.

The communications line 44 may include a path for transmitting information between the foregoing components.

The communications interface 43 is any apparatus such as a transceiver, and is configured to communicate with another device or a communications network such as the Ethernet, a radio access network (RAN), or a wireless local area network (WLAN).

The memory 42 may be a read-only memory (ROM) or another type of static storage device that can store static information and instructions, or a random access memory (RAM) or another type of dynamic storage device that can store information and instructions. The memory 42 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 42 is not limited thereto. The memory may exist independently, and is connected to the processor through the communications line 44. The memory may alternatively be integrated with the processor.

The memory 42 is configured to store computer-executable instructions for performing the solutions of this application, and the processor 41 controls execution of the computer-executable instructions. The processor 41 is configured to execute the computer-executable instructions stored in the memory 42, to implement the user plane connection establishment method provided in the foregoing embodiments of this application.

Optionally, the computer-executable instructions in this embodiment of this application may also be referred to as application program code. This is not specifically limited in this embodiment of this application.

During specific implementation, in an embodiment, the processor 41 may include one or more CPUs, such as a CPU 0 and a CPU 1 in FIG. 17.

During specific implementation, in an embodiment, the communications device may include a plurality of processors, such as the processor 41 and the processor 45 in FIG. 17. Each of the processors may be a single-core (single-CPU) processor, or may be a multi-core (multi-CPU) processor. The processor herein may be one or more devices, circuits, and/or processing cores configured to process data (for example, computer program instructions).

Figure 18:
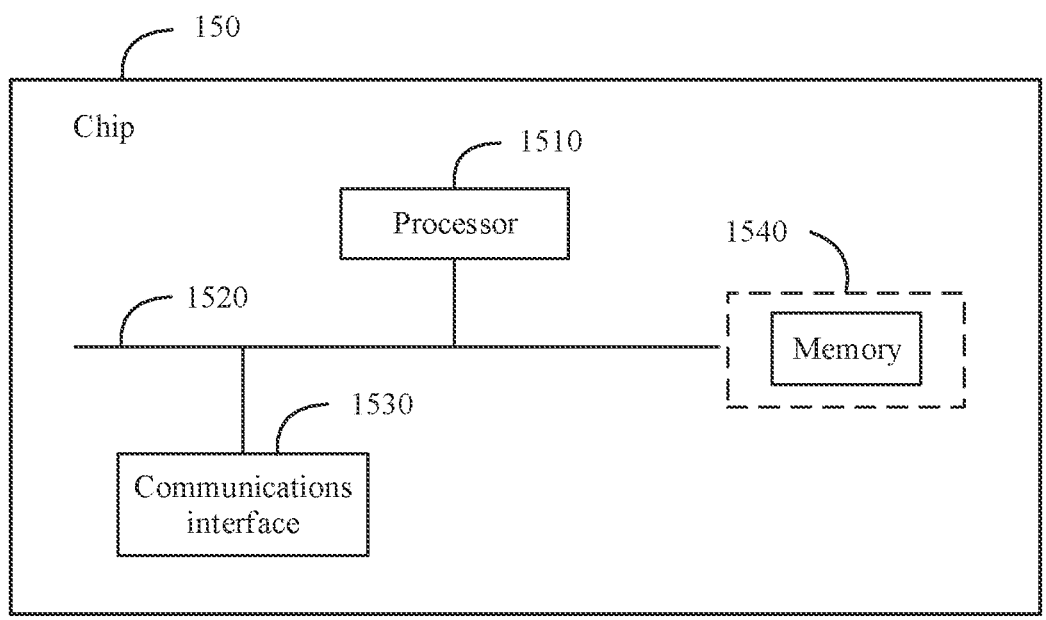
FIG. 18 is a schematic diagram of a structure of a chip according to an embodiment of this application.

FIG. 18 is a schematic diagram of a structure of a chip 150 according to an embodiment of this application. The chip 150 includes one or more processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an execution module or a data structure, a subset thereof, or an extended set thereof.

In this embodiment of this application, a corresponding operation is performed by invoking an operation instruction stored in the memory 1540 (where the operation instruction may be stored in an operating system).

In a possible implementation, structures of chips used by an access network gateway, an interworking function network element-control plane, and an interworking function network element-user plane are similar, and different apparatuses may use different chips to implement respective functions.

The processor 1510 controls a processing operation of any one of the access network gateway, the interworking function network element-control plane, and the interworking function network element-user plane. The processor 1510 may also be referred to as a central processing unit (CPU).

The memory 1540 may include a read-only memory and a random access memory, and provide instructions and data for the processor 1510. A part of the memory 1540 may further include a non-volatile random access memory (NVRAM). For example, during application, the memory 1540, the communications interface 1530, and the memory 1540 are coupled together by using a bus system 1520. The bus system 1520 may include a power bus, a control bus, a status signal bus, and the like in addition to a data bus. However, for clear description, various types of buses in FIG. 18 are marked as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, steps of the foregoing methods may be implemented by using a hardware integrated logical circuit in the processor 1510 or by using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1510 may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and implemented by using a hardware decoding processor, or may be performed and implemented by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1540. The processor 1510 reads information in the memory 1540 and implements the steps in the foregoing methods in combination with hardware of the processor 1510.

In a possible implementation, the communications interface 1530 is configured to perform a receiving or sending step of any one of the access network gateway, the interworking function network element-control plane, and the interworking function network element-user plane in the embodiments shown in FIG. 4 to FIG. 13. The processor 1510 is configured to perform a processing step of any one of the access network gateway, the interworking function network element-control plane, and the interworking function network element-user plane in the embodiments shown in FIG. 4 to FIG. 13.

The foregoing communications unit may be an interface circuit or a communications interface of the apparatus, and is configured to receive a signal from another apparatus. For example, when the apparatus is implemented as a chip, the communications unit is an interface circuit or a communications interface that is on the chip and that is configured to send a signal or receive a signal from another chip or apparatus.

In the foregoing embodiments, the instructions that are stored in the memory and executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

According to an aspect, a computer-readable storage medium is provided. The computer-readable storage medium stores instructions. When the instructions are run, an interworking function network element-control plane or a chip applied to the interworking function network element-control plane is enabled to perform step 401 and step 402 in the foregoing embodiment.

According to another aspect, a computer-readable storage medium is provided. The computer-readable storage medium stores instructions. When the instructions are run, an interworking function network element-control plane or a chip applied to the interworking function network element-control plane is enabled to perform step 502, step 503, step 504, step 509, step 512, step 514, step 516, step 519, step 520, and step 522 in the foregoing embodiment.

According to still another aspect, a computer-readable storage medium is provided. The computer-readable storage medium stores instructions. When the instructions are run, an access network gateway or a chip applied to the access network gateway is enabled to perform step 403 and step 404 in the foregoing embodiment.

According to yet another aspect, a computer-readable storage medium is provided. The computer-readable storage medium stores instructions. When the instructions are run, an access network gateway or a chip applied to the access network gateway is enabled to perform step 501, step 505, step 506, step 511, step 513, step 517, step 526, step 527, step 528, step 536, step 537, and step 538 in the foregoing embodiment.

According to still yet another aspect, a computer-readable storage medium is provided. The computer-readable storage medium stores instructions. When the instructions are run, an interworking function network element-control plane or a chip applied to the interworking function network element-control plane is enabled to perform step 601, step 602, step 603, step 604, step 607, step 608, step 610, step 611, step 613, and step 614 in the foregoing embodiment.

According to a further aspect, a computer-readable storage medium is provided. The computer-readable storage medium stores instructions. When the instructions are run, an interworking function network element-user plane or a chip applied to the interworking function network element-user plane is enabled to perform step 406 and step 405 in the foregoing embodiment.

According to a still further aspect, a computer-readable storage medium is provided. The computer-readable storage medium stores instructions. When the instructions are run, an interworking function network element-user plane or a chip applied to the interworking function network element-user plane is enabled to perform step 503, step 507, step 508, step 510, step 515, step 523, step 529, step 531, step 534, and step 535 in the foregoing embodiment.

According to a yet further aspect, a computer-readable storage medium is provided. The computer-readable storage medium stores instructions. When the instructions are run, an interworking function network element-user plane or a chip applied to the interworking function network element-user plane is enabled to perform step 616, step 623, step 624, step 625, step 628, step 629, and step 630 in the foregoing embodiment.

According to a still yet further aspect, a computer-readable storage medium is provided. The computer-readable storage medium stores instructions. When the instructions are run, an access network gateway or a chip applied to the access network gateway is enabled to perform step 605, step 606, step 612, step 615, step 619, step 620, step 621, step 622, step 631, step 632, step 633, and step 634 in the foregoing embodiment.

The foregoing readable storage medium may include any medium that can store program code, such as a USB flash drive, a removable hard disk, a read-only memory, a random access memory, a magnetic disk, or an optical disc.

According to an aspect, a computer program product including instructions is provided. The computer program product stores the instructions. When the instructions are run, an interworking function network element-control plane or a chip applied to the interworking function network element-control plane is enabled to perform step 401 and step 402 in the foregoing embodiment.

According to another aspect, a computer program product including instructions is provided. The computer program product stores the instructions. When the instructions are run, an interworking function network element-control plane or a chip applied to the interworking function network element-control plane is enabled to perform step 502, step 503, step 504, step 509, step 512, step 514, step 516, step 519, step 520, and step 522 in the foregoing embodiment.

According to still another aspect, a computer program product including instructions is provided. The computer program product stores the instructions. When the instructions are run, an access network gateway or a chip applied to the access network gateway is enabled to perform step 403 and step 404 in the foregoing embodiment.

According to yet another aspect, a computer program product including instructions is provided. The computer program product stores the instructions. When the instructions are run, an access network gateway or a chip applied to the access network gateway is enabled to perform step 501, step 505, step 506, step 511, step 513, step 517, step 526, step 527, step 528, step 536, step 537, and step 538 in the foregoing embodiment.

According to still yet another aspect, a computer program product including instructions is provided. The computer program product stores the instructions. When the instructions are run, an interworking function network element-control plane or a chip applied to the interworking function network element-control plane is enabled to perform step 601, step 602, step 603, step 604, step 607, step 608, step 610, step 611, step 613, and step 614 in the foregoing embodiment.

According to a further aspect, a computer program product including instructions is provided. The computer program product stores the instructions. When the instructions are run, an interworking function network element-user plane or a chip applied to the inter-working function network element-user plane is enabled to perform step 406 and step 405 in the foregoing embodiment.

According to a still further aspect, a computer program product including instructions is provided. The computer program product stores the instructions. When the instructions are run, an interworking function network element-user plane or a chip applied to the interworking function network element-user plane is enabled to perform step 503, step 507, step 508, step 510, step 515, step 523, step 529, step 531, step 534, and step 535 in the foregoing embodiment.

According to a yet further aspect, a computer program product including instructions is provided. The computer program product stores the instructions. When the instructions are run, an interworking function network element-user plane or a chip applied to the interworking function network element-user plane is enabled to perform step 616, step 623, step 624, step 625, step 628, step 629, and step 630 in the foregoing embodiment.

According to a still yet further aspect, a computer program product including instructions is provided. The computer program product stores the instructions. When the instructions are run, an access network gateway or a chip applied to the access network gateway is enabled to perform step 605, step 606, step 612, step 615, step 619, step 620, step 621, step 622, step 631, step 632, step 633, and step 634 in the foregoing embodiment.

According to an aspect, a chip is provided. The chip is applied to an interworking function network element-control plane. The chip includes at least one processor and a communications interface. The communications interface is coupled to the at least one processor. The processor is configured to run instructions, to perform step 401 and step 402 in the foregoing embodiment.

According to an aspect, a chip is provided. The chip is applied to an interworking function network element-control plane. The chip includes at least one processor and a communications interface. The communications interface is coupled to the at least one processor. The processor is configured to run instructions, to perform step 502, step 503, step 504, step 509, step 512, step 514, step 516, step 519, step 520, and step 522 in the foregoing embodiment.

According to an aspect, a chip is provided. The chip is applied to an access network gateway. The chip includes at least one processor and a communications interface. The communications interface is coupled to the at least one processor. The processor is configured to run instructions, to perform step 501, step 505, step 506, step 511, step 513, step 517, step 526, step 527, step 528, step 536, step 537, and step 538 in the foregoing embodiment.

According to an aspect, a chip is provided. The chip is applied to an interworking function network element-control plane. The chip includes at least one processor and a communications interface. The communications interface is coupled to the at least one processor. The processor is configured to run instructions, to perform step 601, step 602, step 603, step 604, step 607, step 608, step 610, step 611, step 613, and step 614 in the foregoing embodiment.

According to an aspect, a chip is provided. The chip is applied to an interworking function network element-user plane. The chip includes at least one processor and a communications interface. The communications interface is coupled to the at least one processor. The processor is configured to run instructions, to perform step 406 and step 405 in the foregoing embodiment.

According to another aspect, a chip is provided. The chip is applied to an interworking function network element-user plane. The chip includes at least one processor and a communications interface. The communications interface is coupled to the at least one processor. The processor is configured to run instructions, to perform step 503, step 507, step 508, step 510, step 515, step 523, step 529, step 531, step 534, and step 535 in the foregoing embodiment.

According to an aspect, a chip is provided. The chip is applied to an interworking function network element-user plane. The chip includes at least one processor and a communications interface. The communications interface is coupled to the at least one processor. The processor is configured to run instructions, to perform step 616, step 623, step 624, step 625, step 628, step 629, and step 630 in the foregoing embodiment.

According to another aspect, a chip is provided. The chip is applied to an access network gateway. The chip includes at least one processor and a communications interface. The communications interface is coupled to the at least one processor. The processor is configured to run instructions, to perform step 605, step 606, step 612, step 615, step 619, step 620, step 621, step 622, step 631, step 632, step 633, and step 634 in the foregoing embodiment.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD for short)), or the like.

Although this application is described with reference to the embodiments, in a process of implementing this application that claims protection, a person skilled in the art may understand and implement other variations of the disclosed embodiments by viewing the accompanying drawings, the disclosed content, and the appended claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that these modifications and variations fall within the scope of the claims of this application and equivalent technologies thereof.

What is claimed is:

1. A user plane connection establishment method, comprising:
   determining, by an interworking function network element-control plane, granularity information of a user plane connection between an interworking function network element-user plane and an access network gateway; and
   sending, by the interworking function network element-control plane, the granularity information of the user plane connection to the interworking function network element-user plane and the access network gateway, wherein the granularity information of the user plane connection is used to establish the user plane connection between the interworking function network element-user plane and the access network gateway.

2. The method according to claim 1, wherein the determining, by an interworking function network element-control plane, granularity information of a user plane connection between an interworking function network element-user plane and an access network gateway comprises:
   determining, by the interworking function network element-control plane, the granularity information of the user plane connection based on at least one of terminal identifier information or policy information.

3. The method according to claim 1, wherein the granularity information of the user plane connection comprises information about the user plane connection at an access network gateway granularity or information about the user plane connection at a terminal granularity.

4. The method according to claim 1, wherein the granularity information of the user plane connection comprises information about the user plane connection at a session granularity.

5. The method according to claim 1, wherein the method further comprises:
   sending, by the interworking function network element-control plane, data encapsulation information of the user plane connection to the interworking function network element-user plane and the access network gateway.

6. The method according to claim 2, wherein the method further comprises:
   receiving, by the interworking function network element-control plane, a first request message from the access network gateway, wherein the first request message comprises the terminal identifier information and at least one of a request for establishing the user plane connection or an authentication request message, and wherein the authentication request message is used to request to authenticate a terminal.

7. The method according to claim 6, wherein the method further comprises:
   sending, by the interworking function network element-control plane, the terminal identifier information corresponding to the granularity information to the interworking function network element-user plane and the access network gateway.

8. The method according to claim 6, wherein the method further comprises:
   sending, by the interworking function network element-control plane, the terminal identifier information corresponding to the granularity information and session information corresponding to the terminal to the access network gateway.

9. The method according to claim 1, wherein the method further comprises:
   determining, by the interworking function network element-control plane, user plane tunnel information, wherein the user plane tunnel information comprises information about a user plane network element and information about the interworking function network element-user plane;
   sending, by the interworking function network element-control plane, the information about the interworking function network element-user plane to the user plane network element; and
   sending, by the interworking function network element-control plane, the information about the user plane network element and session information corresponding to a terminal to the interworking function network element-user plane.

10. The method according to claim 1, further comprising:
    receiving, by the access network gateway from the interworking function network element-control plane, the granularity information of the user plane connection; and
    establishing, by the access network gateway, the user plane connection between the interworking function network element-user plane and the access network gateway based on the granularity information of the user plane connection.

11. A communications apparatus, comprising:
    at least one processor; and
    one or more memories coupled to the at least one processor and storing programming instructions for execution by the at least one processor to:
       determine granularity information of a user plane connection between an interworking function network element-user plane and an access network gateway; and
       send the granularity information of the user plane connection to the interworking function network element-user plane and the access network gateway, wherein the granularity information of the user plane connection is used to establish the user plane connection between the interworking function network element-user plane and the access network gateway.

12. The apparatus according to claim 11, wherein the programming instructions are for execution by the at least one processor to:
    determine the granularity information of the user plane connection based on at least one of terminal identifier information or policy information.

13. The apparatus according to claim 11, wherein the granularity information of the user plane connection comprises information about the user plane connection at an access network gateway granularity or information about the user plane connection at a terminal granularity.

14. The apparatus according to claim 11, wherein the granularity information of the user plane connection comprises information about the user plane connection at a session granularity.

15. The apparatus according to claim 11, wherein the programming instructions are for execution by the at least one processor to:
send data encapsulation information of the user plane connection to the interworking function network element-user plane and the access network gateway.

16. The apparatus according to claim 12, wherein the programming instructions are for execution by the at least one processor to:
receive a first request message from the access network gateway, wherein the first request message comprises the terminal identifier information and at least one of a request for establishing the user plane connection or an authentication request message, and wherein the authentication request message is used to request to authenticate a terminal.

17. The apparatus according to claim 16, wherein the programming instructions are for execution by the at least one processor to:
send the terminal identifier information corresponding to the granularity information to the interworking function network element-user plane and the access network gateway.

18. The apparatus according to claim 16, wherein the programming instructions are for execution by the at least one processor to:
send the terminal identifier information corresponding to the granularity information and session information corresponding to the terminal to the access network gateway.

19. The apparatus according to claim 11, wherein the programming instructions are for execution by the at least one processor to:
determine user plane tunnel information, wherein the user plane tunnel information comprises information about a user plane network element and information about the interworking function network element-user plane;
send the information about the interworking function network element-user plane to the user plane network element; and
send the information about the user plane network element and session information corresponding to a terminal to the interworking function network element-user plane.

20. A non-transitory computer readable storage medium storing a computer program, wherein the computer program comprises instructions, that when executed by at least one processor, cause the at least one processor to:
determine granularity information of a user plane connection between an interworking function network element-user plane and an access network gateway; and
send the granularity information of the user plane connection to the interworking function network element-user plane and the access network gateway, wherein the granularity information of the user plane connection is used to establish the user plane connection between the interworking function network element-user plane and the access network gateway.

* * * * *

UNITED STATES PATENT AND TRADEMARK OFFICE
CERTIFICATE OF CORRECTION

| | | |
|---|---|---|
| PATENT NO. | : 12,166,826 B2 | Page 1 of 1 |
| APPLICATION NO. | : 17/536668 | |
| DATED | : December 10, 2024 | |
| INVENTOR(S) | : Di Zhang and Youyang Yu | |

It is certified that error appears in the above-identified patent and that said Letters Patent is hereby corrected as shown below:

On the Title Page

In Column 2 (item (57) Abstract), In Line 3, Delete "methods" and insert -- methods, --.

In the Specification

In Column 1, In Line 8, Delete "PCT/CN2020/079049" and insert -- PCT/CN2020/079049, --.

In the Claims

In Column 88, In Line 20, In Claim 20, delete "instructions," and insert -- instructions --.

Signed and Sealed this
Twenty-fifth Day of March, 2025

Coke Morgan Stewart
*Acting Director of the United States Patent and Trademark Office*